US012770657B2

(12) United States Patent
Lowe et al.

(10) Patent No.: US 12,770,657 B2
(45) Date of Patent: Oct. 20, 2026

(54) SYSTEMS AND METHODS FOR AUDIO ATTRIBUTE MAPPING

(71) Applicant: Sirius XM Radio LLC, New York, NY (US)

(72) Inventors: Raymond Lowe, Chester, NJ (US); Christopher Ward, Glen Ridge, NJ (US)

(73) Assignee: SIRIUS XM RADIO LLC, New York, NY (US)

( * ) Notice: Subject to any disclaimer, the term of this patent is extended or adjusted under 35 U.S.C. 154(b) by 0 days.

(21) Appl. No.: 14/383,875

(22) PCT Filed: Mar. 7, 2013

(86) PCT No.: PCT/US2013/029721

§ 371 (c)(1),
(2) Date: Sep. 8, 2014

(87) PCT Pub. No.: WO2013/134567

PCT Pub. Date: Sep. 12, 2013

(65) Prior Publication Data

US 2015/0309844 A1 Oct. 29, 2015

Related U.S. Application Data

(60) Provisional application No. 61/607,532, filed on Mar. 6, 2012.

(51) Int. Cl.
*G06F 3/00* (2006.01)
*G06F 3/0481* (2022.01)
(Continued)

(52) U.S. Cl.
CPC .......... *G11B 27/038* (2013.01); *G06F 3/0481* (2013.01); *G06F 3/04847* (2013.01);
(Continued)

(58) Field of Classification Search
CPC .... G06F 3/048; G06F 3/0484; G06F 3/04847; G06F 3/0481; G06F 3/165; G06F 9/4451;
(Continued)

(56) References Cited

U.S. PATENT DOCUMENTS

| | | | |
|---|---|---|---|
| 5,899,969 | A | 5/1999 | Fielder et al. |
| 6,014,638 | A | 1/2000 | Burge et al. |

(Continued)

FOREIGN PATENT DOCUMENTS

| | | | |
|---|---|---|---|
| KR | 10-0781513 | B1 | 12/2007 |
| KR | 10-2009-0025038 | A | 3/2009 |

(Continued)

OTHER PUBLICATIONS

International Search Report, International Application No. PCT/US2013/029721, Date of Mailing Jun. 25, 2013.

(Continued)

*Primary Examiner* — Jessica S Manno
*Assistant Examiner* — Andrew Chung

(57) ABSTRACT

In a customized content delivery service, such as, for example, a personalized music streaming service delivered over various wireless networks, an end-user can be given the ability to refine or select programming which is presented to them. One approach to achieving this is to present the user with a range of user preference controls, such as sliders, which can be mapped to attributes contained within the scheduling system. Thus, systems and methods are presented for the representation and delivery of such attributes to effect a personalized server, to map controls to these attributes, and to simplify the controls presented to an end-user. In exemplary embodiments of the present invention a song or audio content recommender may use channel specifications and a user profile, as dynamically modified and updated by user preferences expressed via said user
(Continued)

100

EXEMPLARY SLIDERS FOR USER PERSONALIZATION OF USER EXPERIENCE preference controls, to generate user and channel specific playlists, to give a user the personalized audio experience he or she actually desires.

14 Claims, 43 Drawing Sheets

(51) Int. Cl.

| | |
|---|---|
| ***G06F 3/04847*** | (2022.01) |
| ***G06F 3/16*** | (2006.01) |
| ***G06F 9/445*** | (2018.01) |
| ***G06F 9/50*** | (2006.01) |
| ***G06Q 30/02*** | (2023.01) |
| ***G06Q 30/0601*** | (2023.01) |
| ***G10H 1/00*** | (2006.01) |
| ***G10H 1/06*** | (2006.01) |
| ***G11B 27/038*** | (2006.01) |
| ***G11B 27/10*** | (2006.01) |
| ***G11B 27/32*** | (2006.01) |
| ***H04L 67/306*** | (2022.01) |

(52) U.S. Cl.
CPC ............ *G06F 3/165* (2013.01); *G06F 9/4451* (2013.01); *G06F 9/5066* (2013.01); *G06Q 30/02* (2013.01); *G06Q 30/0631* (2013.01); *G10H 1/0025* (2013.01); *G10H 1/06* (2013.01); *G11B 27/105* (2013.01); *G11B 27/322* (2013.01); *H04L 67/306* (2013.01); *G10H 2210/125* (2013.01); *G10H 2240/075* (2013.01); *G10H 2240/125* (2013.01); *G10H 2240/305* (2013.01); *G10H 2240/325* (2013.01); *G10H 2250/035* (2013.01); *G10H 2250/571* (2013.01)

(58) Field of Classification Search
CPC ... G06F 9/5066; G11B 27/038; G11B 27/105; G11B 27/322; G06Q 30/02; G06Q 30/0631; G10H 1/0025; G10H 1/06; G10H 2210/125; G10H 2240/075; G10H 2240/125; G10H 2240/305; G10H 2240/325; G10H 2250/035; G10H 2250/571; H04L 67/306
See application file for complete search history.

(56) References Cited

U.S. PATENT DOCUMENTS 6,184,937 B1 2/2001 Williams et al.
6,262,777 B1 7/2001 Brewer et al.
7,302,396 B1 11/2007 Cooke
7,571,016 B2 8/2009 Rahman et al.
7,669,131 B2 * 2/2010 Matsuyama ....... H04N 1/00405 369/30.08
7,908,172 B2 3/2011 Corts et al.
7,985,911 B2 * 7/2011 Oppenheimer ...... G10H 1/0058 84/600
8,026,918 B1 * 9/2011 Murphy ................. G06N 3/006 345/473
8,156,526 B2 4/2012 Lee
8,175,518 B2 * 5/2012 Underwood ........... H04H 20/02 455/3.02
8,458,595 B1 6/2013 Margulis
8,655,854 B2 2/2014 Claman et al.
8,805,693 B2 8/2014 Lindahl et al.
8,818,175 B2 8/2014 Dubin et al.
8,855,798 B2 * 10/2014 DiMaria ........... G06F 17/30038 345/440
8,875,014 B2 * 10/2014 Choi ....................... G06F 16/48 715/241
8,938,393 B2 1/2015 Gunatilake et al.
8,948,894 B2 2/2015 Bhat
9,330,722 B2 5/2016 Chang et al.
9,355,649 B2 5/2016 King et al.
9,406,303 B2 8/2016 Lowe et al.
2002/0105951 A1 8/2002 Hannuksela et al.
2002/0133357 A1 9/2002 McLean
2002/0159375 A1 10/2002 Eguchi et al.
2003/0033325 A1 2/2003 Boogaard
2004/0117822 A1 6/2004 Karaoguz et al.
2005/0197906 A1 * 9/2005 Kindig ................... G06Q 30/02 705/15
2005/0201723 A1 9/2005 Islam et al.
2005/0249336 A1 11/2005 Basir et al.
2006/0093038 A1 5/2006 Boyce
2006/0192478 A1 8/2006 Basu
2007/0074617 A1 * 4/2007 Vergo ...................... G06F 16/68 84/612
2007/0288961 A1 * 12/2007 Guldi ................... H04N 7/0885 725/46
2008/0046953 A1 2/2008 Kossila
2008/0165985 A1 7/2008 Hsu et al.
2008/0184142 A1 * 7/2008 Ijichi ..................... G06F 3/0482 715/764
2008/0195695 A1 8/2008 Tanaka et al.
2008/0235216 A1 * 9/2008 Ruttenberg ......... G06F 16/9535 707/999.005
2008/0249644 A1 10/2008 Jehan
2008/0270523 A1 10/2008 Billmaier et al.
2008/0281867 A1 * 11/2008 Kendall ............... G11B 27/034
2008/0295132 A1 * 11/2008 Icho ................... H04N 21/8405 348/E7.061
2009/0012959 A1 * 1/2009 Ylivainio .......... G06F 17/30038
2009/0024234 A1 1/2009 Archibald
2009/0063414 A1 * 3/2009 White ................... G06F 3/0484
2009/0163183 A1 6/2009 O'Donoghue et al.
2009/0228423 A1 9/2009 Hicken et al.
2009/0306985 A1 * 12/2009 Roberts ................... G06F 3/017 704/258
2010/0010997 A1 1/2010 Amidon et al.
2010/0030859 A1 * 2/2010 Huang .............. G06F 17/30905 709/206
2010/0063825 A1 3/2010 Williams et al.
2010/0064219 A1 * 3/2010 Gabrisko ............ G06F 16/4393 700/94
2010/0142730 A1 6/2010 Lindahl et al.
2010/0192066 A1 * 7/2010 Wu ......................... G06F 16/64 715/727
2010/0268361 A1 * 10/2010 Mantel ................... H04H 60/73 700/94
2010/0287071 A1 * 11/2010 Shah .................. G06Q 30/0603 705/26.25
2011/0083074 A1 * 4/2011 Jellison, Jr. ........... G06F 3/0481 715/716
2011/0138299 A1 * 6/2011 Pugsley .............. G06F 3/04847 715/748
2011/0211812 A1 9/2011 Tzoukermann et al.
2011/0268424 A1 11/2011 Holland et al.
2011/0285579 A1 * 11/2011 Bangera ............... A61B 5/7253 342/189
2012/0023403 A1 * 1/2012 Herberger ............. G06F 16/639 715/716
2012/0038762 A1 2/2012 Davidson et al.
2012/0046954 A1 2/2012 Lindahl et al.
2012/0072418 A1 * 3/2012 Svendsen .......... G06F 17/30749 707/724
2012/0259642 A1 10/2012 Takada
2013/0073983 A1 * 3/2013 Rasmussen ............ G06Q 30/02 715/753
2013/0131507 A1 * 5/2013 Salazar-Ferrer ....... A61B 6/486 600/431
2013/0152148 A1 * 6/2013 Negroponte ........... G08C 17/02 725/110
2013/0167029 A1 * 6/2013 Friesen ................... G06F 3/167 715/716
2013/0205223 A1 * 8/2013 Gilbert ............... G06Q 30/0269 715/748

(56) References Cited

U.S. PATENT DOCUMENTS

| | | | | |
|---|---|---|---|---|
| 2014/0237361 | A1* | 8/2014 | Martin | G11B 27/105 715/716 |
| 2014/0316789 | A1 | 10/2014 | Lowe et al. | |
| 2015/0073812 | A1 | 3/2015 | Lowe et al. | |
| 2015/0128039 | A1* | 5/2015 | Wieder | G06F 3/0481 715/716 |
| 2015/0142456 | A1 | 5/2015 | Lowe et al. | |
| 2015/0248219 | A1* | 9/2015 | Wieder | H04L 67/306 715/716 |
| 2017/0053660 | A1 | 2/2017 | Lowe et al. | |
| 2019/0164528 | A1* | 5/2019 | Sheppard | G10H 1/0058 |

FOREIGN PATENT DOCUMENTS

| | | | |
|---|---|---|---|
| KR | 10-0973654 | B1 | 8/2010 |
| KR | 10-2011-0023490 | A | 3/2011 |
| WO | 02/097791 | A1 | 12/2002 |

OTHER PUBLICATIONS

International Search Report, dated Feb. 25, 2013, issued in corresponding Int'l. Appln. No. PCT/US2012/065943.

Written Opinion, dated Feb. 25, 2013, issued in corresponding Int'l. Appln. No. PCT/US2012/065943.

Written Opinion, dated Jun. 25, 2013, issued in corresponding Int'l. Appln. No. PCT/US2013/029721.

International Search Report, dated Jul. 26, 2013, issued in corresponding Int'l. Appln. No. PCT/US2013/037034.

Written Opinion, dated Jul. 26, 2013, issued in corresponding Int'l. Appln. No. PCT/US2013/037034.

International Search Report, dated Aug. 23, 2013, issued in corresponding Int'l. Appln. No. PCT/US2013/037013.

Written Opinion, dated Aug. 23, 2013, issued in corresponding Int'l. Appln. No. PCT/US2013/037013.

* cited by examiner

100

EXEMPLARY SLIDERS FOR USER PERSONALIZATION OF USER EXPERIENCE

CONTENT DISTRIBUTION AND CLIENT RECEPTION SYSTEM

FIG. 7

```
<libraryCatalog>
  <song>
   <sxmAutomationID>P-432057-001</sxmAutomationID>
   <artist>Dire Straits</artist>
   <title>Romeo and Juilet</title>
  </song>
  <song>
   <sxmAutomationID>P-112344-002</sxmAutomationID>
   <artist>Dire Straits</artist>
   <title>Telegraph Road</title>
  </song>
  <song>
   <sxmAutomationID>D-LE124333-001
  </sxmAutomationID>
   <artist>The Beatles</artist>
   <title>Mrs Robinson</title>
  </song>
</libraryCatalog>
```

710 CHANNEL-SAMPLE CATALOG SPECIFICATION (PART OF CHANNEL SPECIFICATION)

```
<mmFieldValues>
  <field valueRange="token">
   <name>category</name>
   <value key="PR">Primary Rock</value>
   <value key="SR">Secondary Primary Rock</value>
   <value key="DE">Depth Tracks</value>
   <value key="TE">Tertiary Tracks</value>
   <value key="57">SP Secondary Pop</value>
  </field>
  <field valueRange="token">
   <name>type</name>
   <value key="A">American</value>
   <value key="B">British</value>
   <value key="D">Dylan</value>
   <value key="L">L</value>
   <value key="R">Rewind</value>
   <value key="W">wbls</value>
   <value key="I">Live</value>
  </field>
  <field valueRange="token">
   <name>sound</name>
   <value key="D">Hard Classic</value>
   <value key="F">60's Folk Rock</value>
   <value key="H">60's Hard Rock</value>
   <value key="K">70's Classic Rock</value>
   <value key="O">Oldie</value>
   <value key="P">70's Classic Pop</value>
   <value key="R">Rock</value>
  </field>
 </mmFieldValues>
```

720 CHANNEL-SAMPLE FIELD AND ATTRIBUTE DEFINITIONS (PART OF CHANNEL SPECIFICATION)

```
<channelControlSettings>
  <controlSetting>
   <controlOrdinal>2</controlOrdinal>
   <controlName>Rock Decade</controlName>
   <controlMapping>one2oneSimple</controlMapping>
   <controlType>discrete</controlType>
   <controlWeight>10</controlWeight>
   <term>
    <ordinal>0</ordinal>
    <name>60s</name>
    <mmFieldNameValue field="sound">H</mmFieldNameValue>
   </term>
   <term>
    <ordinal>1</ordinal>
    <name>70s</name>
    <mmFieldNameValue field="sound">K</mmFieldNameValue>
   </term>
   <term>
    <ordinal>2</ordinal>
    <name>80s</name>
    <mmFieldNameValue field="sound">R</mmFieldNameValue>
   </term>
   <default>1</default>
  </controlSetting>
```

730 CHANNEL-CONTROL SETTINGS SPECIFICATION (PART OF CHANNEL SPECIFICATION, THERE ARE SEVERAL TYPES OF CONTROL SETTING SPECIFICATIONS)

SAMPLES OF CORE ELEMENTS OF CHANNEL SPECIFICATION

LOADING DISTRIBUTER WITH CHANNEL AND CONTENT INFORMATION

LOADING RECOMMENDER WITH CHANNEL AND CONTENT INFORMATION AND MAKING RECOMMENDATIONS

LOADING CLIENT WITH CHANNEL CONTROL (SLIDER) AND HANDLING CONTROL (SLIDER) SETTING INFORMATION

MESSAGING AND TRANSPORT OF CONTROL INFORMATION TO CLIENT AND RECOMMENDER

EXAMPLE TRANSPORT OF MESSAGES USING A DISTRIBUTER - REQUESTING CHANNEL INFO USING WARP

SIMPLE 1:1 MAPPING BETWEEN CONTENT ATTRIBUTES (TAGS) AND USER CONTROLS (SLIDERS)

FIG. 15

```
<channelControlSettings>>
  <controlSetting> <!-- Sample Control Settings using Values -->
   <controlOrdinal>0</controlOrdinal>
   <controlName>Rock Discovery</controlName> <!-- Slider Name -->
   <controlMapping>unionSimple</controlMapping>
   <controlType>discrete</controlType>
   <controlWeight>20</controlWeight>
   <term>
    <ordinal>0</ordinal>
    <name>Core</name>
    <mmFieldNameValue field="category">PR</mmFieldNameValue>
   </term>
   <term>
    <ordinal>1</ordinal>
    <name>Extra</name>
    <mmFieldNameValue field="category">PR,SR</mmFieldNameValue>
   </term>
   <term>
    <ordinal>2</ordinal>
    <name>Wide</name>
    <mmFieldNameValue field="category">PR,SR,DE,TE</mmFieldNameValue>
   </term>
   <default>1</default>
  </controlSetting>
```

1510 CHANNEL-CONTROL SETTINGS SPECIFICATION (STORED ON CONTENT DELIVERY)

CONTENT WILL BE RECOMMENDED FROM THOSE clipRecords INDICATED IN FIELD 'CATEGORY' THAT HAVE EITHER ATTRIBUTE PR OR SR. IN THIS EXAMPLE PR ARE PRIMARY CATEGORY SONGS, AND SR ARE SECONDARY CATEGORY SONGS.

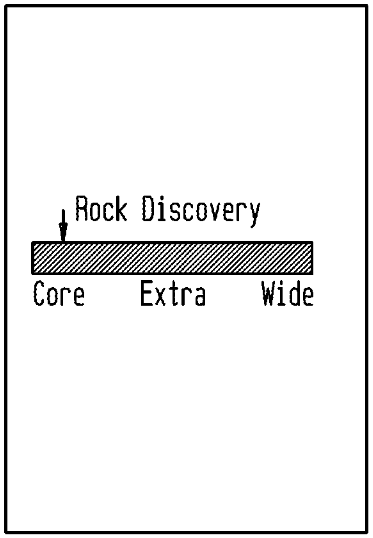

1520 USER PREFERENCE CONTROLS (SLIDERS) (MANIPULATED ON CLIENT SIDE)

SIMPLE UNION MAPPING BETWEEN CONTENT ATTRIBUTES (TAGS) AND USER CONTROLS (SLIDERS)

FIG. 16

MATRIX MAPPING BETWEEN CONTENT ATTRIBUTES (TAGS) AND USER CONTROLS (SLIDERS)

```
<controlSetting> <!-- Sample Control Settings using Matrix -->
   <controlOrdinal>0</controlOrdinal>
   <controlName>Rock Discovery</controlName>
   <controlMapping>matrix</controlMapping>
   <controlType>discrete</controlType>
   <controlWeight>20</controlWeight>

   <fieldSetsUsed>
    <fieldSet>
     <ordinal>0</ordinal>
     <mmFieldNameValue field="type">A,D,B,L</mmFieldNameValue>
     <mmFieldNameValue field="category">PR,SR,DE,TE</mmFieldNameValue>
    </fieldSet>
    <fieldSet>
     <ordinal>1</ordinal>
     <mmFieldNameValue field="type">A,D,B,L</mmFieldNameValue>
     <mmFieldNameValue field="category">PR,SR,DE,TE</mmFieldNameValue>
    </fieldSet>
    <fieldSet>
     <ordinal>2</ordinal>
     <mmFieldNameValue field="type">A,D,B,L</mmFieldNameValue>
     <mmFieldNameValue field="category">PR,SR,DE,TE</mmFieldNameValue>
     <enFieldNameValue field="familiarity"></enFieldNameValue>
    </fieldSet>
   </fieldSetsUsed>

   <weightingMatrix>
   </weightingMatrix>

 </controlSetting>
</channelControlSettings>
```

1610 CHANNEL-SETTING SPECIFICATION (STORED ON CONTENT DELIVERY)

WEIGHTING MATRIX DEFINES PERCENTAGE ALLOCATION OF CONTENT FROM EACH ATTRIBUTE ACCORDING TO EACH SLIDER POSITION. THIS PROVIDES CONSIDERATION EXPRESSIVE POWER.

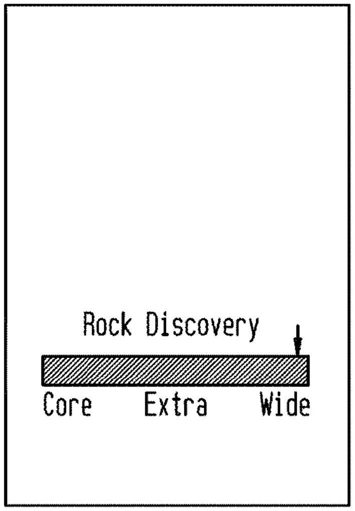

1620 USER PREFERENCE CONTROLS (SLIDERS) (MANIPULATED ON CLIENT SIDE)

| SLIDER POSITION | CLASSIC | DISCO | ROCK | 70s |
|---|---|---|---|---|
| 1 | 0 | 70 | 30 | 0 |
| 2 | 25 | 25 | 25 | 25 |
| 3 | 40 | 25 | 25 | 10 |

1630 CHANNEL-ABSTRACTION OF WEIGHTING MATRIX (STORED ON CONTENT DELIVERY)

*FIG. 17*

MATRIX MAPPING DETAILED SPECIFICATION
SHOWING WEIGHTING MATRIX

```
<controlSetting> <!-- Sample Control Settings using Matrix -->
   <controlOrdinal>0</controlOrdinal>
   <controlName>Rock Discovery</controlName>
   <controlMapping>matrix</controlMapping>
   <controlType>discrete</controlType>
   <controlWeight>20</controlWeight>
   <term>
    <ordinal>0</ordinal>
    <name>Core</name>
   </term>
   <term>
    <ordinal>1</ordinal>
    <name>Extra</name>
   </term>
   <term>
    <ordinal>2</ordinal>
    <name>Wide</name>
   </term>
   <default>1</default>

   <fieldSetsUsed>
    <fieldSet>
     <ordinal>0</ordinal>
     <mmFieldNameValue field="type">A,D,B,L</mmFieldNameValue>
     <mmFieldNameValue field="category">PR,SR,DE,TE</mmFieldNameValue>
    </fieldSet>
    <fieldSet>
     <ordinal>1</ordinal>
     <mmFieldNameValue field="type">A,D,B,L</mmFieldNameValue>
     <mmFieldNameValue field="category">PR,SR,DE,TE</mmFieldNameValue>
    </fieldSet>
    <fieldSet>
     <ordinal>2</ordinal>
     <mmFieldNameValue field="type">A,D,B,L</mmFieldNameValue>
     <mmFieldNameValue field="category">PR,SR,DE,TE</mmFieldNameValue>
     <enFieldNameValue field="familiarity"></enFieldNameValue>
    </fieldSet>
   </fieldSetsUsed>

   <weightingMatrix>
    <matrixValue ordinal="0">category:PR=0.5,category:SR=0.3,category:DE=0.1,category:TE=0.1</matrixValue>
    <matrixValue ordinal="1">type:A=0.1,type:D=0.1,type:B=0.2,type:L=0.1,category:PR=0.2,category:SR=0.1,category:DE=0.1,category:TE=0.1</matrixValue>
    <matrixValue ordinal="2">type:A=0.1,type:D=0.1,type:B=0.1,type:L=0.1,category:PR=0.1,category:SR=0.1,category:DE=0.1,category:TE=0.1,familiary=0.2</matrixValue>
   </weightingMatrix>

 </controlSetting>
</channelControlSettings>
```

CONTROL (SLIDER) SPECIFICATION VIA THE USE IF FUNCTIONS

SLIDER MAPPED TO A MATHEMATICAL FUNCTION, E.G., A NORMAL DISTRIBUTION.

FIG. 19

USE OF SPIDER PLOTS FOR THE REPRESENTATION OF PREFERENCES

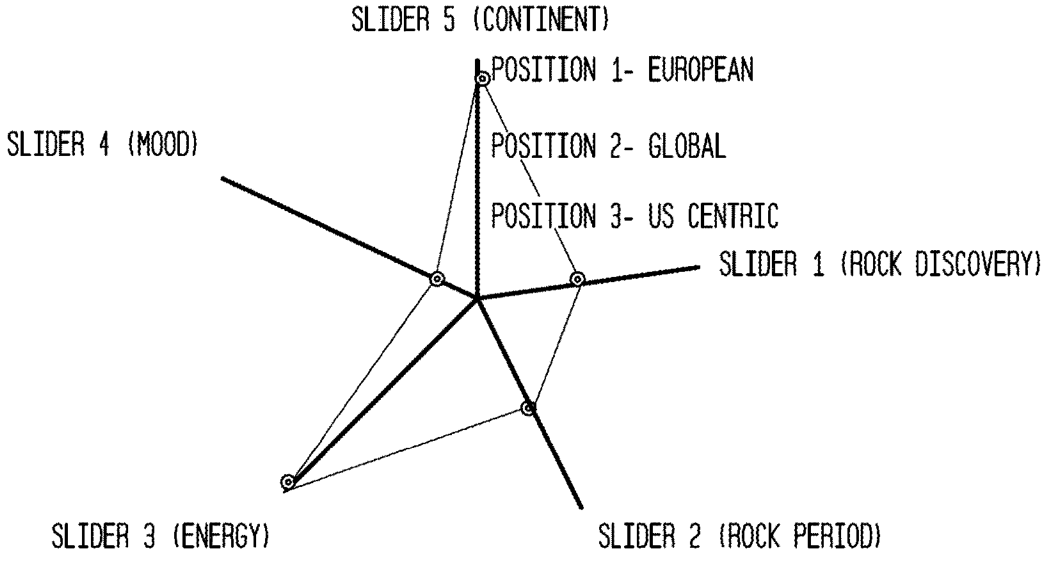

1910 MULTIPLE SLIDERS FORM A USER EXPERIENCE

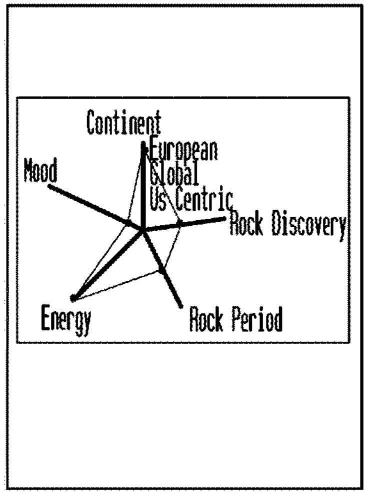

1920 USER PREFERENCE CONTROLS (SLIDERS) (MANIPULATED ON CLIENT SIDE)

USER CAN SELECT PREFERENCES ACROSS A SET OF 'SLIDERS' USING A SPIDER PLOT. THESE ARE INTEGRATED (COMBINING THE WEIGHTS FROM ANY FIELDS THAT ARE IN COMMON ACROSS THE SLIDERS) TO PROVIDE JUST THE EXPERIENCE THE LISTENER IS LOOKING FOR.

Slider | Classic | Disco | Rock | 70s

Slider | 70s | 80s | 90s | 00s

Slider | Low | Medium | High | MaxEnergy

Slider | Relaxed | Smooth | Light Rock | Hard Rock

| Slider 5 Position | USA | UK | Europe | Asia |
|---|---|---|---|---|
| 1 | 0 | 70 | 30 | 0 |
| 2 | 25 | 25 | 25 | 25 |
| 3 | 40 | 25 | 25 | 10 |

1930 USER PREFERENCE CONTROLS REPRESENTED USING ATTRIBUTE MAPPINGS

CONTROL SETTING FOR USER PERSONALIZATION OF USER EXPERIENCE

FIG. 21

```
<channel>
 <serialNumber>1234321</serialNumber>
 <channelKey>70son7</channelKey>
 <name>70's on 7</name>
 <!-- Overview Content Omitted -->

 <libraryCatalog>
  <!-- List of assets available for channel -->
 </libraryCatalog>

 <channelControlSettings>
  <!- Base rule set for channel -->
  <!-- List of sliders available for channel -->
 </channelControlSettings>

</channel>
```

OVERVIEW 2110

CATALOG 2120

SLIDERS 2130

SAMPLES OF CORE ELEMETNS OF CHANNEL SPECIFICATION

FIG. 23

<baseruleset>70son7</baseruleset>
<skinArt></skinArt>
<controlSetting>
<controlOrdinal>0</controlOrdinal>
<controlName>Tempo</controlName>
<controlMapping>pureRulebased</controlMapping>
<controlType>continuous</controlType>
<controlWeight>10</controlWeight>
<controlArt></controlArt>
<titleArt></titleArt>
<term>
<ordinal>0</ordinal>
<name>80 bpm</name>
<min>10<min>
<spacing>0</spacing>
<TermArt></TermArt>
<ruleset>70son7-tempo</ruleset>
</term>
<term>
<ordinal>2</ordinal>
<name>180 bpm</name>
<max>90</max>
<spacing>100</spacing>
<TermArt></TermArt>
<ruleset>70son7-tempo</ruleset>
</term>
<defaultOrdinal>1</defaultOrdinal>
<defaultRuleset>70son7-tempo</defaultRuleset>
</controlSetting>
</channelControlSettings>
</channel>

<skinArt>
<encrypted>false</encrypted>
<size>THUMBNAIL</size>
<type>IMAGE</type>
<id>123</id>
<url>http://www.siriusxm.com/personalization/skins/70son7-0-skin.jpg</url>
</skinArt>

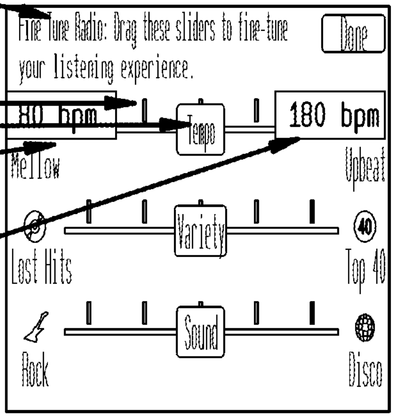

USER PREFERENCE CONTROLS (SLIDERS) (MANIPULATED ON CLIENT SIDE)

pureRuleSet USER CONTROLS (SLIDERS), CONTINUOUS CASE

MAPPING BETWEEN CHANNEL CONTROL SETTING AND RULE SET, CONTINUOUS CASE

FIG. 25

```
<channelControlSettings>
  <baseruleset>70son7</baseruleset>
  <skinArt></skinArt>
  <controlSetting>
    <controlOrdinal>0</controlOrdinal>
    <controlName>Tempo</controlName>
    <controlMapping>pureRulebased</..>
    <controlType>discrete</controlType>
    <controlWeight>10</controlWeight>
    <controlArt></controlArt>
    <titleArt></titleArt>
    <term>
     <ordinal>0</ordinal>
     <name>Chillin'</name>
     <TermArt></TermArt>
     <ruleset>70son7-chillin</ruleset>
    </term>
    <term>
     <ordinal>1</ordinal>
     <name>Mixed Bag<name>
     <TermArt></TermArt>
     <ruleset>70son7-chillingrovin</ruleset>
    </term>
    <term>
     <ordinal>2</ordinal>
     <name>Groovin</name>
     <TermArt><TermArt>
     <ruleset>70son7-groovin</ruleset>
    </term>
    <defaultOrdinal>1<defaultOrdinal>
    <defaultRuleset>70son7-tempo</defaultRuleset>
<controlSettings>
  ...
```

```
<skinArt>
    <encrypted>false</encrypted>
    <size>THUMBNAIL</size>
    <type>IMAGE</type>
    <id>123</id>
<url>http://www.siriusxm.com/personalization/
skins/70son7-0-skin.jpg</url>
</skinArt>
```

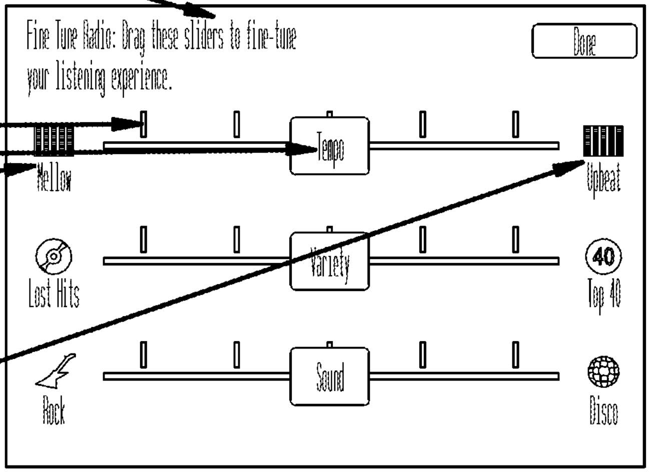

pureRuleSet USER CONTROLS (SLIDERS), DISCRETE CASE

FIG. 26

```
<channelControlSetting>
  <baseruleset>70son7</baseruleset>
  <skinArt></skinArt>
  <controlSetting>
    <controlOrdinal>0</controlOrdinal>
    <controlName>Tempo</controlName>
    <controlMapping>pureRulebased</controlMapping>
    <controlType>discrete</controlType>
    <controlWeight>10</controlWeight>
    <skinArt></skinArt>
    <titleArt></titleArt>
    <term>
     <ordinal>0</ordinal>
     <name>Chillin'</name>
     <TermArt></TermArt>
     <ruleset>70son7-chillin</ruleset>
    </term>
    <term>
     <ordinal>1</ordinal>
     <name>Mixed Bag<name>
     <TermArt></TermArt>
     <ruleset>70son7-chillingrovin</ruleset>
    </term>
    <term>
     <ordinal>2</ordinal>
     <name>Groovin</name>
     <TermArt><TermArt>
     <ruleset>70son7-groovin</ruleset>
    </term>
    <defaultOrdinal>1<defaultOrdinal>
    <defaultRuleset>70son7-tempo</defaultRuleset>
<controlSettings>
   ...
```

default channel ruleset:

developer.echonest.com/api/v4/playlist/dynamic/steer?
session=session_id&enable_ruleset=70son7

NOTE: DUE TO DIFFERING EXAMPLES USED SOME TERMS DO NOT ALIGN UP WITH PRIOR SLIDES.

MAPPING BETWEEN CHANNEL CONTROL SETTING AND RULE SET, DISCRETE CASE

LINEAR SLIDERS

FIG. 32

GROUP: DISTRIBUTER
- CHANNEL OVERVIEW INCLUDING LIBRARY CATALOGS
- NAMES OF CHANNEL BASE RULE SETS
- SPECIFICATION OF SLIDERS INCLUDING:
  - NAMES OF SLIDERS MODULES TO LOAD/UNLOAD
  - SLIDER INFORMATION FOR CLIENT DEVICE INCL UX NEEDS
- CLIENT TASTE PROFILES

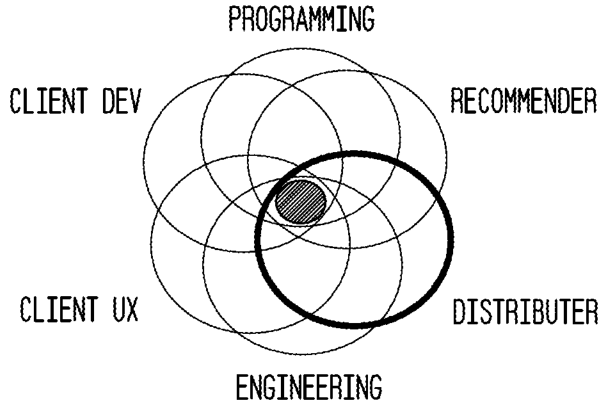

REPRESENTATION SOLUTION
- CHANNEL OVERVIEW LIBRARY CATALOGS AND NAMES OF BASE RULE SETS VIA XML
- CHANNEL CONTROL SETTINGS VIA XML
- CHANNEL CONTROL SETTINGS PASSED DOWN TO CLIENT VIA XML (JSON ENCODED)
- CURRENT CLIENT DEVICE SETTINGS AND OTHER CHANGES PASSED BACK VIA XML (JSON ENCODED)
- INTERACTIONS WITH RECOMMENDER LOAD/UNLOAD RULE SETS USING NAMES VIA RECOMMENDER APIs
- INTERACTIONS WITH RECOMMENDERNDER TO CREATE / STORE TASTE PROFILES VIA RECOMMENDER APIs

FIG. 33

GROUP: PROGRAMMING
- CHANNEL OVERVIEWS AND LIBRARY CATALOGS
- BASE CHANNEL RULE SETS
- PER SLIDER SETTING RULE SETS
- SLIDER MODEL (NUMBER/TYPE)
- SELECT UX GRAPHICS FOR SLIDERS
- CHANNEL SLIDER SETTINGS
- CHANNEL DEFAULT POSITIONS
- SAMPLE PLAYLISTS

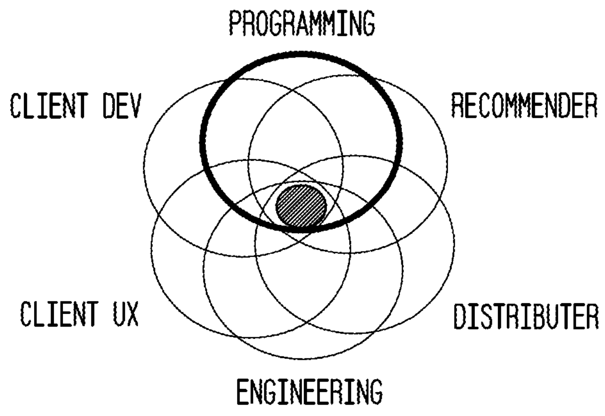

REPRESENTATION SOLUTION
- CHANNEL OVERVIEWS AND CONTENT ENTERED INTO PRODUCER DASHBOARD USING AUTO EXTRACTION FROM MUSIC MASTER
- BASE CHANNEL AND 'PER SLIDER SETTING' RULE SETS ENTERED INTO DASHBOARD, DASHBOARD USES RECOMMENDER APIs TO CREATE SETS IN RECOMMENDER SYSTEM
- SLIDER MODELS (NUMBER AND TYPE)
- UX GRAPHICS URLs FOR SLIDERS ENTERED INTO DASHBOARD
- CHANNEL DEFAULT POSITIONS ENTERED INTO DASHBOARD.
- SAMPLE PLAYLISTS GENERATED BY DASHBOARD USING CATALOG INFO STORED IN RECOMMENDER

FIG. 34

GROUP: ENGINEERING
- RENDITION OF CHANNELS THAT CAN BE CONSUMED BY:
    - RECOMMENDER
    - DISTRIBUTER,
    - CLIENT DEVICE
- EXTRACTED FROM BACK END SYSTEMS AND/OR CREATED BY PROGRAMMING USING PRODUCER DASHBOARD
- CHANNEL BASE AND 'PER SLIDER' RULE SETS IN RECOMMENDER CREATED VIA DASHBOARD

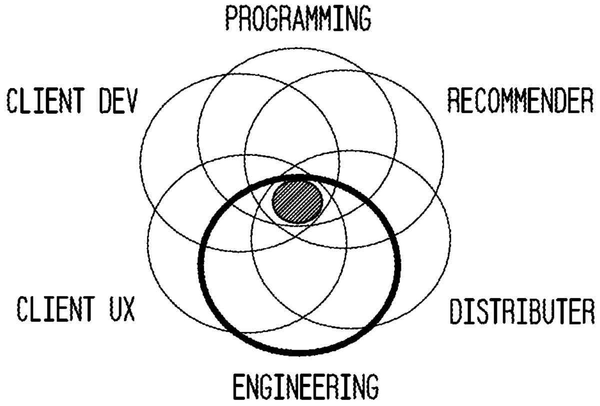

REPRESENTATION SOLUTION
- CHANNEL OVERVIEW INFORMATION, LIBRARY CATALOG AND CHANNEL CONTROL SETTINGS INCLUDING NAMES OF CHANNEL BASE RULE SETS AND 'PER SLIDER SETTINGS' VIA XML. REPRESENTATION PERMITS DOWNSTREAM USE OF SELECTED DATA ITEMS FOR DIFFERING USES.
- CHANNEL BASE RULE SETS AND 'PER SLIDER SETTING' RULES SETTINGS VIA CALLS TO RECOMMENDER APIs FROM SXM DASHBOARD

FIG. 35

```
<channel>
 <serialNumber>1234321</serialNumber>
 <channelKey>70son7</channelKey>
 <name>70's on 7</name>
 <!-- Overview Content Omitted -->

 <libraryCatalog>
  <!-- List of assets available for channel -->
 </libraryCatalog>

 <channelControlSettings>
  <!- Base rule set for channel -->
  <!-- List of sliders available for channel -->
 </channelControlSettings>

</channel>
```

OVERVIEW

CATALOG

SLIDERS

CHANNEL SPECIFICATION IS EXPOSED VIA PWSP AND IS USED FOR SEVERAL DIFFERENT PURPOSES:

- BY CLIENT DEVICE TO CONSTRUCT UX
- BY CLIENT DEVICE TO SET UP CONTROLS
- BY DISTRIBUTER TO KNOW HOW TO INSTALL/REMOVE RULESETS
- BY DISTRIBUTER TO KNOW CLIP LIBRARY FOR CHANNEL
- BY RECOMMENDER TO KNOW CLIP LIBRARY FOR CHANNEL

FIG. 36

```
  <serialNumber>1234321</serialNumber>
  <channelKey>70son7</channelKey>
  <name>70's on 7</name>
  <channelState>available</channelState>
  <!-- new, change, available, deleted, erased -->
  <description> Text about 70s on 7 </description>
  <coloration> Custom-10-SXM AGC ONLY'</coloration>
  <!-- various colorizations to be provided -->
  <entitlementPackage>
   <number>100</number>
   <number>200</number>
   <number>500</number>
  </entitlementPackage>
  <DRM>
<ProgramDMCA>
    <ir_Nav_Class>Restricted2</ir_Nav_Class>
    <Play_On_Select>Newest0</Play_On_Select>
    <Max_Fwd_Skips>5</Max_Fwd_Skips>
    <Max_Back_Skips>1</Max_Back_Skips>
    <Max_Fwd_Dur>12</Max_Fwd_Dur>
    <Max_Back_Dur>12</Max_Back_Dur>
   </ProgramDMCA>
  </DRM>
<defaultCrossfade>
    Datablob
 </defaultCrossfade>
<mmFieldValues>
    ...
 </mmFieldValues>
```

CHANNEL OVERVIEW PROVIDES GENERIC INFORMATION FOR THE CHANNEL:

- BY CLIENT DEVICE TO KNOW NAME OF CHANNEL, ENTITLEMENTS FOR VALIDATION, DMCA COMPLIANCE RULES
- BY DISTRIBUTER TO KNOW NAME OF OF CHANNEL, ENTITLEMENTS FOR VALIDATION DMCA COMPLIANCE RULES, STATUS OF CHANNEL, HOW TO COLORIZE CONTENT, DETAILS ON BASE RULE SET
- BY RECOMMENDER TO KNOW NAME OF CHANNEL, ATTRIBUTE DEFINITIONS DETAILS ON BASE RULE SET

FIG. 37

```
<libraryCatalog>
   <song>
    <sxmAutomationID>70son7-N-432057-001</sxmAutomationID>
    <artist>Dire Straits</artist>
    <title>Romeo and Juilet</title>
   </song>
   <song>
    <sxmAutomationID>70son7-N-112344-002</sxmAutomationID>
    <artist>Dire Straits</artist>
    <title>Telegraph Road</title>
   </song>
   <song>
    <sxmAutomationID>70son7-D-LE124333-001</sxmAutomationID>
    <artist>The Beatles</artist>
    <title>Mrs Robinson</title>
   </song>
  </libraryCatalog>
```

CHANNEL LIBRARY CATALOG PROVIDES GENERIC INFORMATION FOR THE ASSETS IN THE CHANNEL:

- BY DISTRIBUTER TO KNOW LIST OF ASSETS IN THE CHANNEL
- BY RECOMMENDER TO KNOW LIST OF ASSETS IN THE CHANNEL

FIG. 38

```
<channelControlSettings>
  <baseruleset>70son7</baseruleset>
  <skinArt></skinArt>
  <controlSetting>
    <controlOrdinal>0</controlOrdinal>
    <controlName>Tempo</controlName>
    <controlMapping>pureRulebased</controlMapping>
    <controlType>discrete</controlType>
    <controlWeight>10</controlWeight>
    <controlArt></controlArt>
    <titleArt></titleArt>
    <term>
     <ordinal>0</ordinal>
     <name>Chillin'</name>
     <TermArt></TermArt>
     <ruleset>70son7-chillin</ruleset>
    </term>
    <term>
     <ordinal>1</ordinal>
     <name>Mixed Bag<name>
     <TermArt></TermArt>
     <ruleset>70son7-chillingrovin</ruleset>
    </term>
    <term>
     <ordinal>2</ordinal>
     <name>Groovin</name>
     <TermArt><TermArt>
     <ruleset>70son7-groovin</ruleset>
    </term>
    <defaultOrdinal>1<defaultOrdinal>
    <defaultRuleset>70son7-tempo</defaultRuleset>
<controlSettings>
```

CHANNEL CONTROL SETTING PROVIDES INFORMATION FOR THE SLIDERS

- BY CLIENT DEVICE TO KNOW NAME OF SKINS TO USE, AND IMAGES FOR SLIDERS, SLIDER LABELS AND VALUE FOR EACH SLIDER POSITION
- BY DISTRIBUTER TO KNOW NAME OF RULE SETS FOR EACH SLIDER POSITION TO PROVIDE TO RECOMMENDER DURING CHANGES
- BY RECOMMENDER TO KNOW NAME OF RULE SETS FOR EACH SLIDER POSITION FOR VALIDATION

FIG. 39

```
<channelControlSettings>
  <baseruleset>70son7</baseruleset>
  <skinArt></skinArt>
  <controlSetting>
    <controlOrdinal>0</controlOrdinal>
    <controlName>Tempo</controlName>
    <controlMapping>pureRulebased</..>
    <controlType>discrete</controlType>
    <controlWeight>10</controlWeight>
    <controlArt></controlArt>
    <titleArt></titleArt>
    <term>
     <ordinal>0</ordinal>
     <name>Chillin'</name>
     <TermArt></TermArt>
     <ruleset>70son7-chillin</ruleset>
    </term>
    <term>
     <ordinal>1</ordinal>
     <name>Mixed Bag<name>
     <TermArt></TermArt>
     <ruleset>70son7-chillingrovin</ruleset>
    </term>
    <term>
     <ordinal>2</ordinal>
     <name>Groovin</name>
     <TermArt><TermArt>
     <ruleset>70son7-groovin</ruleset>
    </term>
    <defaultOrdinal>1<defaultOrdinal>
    <defaultRuleset>70son7-tempo</defaultRuleset>
<controlSettings>
```

```
<skinArt>
    <encrypted>false</encrypted>
    <size>THUMBNAIL</size>
    <type>IMAGE</type>
    <id>123</id>
<url>http://www.siriusxm.com/personalization/
skins/70son7-0-skin.jpg</url>
</skinArt>
```

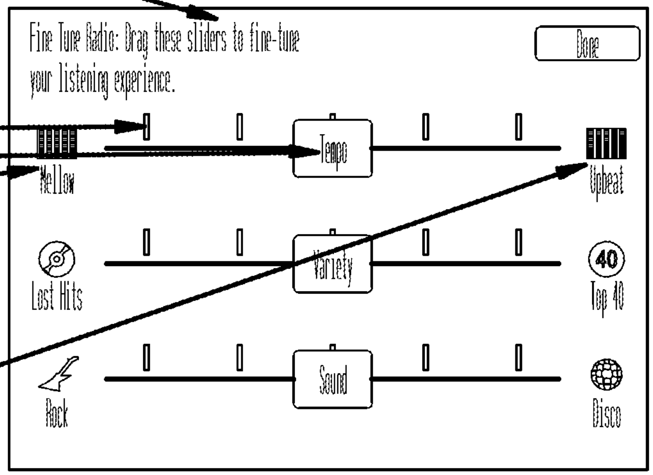

pureRuleSet FOR USER CONTROLS (SLIDERS), DISCRETE

FIG. 40

```
<channelControlSetting>
  <baseruleset>70son7</baseruleset>
  <skinArt></skinArt>
  <controlSetting>
    <controlOrdinal>0</controlOrdinal>
    <controlName>Tempo</controlName>
    <controlMapping>pureRulebased</controlMapping>
    <controlType>discrete</controlType>
    <controlWeight>10</controlWeight>
    <skinArt></skinArt>
    <titleArt></titleArt>
    <term>
     <ordinal>0</ordinal>
     <name>Chillin'</name>
     <TermArt></TermArt>
     <ruleset>70son7-chillin</ruleset>
    </term>
    <term>
     <ordinal>1</ordinal>
     <name>Mixed Bag<name>
     <TermArt></TermArt>
     <ruleset>70son7-chillingrovin</ruleset>
    </term>
    <term>
     <ordinal>2</ordinal>
     <name>Groovin</name>
     <TermArt><TermArt>
     <ruleset>70son7-groovin</ruleset>
    </term>
    <defaultOrdinal>1<defaultOrdinal>
    <defaultRuleset>70son7-tempo</defaultRuleset>
<controlSettings>
```

default channel ruleset:

developer.echonest.com/api/v4/playlist/dynamic/stee
r?session=session_id&enable_ruleset=70son7

70s tempo rule set:
developer.echonest.com/api/v4/playlist/dynamic/steer?session=session
_id&enable_ruleset=70son7-chillin 70s tempo default rule set:
developer.echonest.com/api/v4/playlist/dynamic/steer?session=session
_id&enable_ruleset=70son7-tempo NOTE: DUE TO DIFFERING EXAMPLES
USED SOME TERMS DO NOT ALIGN UP
WITH PRIOR SLIDES.

pureRuleSet FOR USER CONROLS (SLIDERS), DISCRETE

SYSTEMS AND METHODS FOR AUDIO ATTRIBUTE MAPPING

CROSS REFERENCE TO RELATED APPLICATIONS

This application is a US national stage application of PCT/US2013/029721, filed on Mar. 7, 2013, and which published as WO 2013/134567, which itself claims the benefit of U.S. Provisional Patent Application No. 61/607,532, filed on Mar. 6, 2012, each of which is hereby fully incorporated herein by this reference.

TECHNICAL FIELD

The present invention relates to digital media delivery and playback, and in particular to systems and methods for implementing detailed audio attribute mapping in personalized media delivery systems.

BACKGROUND OF THE INVENTION

Many radio and audio services utilize a scheduling system to help automate the generation of audio element ordering or playlists. These systems rely on attributes for different kinds of audio, primarily songs. Such attributes can be, for example, a mixture of (i) publicly available data such as, for example, Genre, Classification, Category or Tempo, on the one hand, as well as (ii) custom defined attributes such as, for example, "Groovy", "Discovery", etc. Typically, such scheduling systems will use a rich set of attributes to provide powerful and fine granular control over which songs may be algorithmically recommended.

In a customized radio streaming service, the end-user may be given the ability to refine or select programming which is presented to them. One approach to achieving this is to present the user with a range of controls which may be mapped to attributes contained within the scheduling system.

What is needed in the art are systems and methods for the representation and delivery of attributes to effect a personalized server, methods to map controls to these attributes, and also provides methods to simplify the controls presented to the end-user and which attributes they may map to.

SUMMARY OF THE INVENTION

In a customized content delivery service, such as, for example, a personalized music streaming service delivered over various wireless networks, an end-user can be given the ability to refine or select programming which is presented to them. One approach to achieving this is to present the user with a range of user preference controls, such as sliders, which can be mapped to attributes contained within the scheduling system. Thus, systems and methods are presented for the representation and delivery of such attributes to effect a personalized server, to map controls to these attributes, and to simplify the controls presented to an end-user. In exemplary embodiments of the present invention a song or audio content recommender may use channel specifications and a user profile, as dynamically modified and updated by user preferences expressed via said user preference controls, to generate user and channel specific playlists, to give a user the personalized audio experience he or she actually desires.

BRIEF DESCRIPTION OF THE DRAWINGS

Reference will now be made, by way of example, to the accompanying drawings which show example embodiments of the present invention, and in which:

FIG. 7 shows the core elements that comprise a channel specification in greater detail according to an exemplary embodiment of the present invention;

FIG. 15 shows a simple one to one mapping of fields and attributes from the content distribution system to client user preference controls on the client device using discrete values according to an exemplary embodiment of the present invention;

FIG. 16 shows a union mapping of fields and attributes from the content distribution system to client user preference controls on the client device according to an exemplary embodiment of the present invention;

FIG. 17 shows the use of the matrix of FIG. 16 based mapping between fields and attributes from the content distribution system to client user preference controls on the client device according to an exemplary embodiment of the present invention;

FIG. 19 shows the use of spider plots across a set of control settings (sliders) to permit a user to define a personalized experience according to an exemplary embodiment of the present invention;

FIG. 21 depicts exemplary samples of core elements of an exemplary channel specification according to an exemplary embodiment of the present invention;

FIG. 23 depicts an exemplary "pureRuleset" mapping for continuous user controls (sliders) according to an exemplary embodiment of the present invention;

FIG. 25 depicts an exemplary "pureRuleset" mapping for discrete user controls according to an exemplary embodiment of the present invention;

FIG. 26 depicts an exemplary mapping between channel control settings and an exemplary rule set for discrete controls according to an exemplary embodiment of the present invention;

FIGS. 29 through 34 illustrate the contributions of User Interface, Client Development, Recommender, Distributer, Programmer and Engineering components of the exemplary content distribution system of FIG. 28;

FIG. 35 depicts details of an exemplary Channel Specification according to an exemplary embodiment of the present invention;

FIG. 36 depicts details of an exemplary Channel Overview according to an exemplary embodiment of the present invention;

FIG. 37 depicts details of an exemplary Channel Library Catalog according to an exemplary embodiment of the present invention;

FIG. 38 depicts details of an exemplary Channel Control Setting according to an exemplary embodiment of the present invention;

FIG. 39 illustrates how an exemplary rule set for user controls (here sliders) for a discrete case maps to user controls according to an exemplary embodiment of the present invention;

FIG. 40 illustrates how the exemplary rule set for user controls (here sliders) for a discrete case maps to various Recommender provided rule sets according to an exemplary embodiment of the present invention;

DETAILED DESCRIPTION OF THE INVENTION

Figure 1:
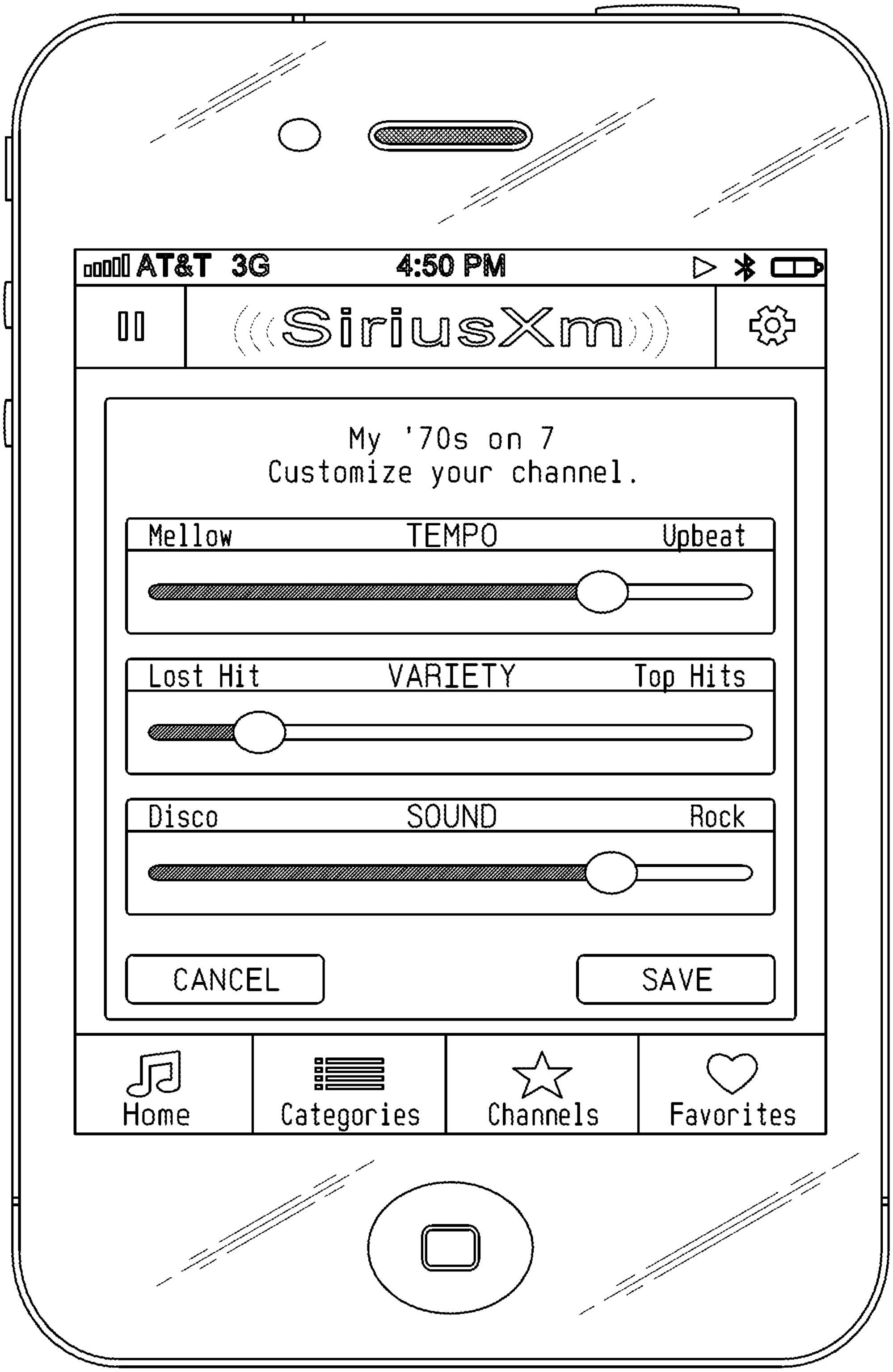
FIG. 1 provides an overview of a personalized radio user experience on a mobile client device according to an exemplary embodiment of the present invention.

In exemplary embodiments of the present invention a user can access a personalized media delivery system on a client device, such as, for example, a handheld device such as a smartphone, tablet, or other portable device. Such an exemplary device is shown in FIG. 1. As shown, for each of a variety of channels provided by the media delivery service, the device, or an application running on the device, can provide a user with a number of interactive controls, such as, for example, sliders, by means of which a user can make choices regarding the type, genre and feel of the music he or she wants to hear. For example, as shown in FIG. 1, the channel "My 70s on 7" is playing. For this channel, three sliders are provided, namely "Tempo", "Variety" and "Sound." For "Tempo", a user can choose between, for example, mellow, upbeat, or any point in between. For "Variety" a user can decide whether to have a narrower, "top hits" type listening experience, or whether to widen the universe of possible songs, and pick up lesser known "lost hits" as well. Finally, for "Sound" a user can choose what type of 70s music he or she wants to hear—whether more of the 70s rock sound, or whether more disco, or some proportional mix. By interacting with the various sliders, or equivalent control devices, a user can truly personalize their experience within the larger universe of the given channel. Various methods and systems of the present invention detail how this can be implemented and supported at the back end, by detailing how, using a set of relatively simple interactive user interface devices, such as sliders for example, a user's choices can be processed to deliver a highly personalized listening experience.

Exemplary Media Delivery System

Figure 2:
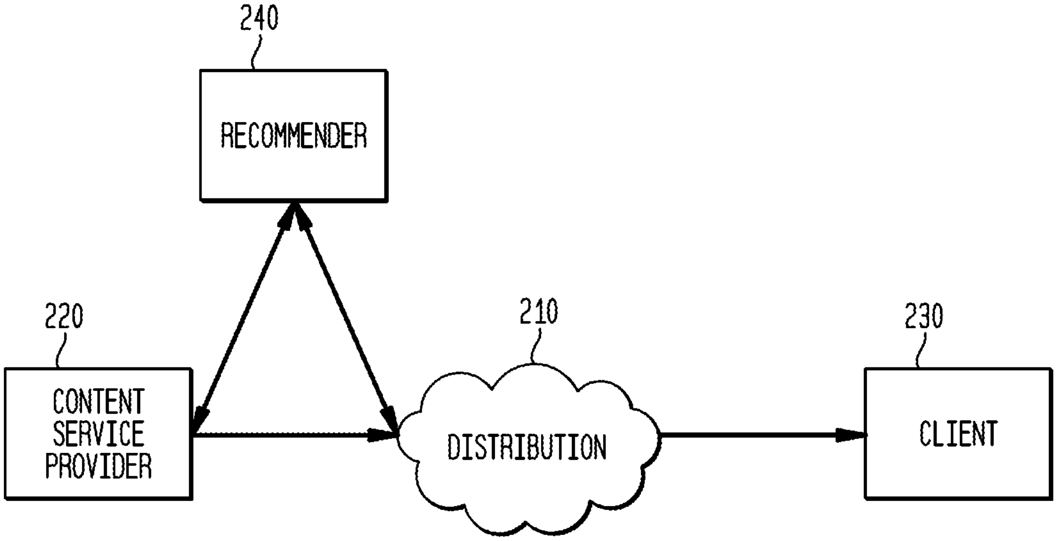
FIG. 2 shows a systems approach to the delivery of a personalized audio experience based on channels and users specified preferences according to an exemplary embodiment of the present invention.

FIG. 2 illustrates an exemplary media delivery system that can provide a personalized playlist to a user. In exemplary embodiments of the present invention, such a personalized user experience can, for example, be provided by an integrated system comprising a content service provider 220, a distribution service 210, a recommendation service 240, and a client device 230. These functional elements can be connected to one another using a communications network and traditional network communications protocols such as, for example, TCP/IP. Additional details of these functional elements are provided in FIGS. 3-5, next described.

Figure 3:
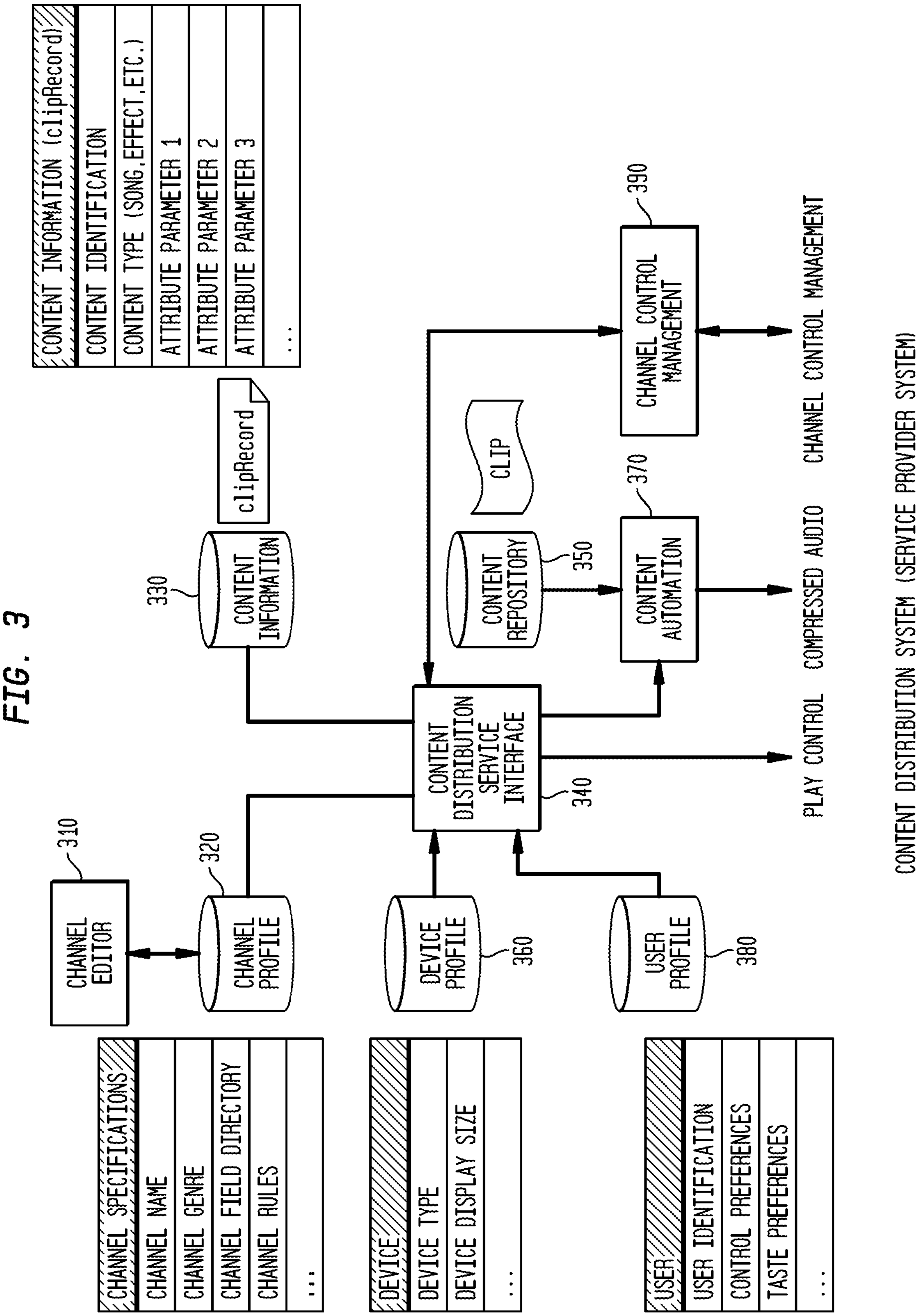
FIG. 3 shows system details of a content distribution system to provide a channel based personalized audio experience according to an exemplary embodiment of the present invention.
Figure 4:
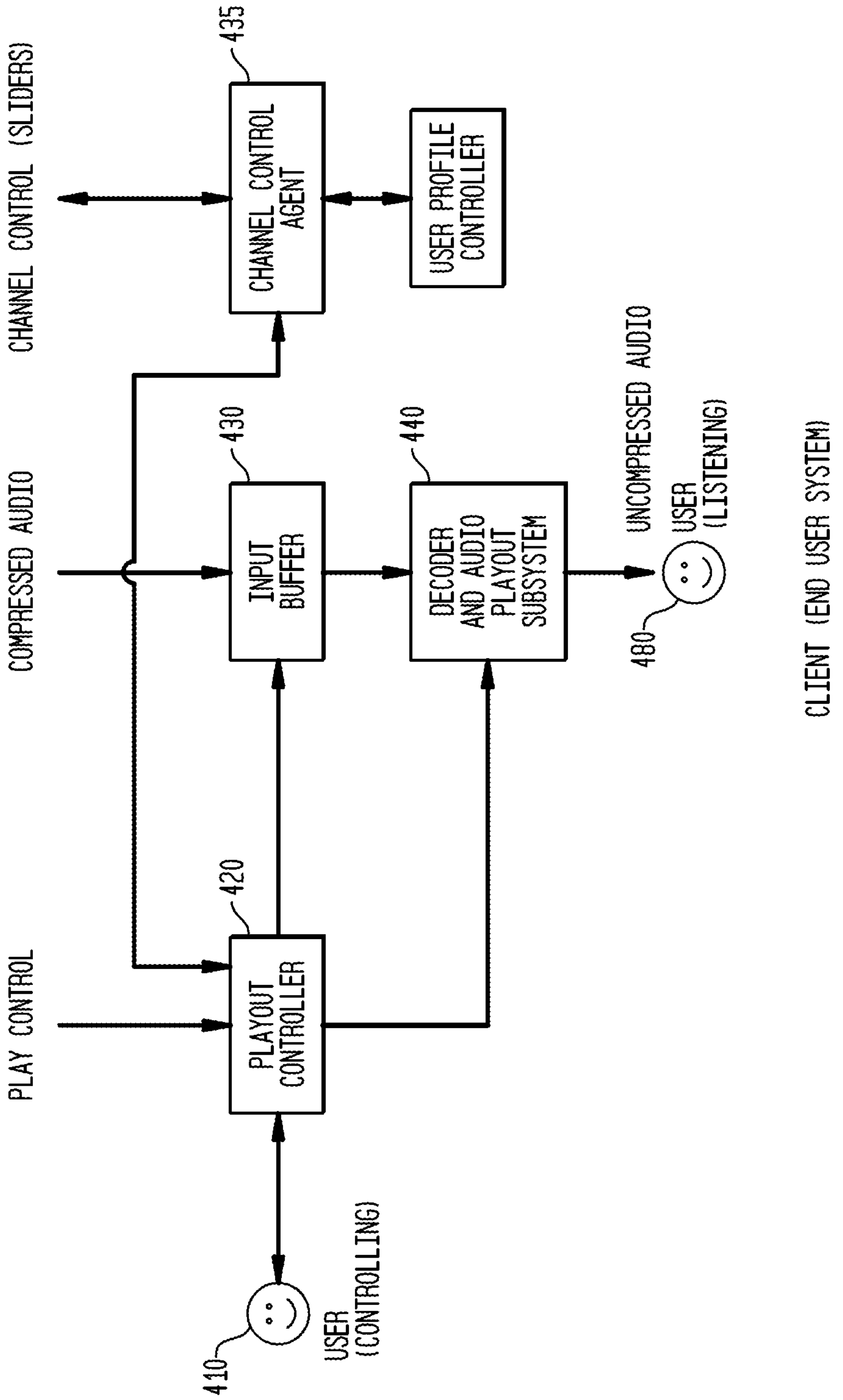
FIG. 4 shows system details of the client end device capable of providing a channel based personalized audio experience according to an exemplary embodiment of the present invention.
Figure 5:
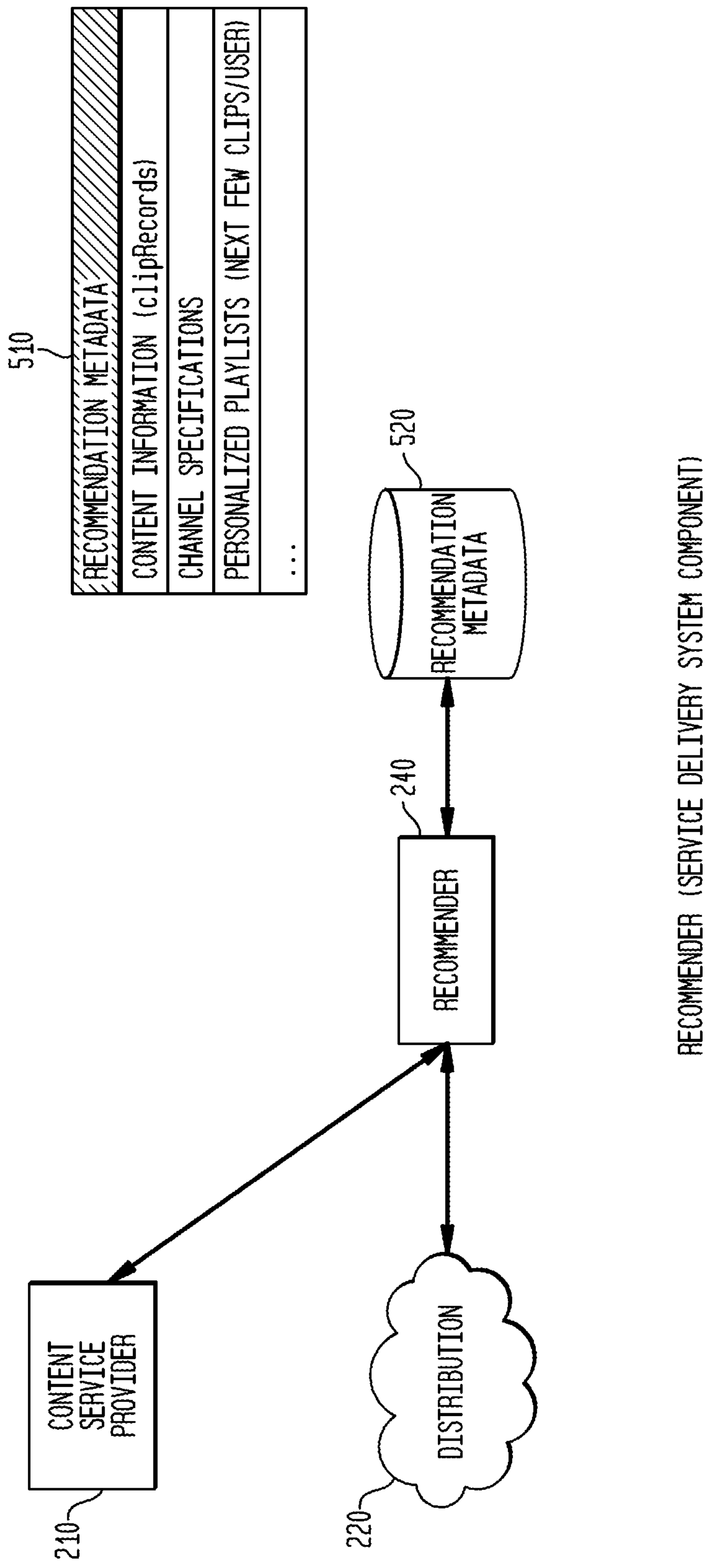
FIG. 5 shows systems details of a recommender that furnishes recommendations as a service (prior art)

FIGS. 3-5 provide additional details of the exemplary system of FIG. 2. FIG. 3, an exemplary Content Distribution System, is essentially a blow-up of Distribution System 220 of FIG. 2. With reference thereto, there is a Channel Editor 310 which can create or modify a Channel Profile 320. A Channel Profile can include Channel Specifications as shown, such as, for example, Name, Genre, Field Directory, Rules, etc., for each channel being offered. There is also, notably, a Device Profile 360, which comprises details regarding various client devices used in deciding what and when to download content to them, and User Profiles 380. These include details about a user and his or her preferences, which can be used to tailor make playlists that he or she will want to hear. In addition, there is a clipRecord, or Content Information database which stores various details, attributes and characterizations of the various content clips "Clips" that are stored in Content Repository 350. Using the various attributes stored in the various clip records, Channel Profile 320 and User Profile 380, Recommender 240 (FIG. 2) can generate playlists for each channel for each user of the system. As described in more detail below, the various Attribute Parameters stored in the clipRecords which comprise the Content Information database 330, are the data elements that are mapped to various user interactive devices, such as sliders, on a Client Device, and regarding which a user expresses his or her preferences using such sliders. Following such generated playlists, the Content Distribution System causes Content Automation 370 to send, for example, Compressed Audio to a Client Device (as shown in FIG. 4). In addition, Content Distribution System 340 may send Play Control data/instructions to the Client Device, and Channel Control Management 390 may send Channel Control Management Data to the Client Device.

FIG. 4 is a magnification of the Client Device 230 of FIG. 2. With reference thereto, on Client Device 230, via transmission over the Content Distribution System shown in FIG. 3, Play Control data may be received by Playout Controller 420, and Compressed Audio may be received by Input Buffer 430. The compressed audio is sent to Decoder and Audio Playout Subsystem 440, which decodes it and plays it as uncompressed audio to a User 480 (in his "listening" function). At the same time, the User qua controller 410 interacts with Channel Control devices, such as sliders (as shown in FIG. 1, for example) and these interactions may be (i) stored in Channel Control Agent 435 and User Profile Controller, and (ii) passed, via a Content Distribution System as shown in FIG. 3, to Channel Control Management 390 (FIG. 3), and ultimately used to modify User Profile 380 (FIG. 3), all as detailed in FIG. 10, at 1030 through 1060, as described below.

Finally, FIG. 5 is essentially an expanded view of Recommender 240 of FIG. 2. With reference thereto, FIG. 5 is similar to FIG. 2, except that the Client Device is not shown, while Recommendation Metadata database 520 is shown. Recommendation Metadata database 520 stores Recommendation Metadata 510, which may include Content Information regarding clips, Channel Specifications, and Personalized Playlists. As described in detail below, by capturing interactions between the user and various user preference control devices in terms of clip attributes used in the clipRecords, and sending that data from a Client Device 230 to Recommender 240, Personalized Playlists generated by Recommender 240 can very granularly, and very accurately, track a given user's preferences, and provide him or her with a truly personalized listening experience.

Figure 6:
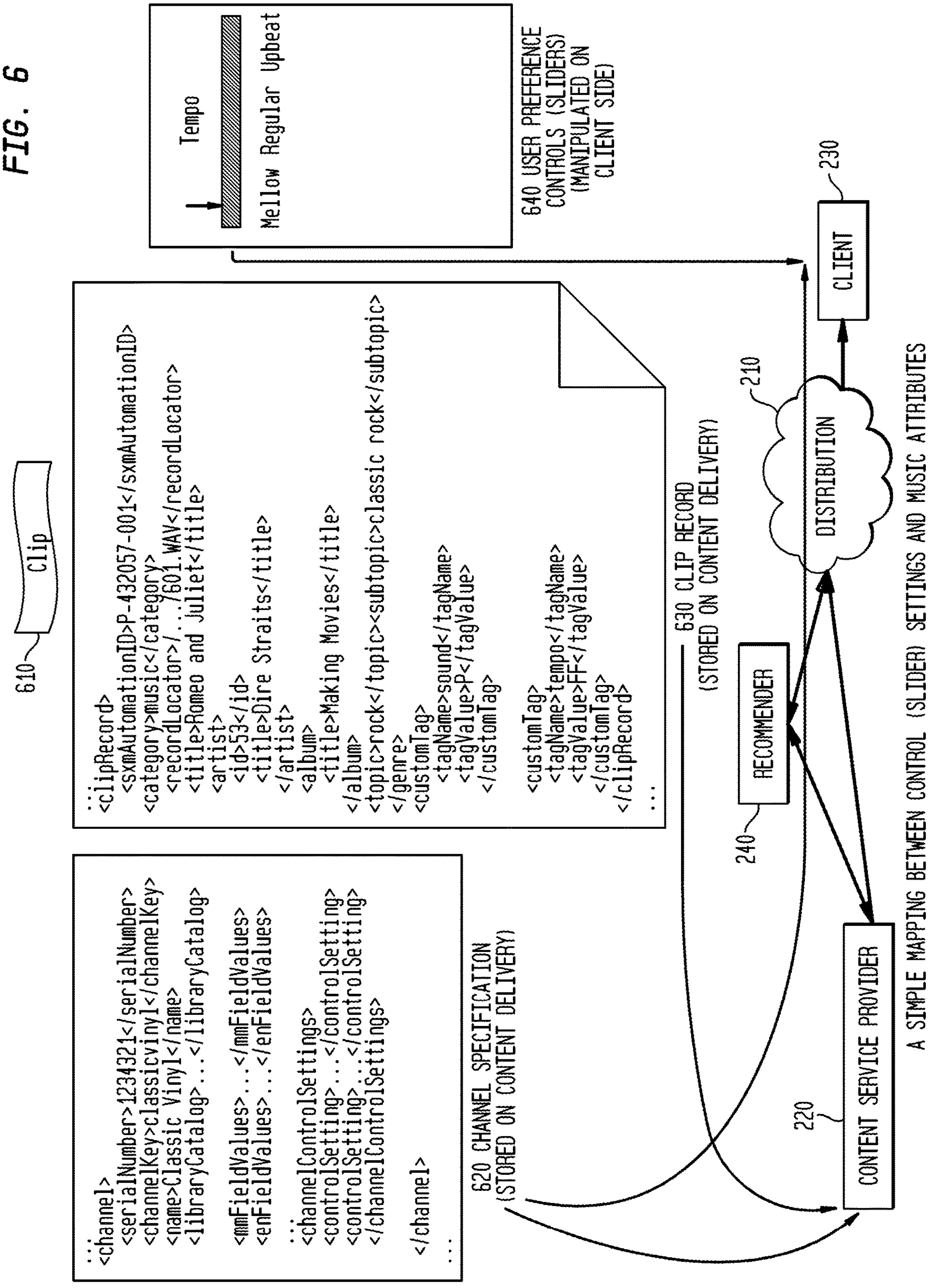
FIG. 6 Shows the representation of a channel specification on a content distribution system, the association of fields from the channel specification in the content distribution system with audio clips, and the representation of control values from these channel specifications according to an exemplary embodiment of the present invention.

The delivery of content from a Content Service Provider to various other functional elements is illustrated in FIG. 6. As shown, for each channel there may be channel specification information 620. Channel specification information 620 may be maintained by the Content Service Provider and communicated to the various parties via messaging protocols as described with reference to FIGS. 11-12. In FIG. 6 a sample service specification written in the extensible markup language (XML) is provided. Additionally, for each audio clip 610 there can be a clip record 630 that contains various data about that clip. It may, for example, contain "standard" metadata, such as, song title, artist, album and genre, and may also contain custom data, defined by custom tags, as follows:

```
<customTag>
        <tagName>sound</tagName>
        <tagValue>P</tagValue>
    </customTag>
    <customTag>
        <tagName>tempo</tagName>
        <tagValue>FF</tagValue>
    </customTag>
```

In exemplary embodiments of the present invention it is these custom tags that can be used by a recommender to select songs based on settings in sliders and what those slider positions are mapped to. Thus, as shown, User Preference Controls 640, comprising, for example, a slider, allow a user to control what tempo of song he or she prefers to hear. This value can then be used by the recommender to filter songs, by accessing the value of custom tag "Tempo" in the clip record 630 for each audio clip in a library associated with a given channel. It is noted that Content Delivery, as used both in FIG. 6 and herein in general, refers to the delivery of audio content, e.g. songs interstitials, etc., to a user.

It is further noted that, in general, in a content distribution system such as is depicted in FIG. 3, there can be a Channel Profile 320 which defines a unique channel. Thus, in exemplary embodiments of the present invention, the personalization experience is with reference to a particular channel, and as a result, each channel has a set of sliders. However, in some exemplary embodiments sliders may be duplicated for distinct channels (the same slider specification used in two different channels), for programming reasons, or utility. Thus, while in many embodiments sliders or other user preference control devices are channel specific, one can easily imagine settings related to, for example, just using skip, channel change, or social media elements that are not defined within a channel, and thus useable across some, many, or even all, channels in an exemplary system. Exemplary social media elements may include a "like" count on Facebook or other social media platforms, a "hot" or "top 100" on music downloading, sales or subscription services, a number of searches on Google, a trend value on a search engine or cultural indicator, etc.

FIG. 7 depicts additional details regarding the structure of the Channel Specification (620 in FIG. 6) data. As shown, there can be a Sample Catalog Specification 710, Sample Field And Attribute Definitions 720, and Channel-Control Settings Specification 730. Each of these is a part of the Channel Specification of FIG. 6. Catalog Specification 710 for a channel lists all of the audio content (clips) that are available to that channel.

Figure 8:
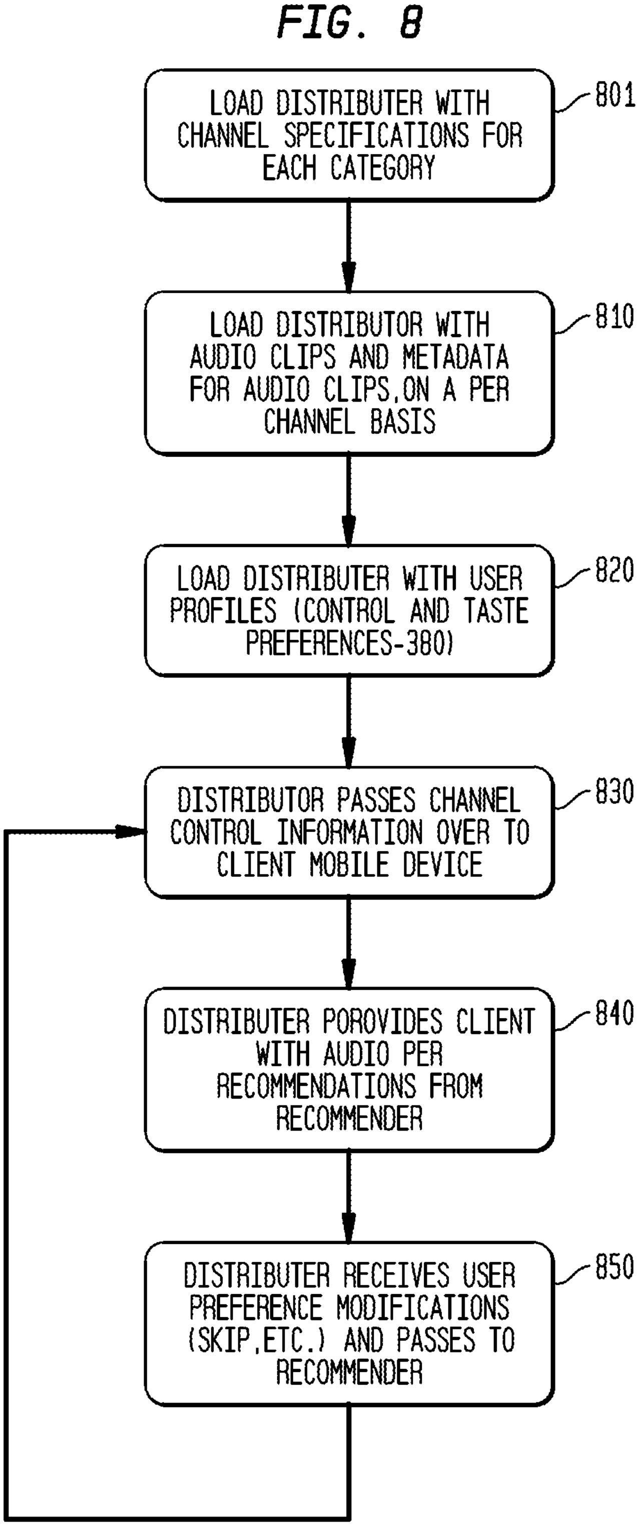
FIG. 8 shows an exemplary high level process by which a content distribution system loads channel specification information to the recommender and how the recommender then makes recommendations according to an exemplary embodiment of the present invention.
Figure 9:
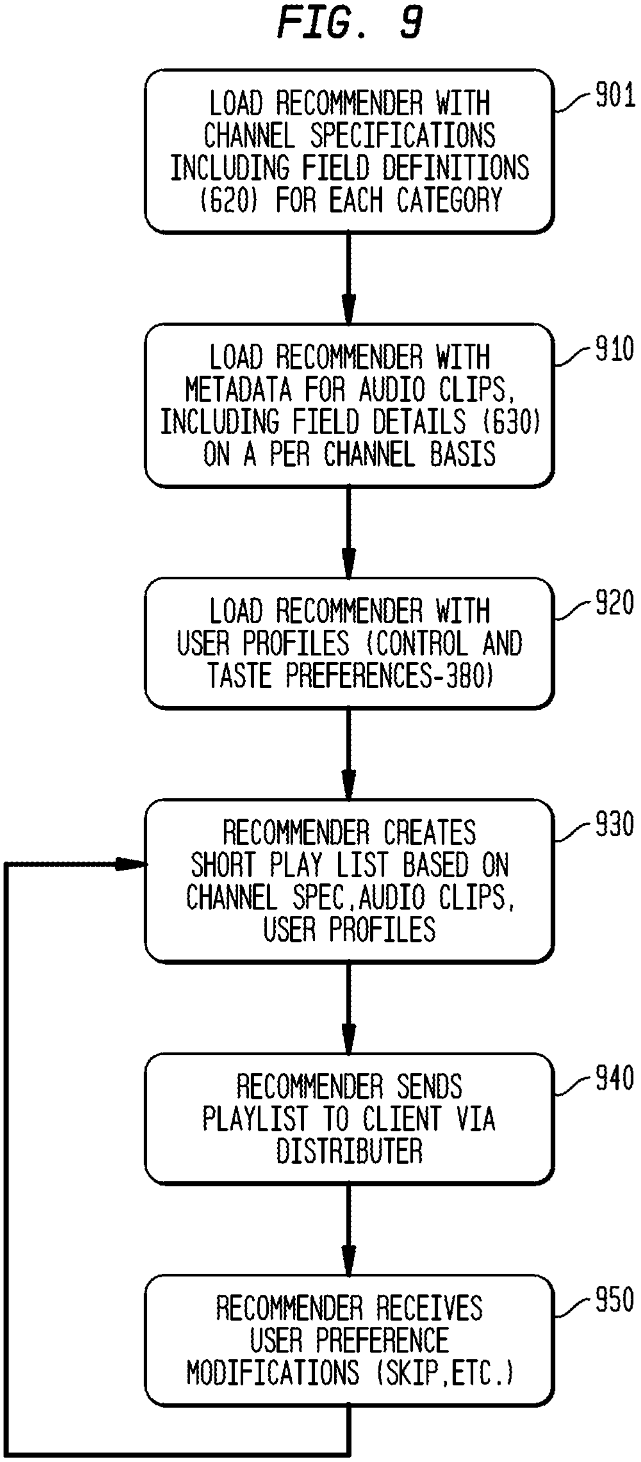
FIG. 9 shows an exemplary high level process by which the content distribution system loads channel specification information and audio clip and audio metadata to the distributer and how the distributer coordinates delivery of content to the client based on recommendations from the recommender according to an exemplary embodiment of the present invention.
Figure 10:
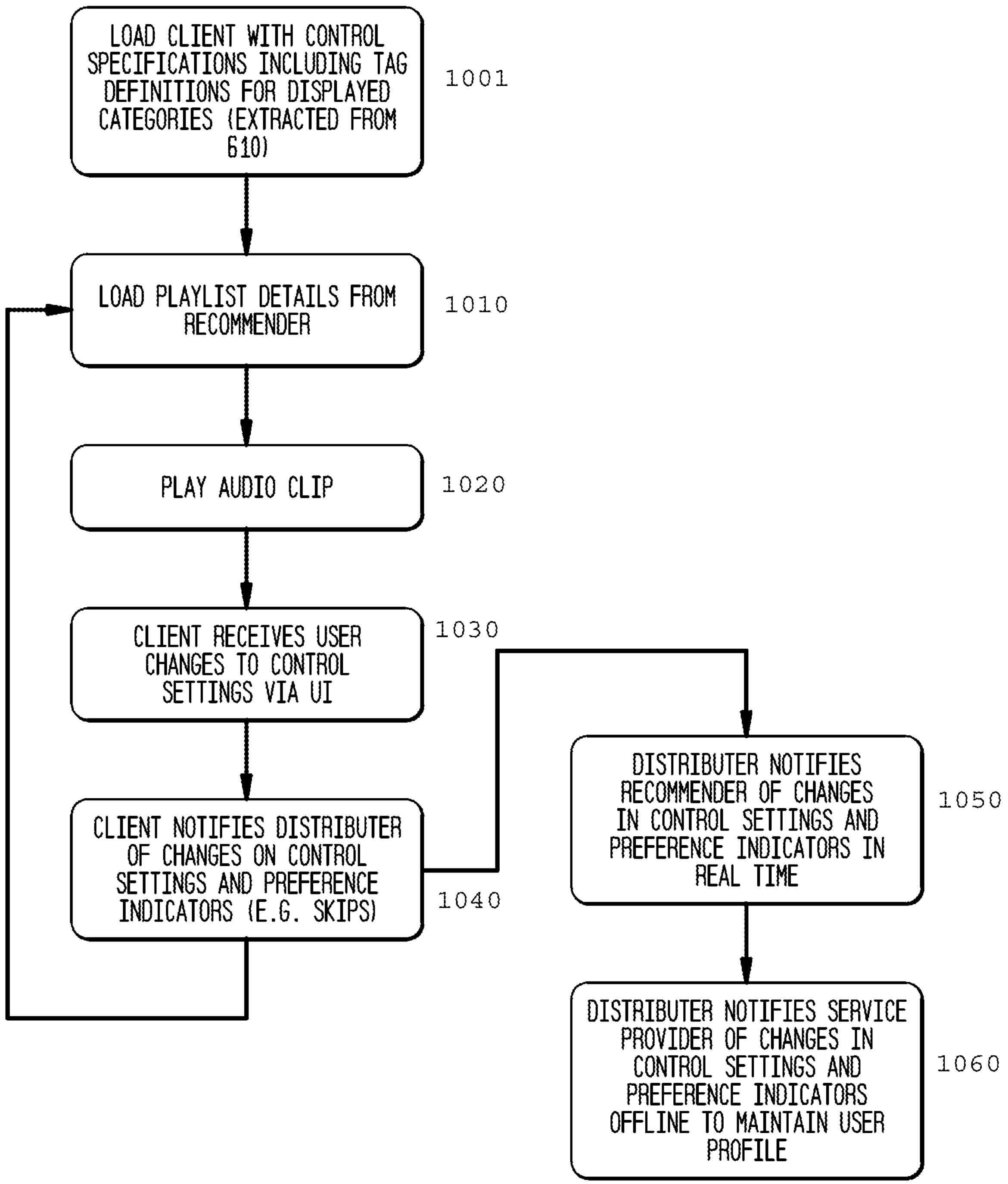
FIG. 10 shows an exemplary high level process by which the content distribution system loads channel specification information to the client and how the client notifies the content distribution system of their changing interests either directly (by control settings) or indirectly (by skipping songs etc.) according to an exemplary embodiment of the present invention.

The overall process for populating the Distributer, Recommender and Client Device in various exemplary embodiments of the present invention is depicted in FIGS. 8, 9 and 10, next described. With reference to FIG. 8, an exemplary process for loading a Distributer with channel and content information is depicted. At 801 the Distributer can be loaded with channel specifications for each category, and at 810 the Distributer can be further loaded with both audio clips and metadata for those audio clips, on a per channel basis. At 820 the Distributer can be further loaded with user profiles. Next, beginning a loop, at 830 the Distributer can pass channel control information over to a Client Mobile Device, then at 840 the Distributer provides client (Client Mobile Device) with directions on which audio clips to play (the clips may be hosted in a content delivery network managed by the distributer, for example) as per recommendations from the Recommender, and at 850 the Distributer can receive user preference modifications (skips, etc.) and pass them to the Recommender. From 850 flow returns to 830, and a new song or clip can be played to the user.

It is noted that the division of labor, and thus the various functions performed by each of Distributer, Recommender and Provider as described herein are logical, and merely exemplary. Various exemplary embodiments of the present invention may combine some or all of these functions into one single actor or entity, or divide any of them into multiple actors or entities, all being within the scope of the present invention.

FIG. 9 illustrates activity involving an exemplary recommender according to an exemplary embodiment. This activity includes loading a recommender with channel and content information and making recommendations. At 901 the recommender can be loaded with channel specifications including field definitions (620) for each category, and at 910 the recommender can be loaded with metadata for audio clips, including field details (630), on a per channel basis. At 920 the recommender can be loaded with, for example, user profiles (control and taste preferences—380). Using this data, at 930 the recommender can create a short playlist for a given channel based on a channel specification, audio clips, and user profiles. At 940 the recommender can send the playlist to the client device via the distributer, and finally, at 950, the recommender can receives user preference modifications (skips, etc.). From 950, process flow can return to 930, and a new short playlist can be generated.

FIG. 10 depicts exemplary process flow for loading a Client Device with channel control (e.g., slider) information, and the handling of control (e.g., slider) settings information (i) as modified by a user on the Client Device, and (ii) once that information is passed to a distributer.

Beginning at 1001 in FIG. 10, the Client Device (simply referred to as "Client" in most of the figures) can be loaded with Control Specifications, including tag definitions for displayed categories (extracted from audio clip 610). At 1010 a loop begins where playlist details from the Recommender can be loaded, and at 1020 an audio clip can be played to a user on the Client Device. As the clip plays, or afterwards, at 1030, the Client Device receives user changes to control settings via a User Interface. At 1040, the Client Device notifies the Distributer of changes in control settings and preference indicators (e.g., skips), and process flow returns to 1010, where further playlist details are loaded, and additional audio clips can be played. Meanwhile, from 1040, process flow also moves to 1050, a shown, where the user changes can be communicated upstream for back-end processing and implementation. Thus, at 1050 the Distributer can, for example, notify the Recommender of changes in control settings and preference indicators in real time, and finally, at 1060, the Distributer can notify the Service Provider of changes in control settings and preference indicators offline to update/maintain a User Profile. Thus, in exemplary embodiments of the present invention, a User Profile is a dynamic data set, and it can continually change as a user interacts with the User Preference Controls. It is noted that the user profile may contain a variety of data elements: user preferences for slider (or other interactive device) settings, skips and song preferences (as indicated via the UI), channel favorite presets, social media settings, etc.

Exemplary Communications Between System Elements

Figure 11:
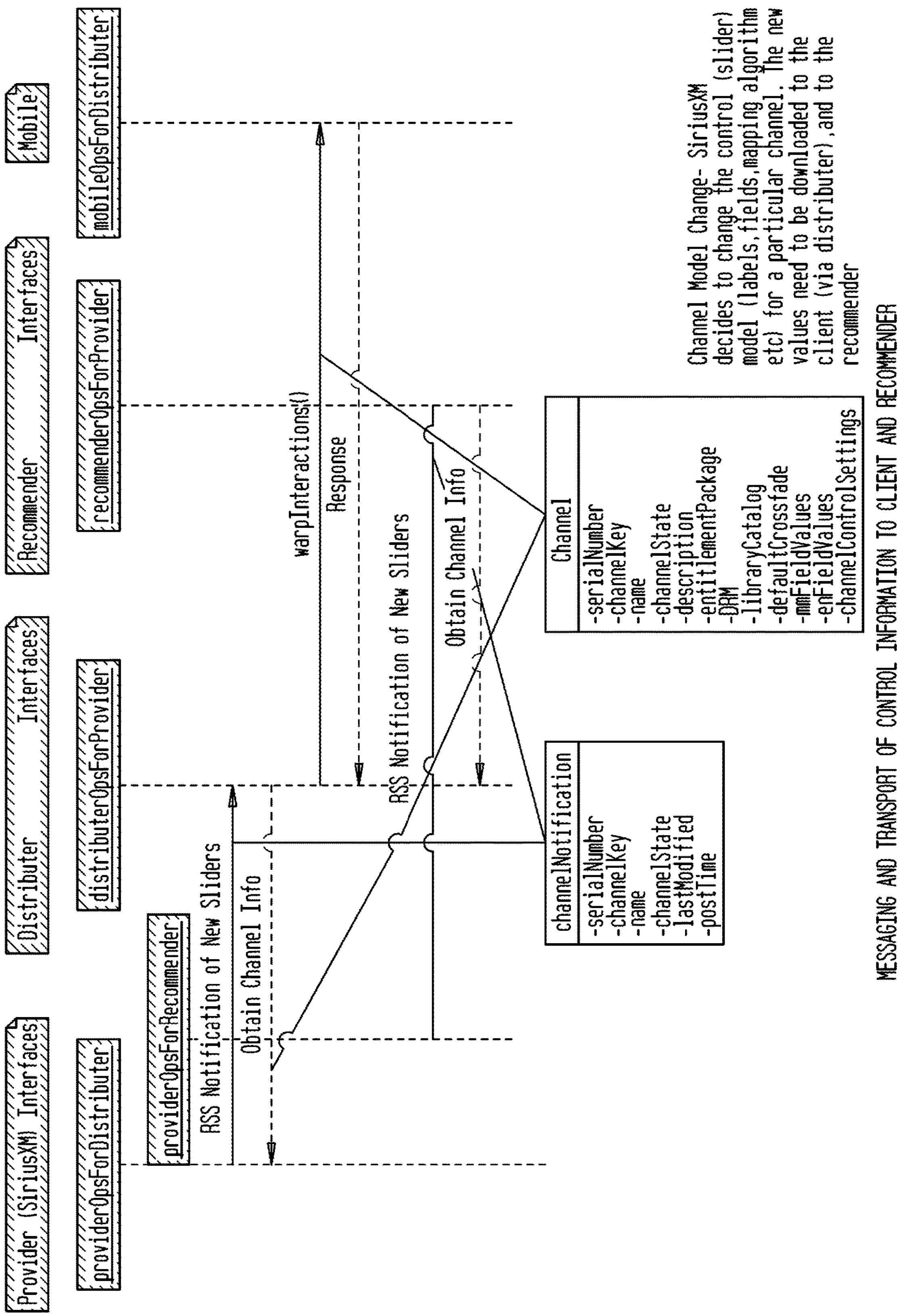
FIG. 11 shows exemplary messaging and the transport of control information to the client and recommender according to an exemplary embodiment of the present invention.
Figure 12:
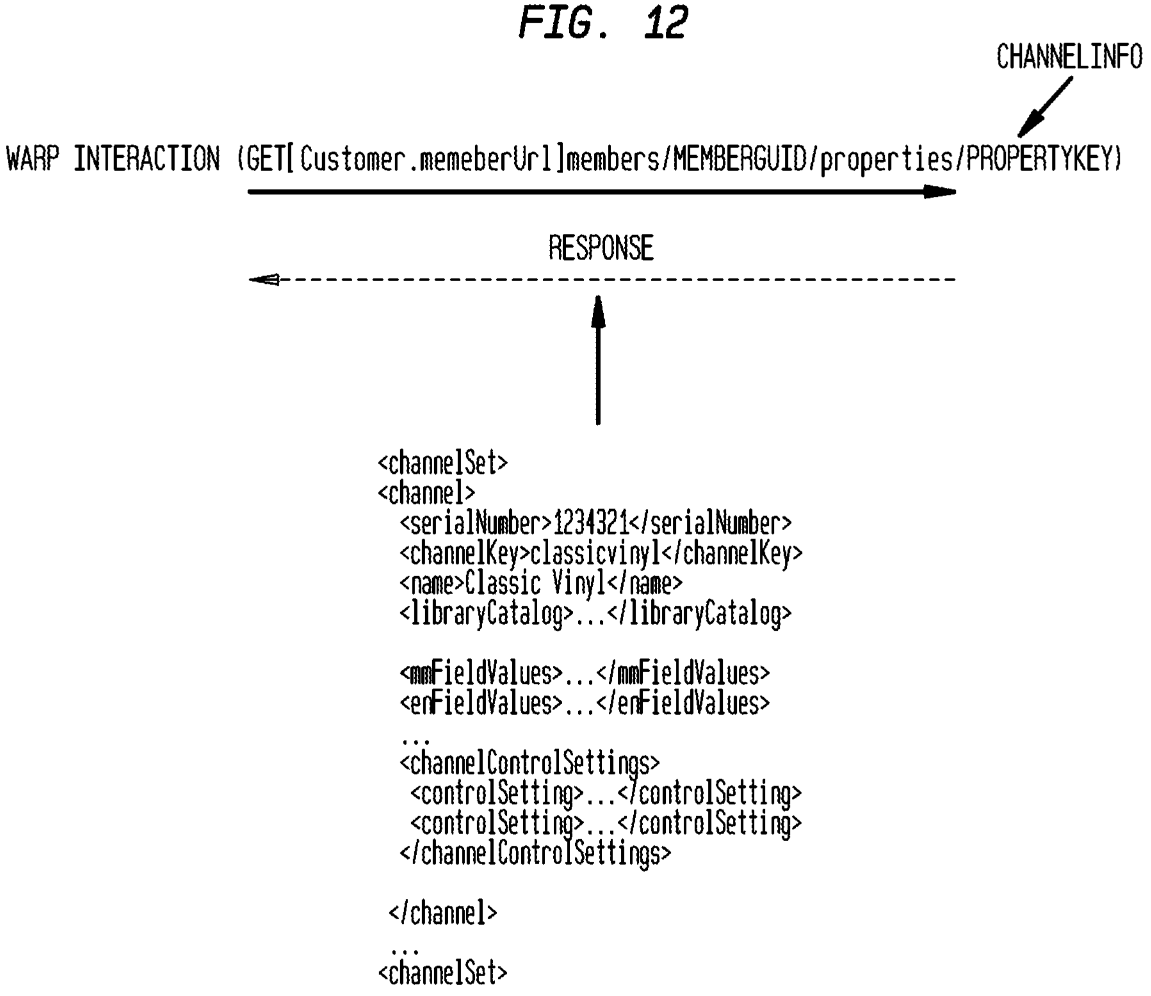
FIG. 12 shows example transport of messages using a distributer—requesting channel info using Omnifone™ WARP according to an exemplary embodiment of the present invention.

FIGS. 11 and 12 illustrate the communication of information to other functional elements for the case of updating Channel Information to a Recommender and to a Client Mobile Device. In the example illustrated in FIG. 11, there is a Service Provider (SiriusXM), a Distributer, a Recommender, and a Mobile Client Device. As noted above, these functionalities are logical, and need not be so divided. The illustrated example is based on a personalized music service that Sirius XM Radio is contemplating providing, and contemplates using a Distributer to deliver the content to users, and a Recommender to generate and manage content playlists. As noted therein, FIG. 11 illustrates what occurs when a Provider (e.g., SiriusXM) decides to change a control model for a particular channel, such as, for example, changing the labels, fields, mapping algorithms, etc. for a given slider associated with that particular channel. In such case the new values for these data items need to be downloaded both to the Client or Mobile Device, and to the Recommender. With reference thereto, FIG. 11 shows a sequence diagram for the interaction between the functional components, while FIG. 12 shows how the data might be passed as messages between the Distributer and the Client over a typical content delivery protocol such as, for example a WARP messaging protocol. In exemplary embodiments of the present invention this generalized approach (using WARP properties) can, for example, be used to communicate channel information, playlist information, audio metadata, and other communications necessary to support/offer the contemplated personalized media service.

Mapping Between Content Service Provider Representation and Client

In exemplary embodiments of the present invention, mappings between the Content Service Provider and the Client Device can be implemented so as (i) to permit an easy user preference selection mechanism, while at the same time (ii) maintaining a potentially complex mapping to a set of attributes as defined in the Content Service Provider System. In exemplary embodiments of the present invention a general approach can be to permit (i) a set of algorithms to be used by the Recommender that (ii) use the control settings as defined in the channel specification to (iii) deliver a particular recommendation. Additionally, it is the very same channel information that describes how these control settings are displayed to a user on a Client Device. It is further noted that a given back end system (content service provider) may use many sources of information for the mapping function, each such system defined by their own field labels. For example, in this description there are two such systems: enFieldValues and mmFieldValues, however more and other systems can be used in various exemplary embodiments, the ones described herein being merely exemplary.

Simple Continuous Mappings

Figure 13:
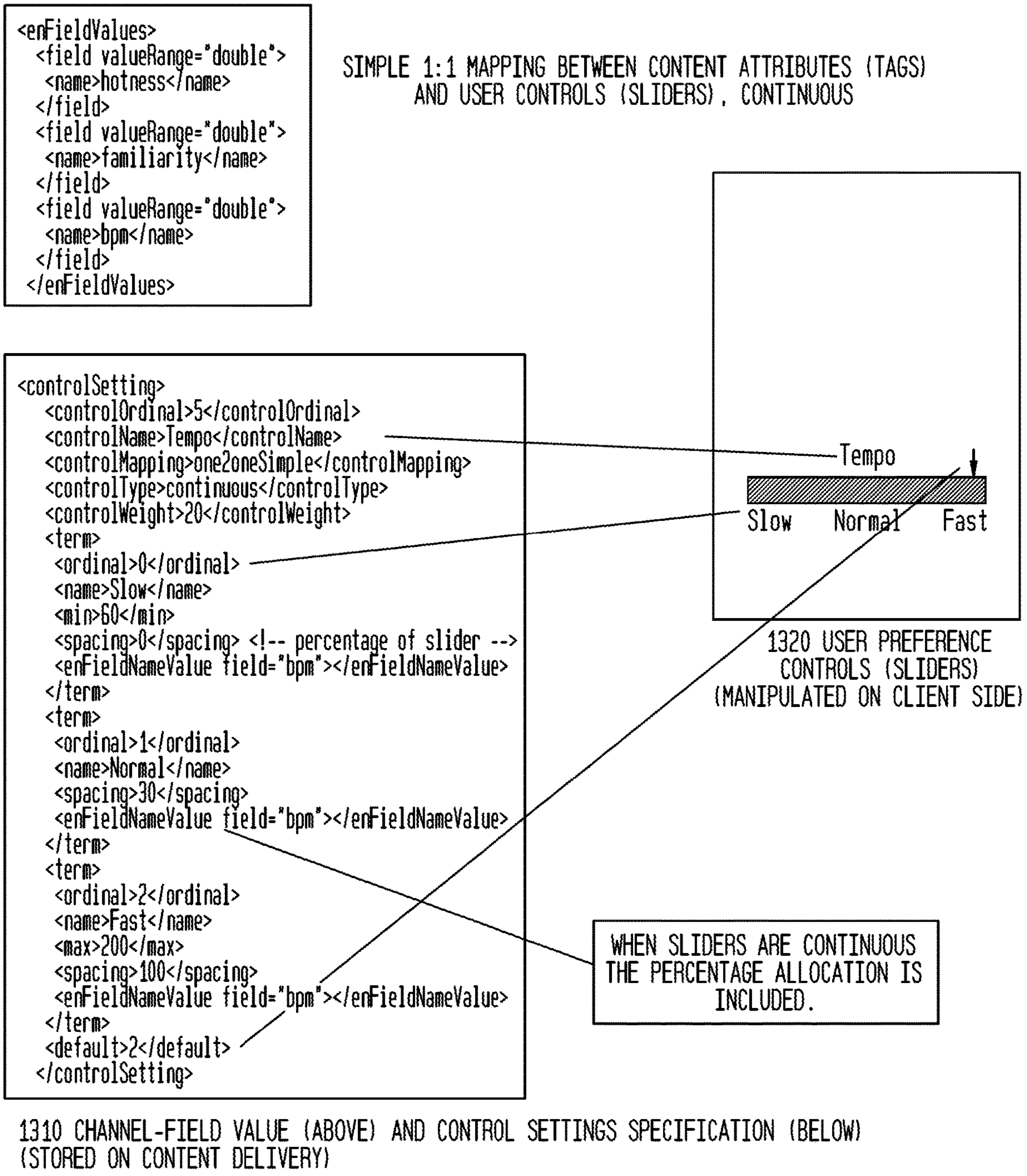
FIG. 13 shows the use of continuous slider representation and a simple one to one mapping and how they might be mapped into the client device according to an exemplary embodiment of the present invention.

FIG. 13 illustrates a first type of mapping, namely a simple 1:1 mapping between content attributes and user controls, e.g., sliders, where the mapping is continuous. Here one simple user control, for example a slider, can be used by a user to select, for example, the Tempo in a customized song playlist. To support this functionality, the backend scheduling system can have, for example, an attribute for each song which specifies its number of beats per minute (BPM), specified as a value. In this case the slider position would represent a BPM value somewhere between a minimum value and a maximum value, with a continuous range in between. For example, the dynamic range could be 60 to 200 BPM, where 60 would indicate the minimum value and 200 the maximum value. The midpoint position of the slider would thus represent a value of 130 (dynamic range of slider is 140, and midpoint is half of that added to the minimum value of 60, or {60+140/2}=130) and positions on the slider would be continuous. As shown in the exemplary XML code, the display label can be organized across this interval by providing the percentage of the sliders range (0% to 100%). As noted in FIG. 13, when sliders are continuous, the percentage allocation can be included. The mapping for the slider in FIG. 13, for example, may derive from enFieldNameValue of "bpm" as shown in 1310, lower left box, some of which is reproduced below:

```
<term>
    <ordinal>0</ordinal>
    <name>Slow</name>
    <min>60</min>
    <spacing>0</spacing> <!-- percentage of slider -->
    <enFieldNameValue field="bpm"></enFieldNameValue>
</term>
<term>
    <ordinal>1</ordinal>
    <name>Normal</name>
    <spacing>50</spacing>
    <enFieldNameValue field="bpm"></enFieldNameValue>
</term>
<term>
    <ordinal>2</ordinal>
    <name>Fast</name>
    <max>200</max>
    <spacing>100</spacing>
    <enFieldNameValue field="bpm"></enFieldNameValue>
</term>
```

With reference to FIG. 13, it is noted that the field mapping is labeled as "one2oneSimple" and the field type is continuous (rather than discrete). Therefore there is no specification of a set of legal attribute values; rather, the back end system is assumed to have a value (in this case called "bpm") which will be used by the Recommender. The slider in the example of FIG. 13 would be mapped to the enFieldValue BPM attribute, via a data structure, such as XML, which would also include label values for the slider. For example, as shown, three (3) slider labels may be defined: Slow, Normal and Fast. The spacing of each value and label, may also be represented in this manner. Thus, for example, a value of 30 indicates a spacing along the slider's axis of 30%, a value of 50 a spacing along the slider's axis of 50%, etc. In this context it is noted that a slider's layout may be programmer defined, and there can be, in various exemplary embodiments, good reasons for unequal spacing between slider labels.

It is noted that in FIG. 13 that lines running from 1310 to 1320 show the source in the Control Settings Specification 1310 of the slider name="Tempo", and that the <ordinals> 0, 1 and 2, correspond to the "Slow", Normal" and "Fast" positions of the slider 1320. [Applicants reserve the right to amend FIG. 13 to correct the placing of these lines].

Weightings for User Preference Controls

In exemplary embodiments of the present invention, an exemplary User Interface (UI) can, for example, contain multiple sliders or controls, which can interact to help steer or refine the end user experience. An example of multiple controls might be Mood and Tempo. In many cases it is highly desirable to prioritize the effect of one fader over another, or to set priorities for multiple faders or controls. In such a case any fader would have a relative value or weighting. In the example of FIG. 19, described below, the Mood slider is given a weighting of 0.9 or 90%, and the Tempo slider has a weighting of 0.1 or 10%. Thus, given these weightings, modification of the Mood slider position would have a much more dramatic effect on the recommended playlist than the Tempo slider, which may only affect the Tempo of recommendations within a certain Mood category.

Simple Discrete Mappings

Figure 14:
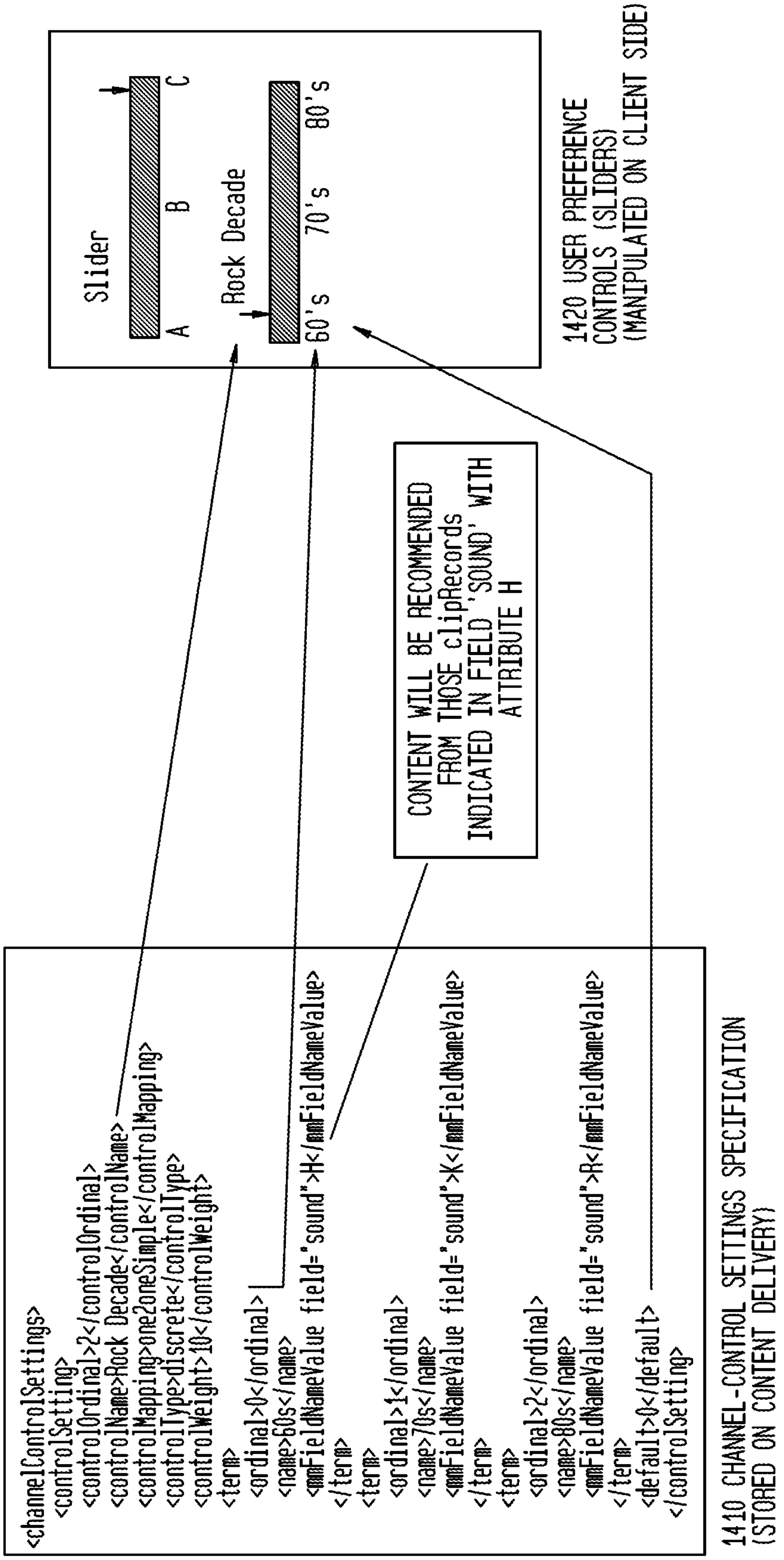
FIG. 14 shows a simple one to one mapping of fields and attributes from the content distribution system to client user preference controls on the client device using continuous values according to an exemplary embodiment of the present invention.

FIG. 14 provides a summary of Discrete Mappings. Discrete Mappings have a defined number of slider positions, and no "blending" in between them. FIG. 14 shows a Control Settings Specification 1410, and an exemplary set of User Preference Controls, here sliders, comprising a generic slider, "Slider" and a custom slider "Rock Decade." The key concept to note in discrete mappings is that the Recommender will select only clips that are drawn from the set that conform with the specification in the <controlSetting>. For a 1:1 simple mapping this means that when the slider is in ordinal setting 0, content will only be recommended if it is tagged as having a field "sound" with the value "H." I.e., all clips are marked by Programming with tags (see 630) where the tag maps to an attribute field (in this exemplary system, H='60s Hard Rock'). Thus, for this channel there is a set of clips that are marked with <customTag>'sound' with a value "H." The recommender thus selects a song from this set only. Similarly, for the other two defined slider positions, when the slider is in ordinal setting 1, content will only be recommended if it is tagged on as having a field "sound" with the value "K" (70s Hard Rock), and when the slider is in ordinal setting 2, content will only be recommended if it is tagged on as having a field "sound" with the value "R" (80s Hard Rock). The slider is read as being in one of these three defined discrete positions, and no others, unlike the case of continuous mappings as shown in FIG. 13.

It should be remembered that the description above applies to the case of one slider only. In general, various other sliders will also contribute to the selection of music to be provided. In the general multiple slider case, each slider has a weight (control weight), and this weight can be used, for example, to provide a proportion on the number of songs from which the recommender will select. As can be seen at 1410, the slider "Rock Decade" has a weighting of 0.10:

```
<controlSetting>
    <controlOrdinal>2</controlOrdinal>
    <controlName>Rock Decade</controlName>
    <controlMapping>one2oneSimple</controlMapping>
    <controlType>discrete</controlType>
    <controlWeight>10</controlWeight>
```

FIGS. 15-17, next described, refer to an exemplary custom slider called "Rock Discovery", and various exemplary mappings of attributes to it.

Simple Union Mappings

FIG. 15 illustrates a simple union mapping between tags and sliders. Thus, FIG. 15 expands on FIG. 14 by showing how each of the sliders can specify clips by matching multiple fields. Thus, the value of <controlMapping> in FIG. 15 is now "unionSimple"—as opposed to "one2oneSimple" as was the case in FIG. 14. In this example, for an exemplary Rock Discovery slider, slider position 0, named "Core" draws audio clips whose field 'category' is labeled as PR (=from the primary set); slider position 1, named "Extra", draws audio clips whose field 'category' is labeled as either PR or SE (=primary and secondary); and slider position 2, named "Wide" draws audio clips whose field 'category' is labeled as either PR, SE, DE or TE (=primary, secondary, tertiary and quaternary), etc. In this simple mapping the clips specified at each slider position form a set, and the recommender selects from that set. As should readily be understood, a union mapping adds categories or subsets as a user preference control, e.g., slider, moves along its axis or range.

Multiple Mapping to a Single Control

In exemplary embodiments of the present invention it is possible to map several back end attributes to a single control setting. One example of this is a preference control which recommends Rock Discovery music. This could be represented in a slider labeled "60s" at one end and "70s" at the other end. In this case, the slider in the left position would drive recommendation of all 60s music (as identified by a customTag) and the slider in the right position would drive recommendation of all 70s music (as identified by a customTag). The middle position could, for example, be defined to drive recommendation of mostly 60s music with some 70s by specification of both categories.

In some cases, it may be desirable to map multiple Recommender attributes to a single slider, or slider position. This may be represented by a union of values as shown in FIG. 16. Thus, FIG. 16 shows how a single User Preference Control can be mapped to multiple back end attributes. As the slider is moved to the right, it drives a stronger preference to songs that are described by the union or group of attributes. An example of these might be, Core, Extra, Wide, Eclectic, Universal, etc. With this method, it is also possible to define a Progressive mapping of attributes by slide position. For example, consider a 4 position slider: the attributes mapped to each position could be, for example, as follows:

Position 1: 70s Songs

Position 2: 70s Songs, Upbeat

Position 3: 70s Songs, Upbeat, Reggae

Position 3: 70s Songs, Upbeat, Reggae, Dance

Table Based Mapping and Attribute Weighting

A refinement of the Union type mapping, which may imply a Linear or Binary mapping of an attribute or attributes, is a Table Based Mapping methodology. Here one may map a discrete slider, with a finite number of positions, to a large number of back end system attributes, and provide a weighting for each of those system attributes at that value. Consider the example of Table 1 below, where a slider has 3 discrete positions: Slider Position 1 would drive values to the backend recommender of No Classic, No 70s, with a 70/30 percent ratio of Disco/Rock songs. Slider Position 2 would provide an even blend of Classic, Disco, Rock and 70s songs, and Slider Position 3 would provide a weighted blend of Classic, Disco, Rock and 70s songs in the ratios of 40%, 25%, 25% and 10%, respectively. Similar variations of music mix ratios can be constructed along these lines, and additional columns can be used as well. For example, there could be eight columns, and some exemplary table entries can access all eight music type categories, or some only four, or six, etc., as may be desired. The permutations that are possible are essentially endless.

TABLE 1

| Slider Position | Classic | Disco | Rock | 70s |
|---|---|---|---|---|
| 1 | 0 | 70 | 30 | 0 |
| 2 | 25 | 25 | 25 | 25 |
| 3 | 40 | 25 | 25 | 10 |

FIGS. 16 and 17 illustrate implementing such a mapping structure through the use of a weightingMatrix, as shown in Channel Control Settings 1610 of FIG. 16. The weighting matrix itself appears at the bottom of FIG. 17, as follows:

```
<weightingMatrix>
<matrixValue ordinal="0">category:PR=0.5,category:SR=0.3,
category:DE=0.1,category:TE=0.1</matrixValue>
<matrixValue ordinal="1">type:A=0.1,type:D=0.1,type:B=0.2,type:L=0.1,
category:PR=0.2,category:SR=0.1,category:DE=0.1,category:TE=0.1</matrixValue>
<matrixValue ordinal="2">type:A=0.1,type:D=0.1,type:B=0.1,type:L=0.1,
category:PR=0.1,category:SR=0.1,category:DE=0.1,category:TE=0.1,familiary=0.2</matrixValue>
</weightingMatrix>
```

As can be seen, at slider position 0 there is provided a weighted mix of four attributes, PR, SE, DE, and TE, whereas at slider positions 1 and 2 there is a weighted mix of eight attributes, namely A, D, B, L, PR, SE, DE, and TE. It is here noted that conceptually multiple attributes can be used in a table or matrix type mapping, and various weights to each attribute at each slider position. This potential complexity needs to be balanced with simplicity on the user or client side.

Curve Weightings and Continuous and Discontinuous Functions

Figure 18:
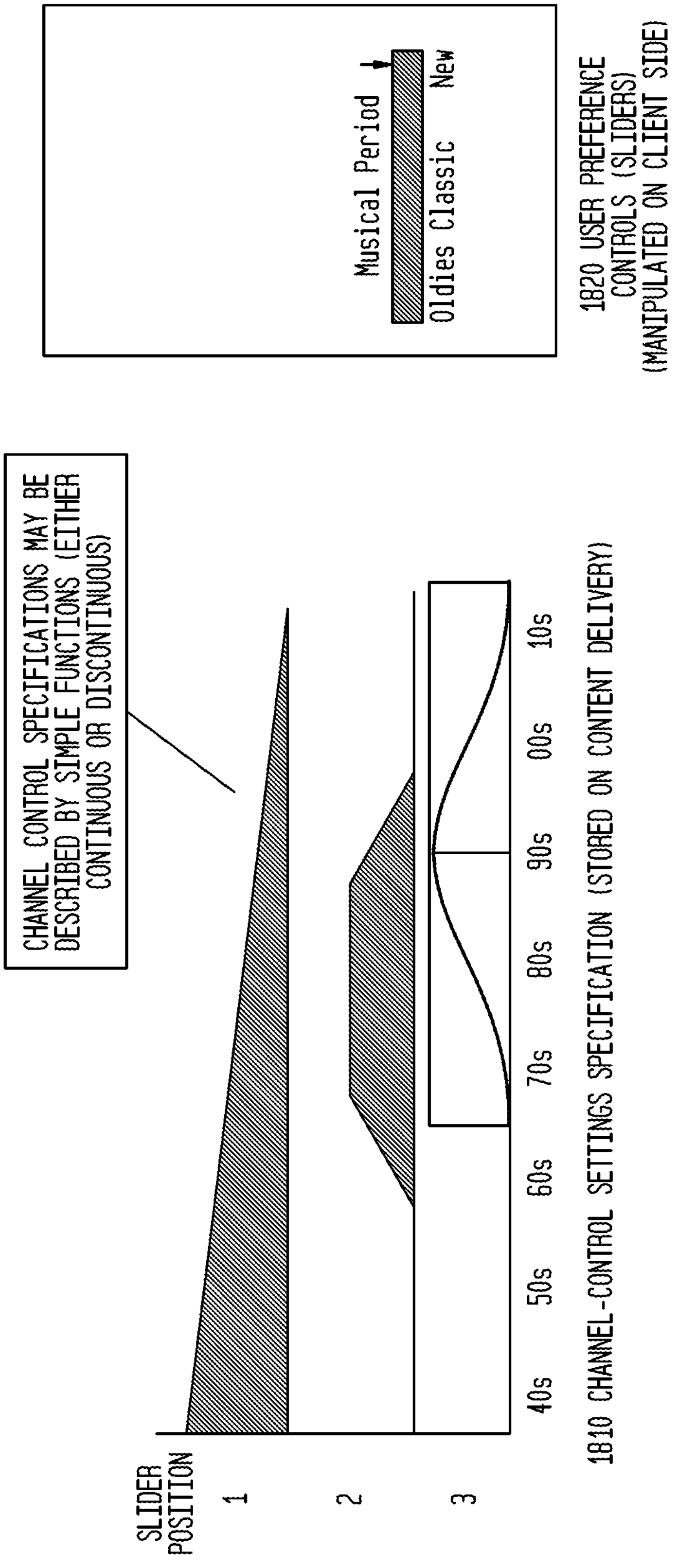
FIG. 18 shows how control settings can be reflected using expressions either continuous or discontinuous to affect changes according to an exemplary embodiment of the present invention.
Figure 18A:
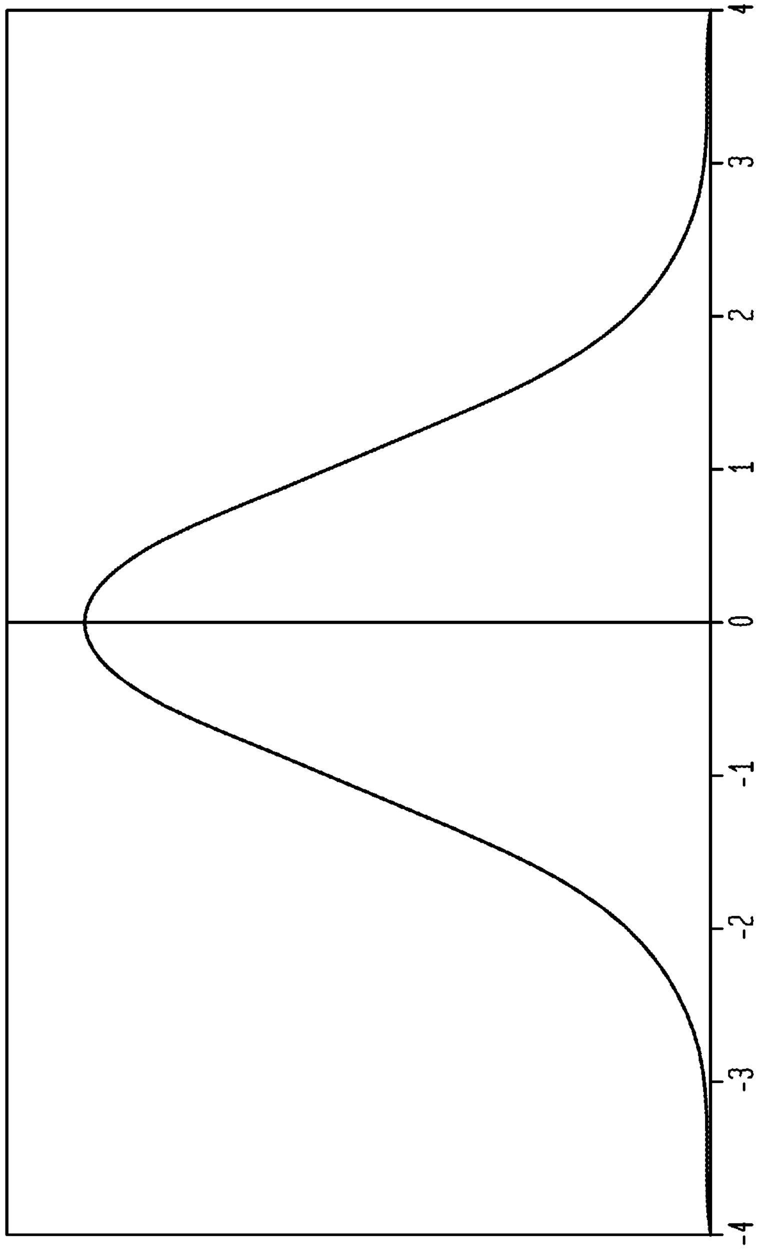
FIG. 18A depicts an exemplary mathematical function (here a normal distribution) to which a slider can be mapped according to exemplary embodiments of the present invention.

As is illustrated in FIG. 18, there is a variation on table based mapping which uses a slider mapped to a mathematical function such as, for example, a Normal Distribution, as shown in FIG. 18A. In this case, the slider position would move the center position of this function to the left or the right. Thus, wherever the center of the normal distribution is, recommendations are made form that type and a certain proportion of the neighboring types on each side. The width of the distribution determines how many neighboring categories are implicated at any one slider position, as well as the rate of "decrease" of recommendations for the "side" categories as one moves to the "side" types or categories. Also shown in FIG. 18A is an example of attributes, or parameters, which can, in exemplary embodiments of the present invention, be used to drive recommendations with a value or weighting proportional to the value of the curve at that point.

As shown in FIG. 18A, the slider is in the center position which is indicating a strong preference towards Pop songs, with a lesser weighting to Rock and Jazz, which appear on each side of "Pop." Moving the slider to the right, would drive more recommendations of Jazz and Classical music, and moving it to the left would drive more Easy listening and Rock music. In exemplary embodiments of the present invention, different mathematical functions (or curves) could be used to drive this functionality, as shown in FIG. 18, such as, for example, a sloping line, a trapezoidal function, a distribution curve with width and rate of decrease to zero on either side of the center as parameters.

Slider Visualizations

In exemplary embodiments of the present invention, it is possible to reflect slider combinations through a number of approaches, such as, for example, Spider Plots, as illustrated in FIG. 19. Here, some number of different sliders, for example 5, can be described, and a user can easily adjust their preferences by adjusting the distance of each slider from the center, corresponding from moving the slider form left to right in the above examples. Thus, as shown in FIG. 19 with respect to Slider 5, position 1, farthest from the center, corresponds to weighting ratios of 0, 70, 30 and 0 for USA, UK, European and Asian music, respectively. Whereas Slider 5 position 1, closest to the center, corresponds to weighting ratios of 40, 25, 25 and 10 for USA, UK, European and Asian music, respectively. In exemplary embodiments of the present invention the sliders can be integrated (combining the weights from any fields that are common across the sliders) to provide just the experience an exemplary listener is looking for.

A simplification of this approach is to provide a User Interface which provides a single control point on an XY axis. In this case, values would be driven in a single quadrant, allowing customization of 2 sets of values, as the control point is moved away from the XY origin.

In exemplary embodiments of the present invention, to implement a cross-fade effect between two songs sent to a client device as described above, an audio track can be preprocessed with fade up/fade down before it is sent to a client device. The client device would then align two such tracks correctly, and play the two tracks at unity gain, no fade being required to be implemented by a Client Device using such an approach.

Rule Set Mappings

One variation is to provide ruleset labels rather than exact annotation of the playlist behavior adjustments being expressly described. In such an exemplary embodiment, an identification label may be used, and the rules that are associated with the label, such as, for example, frequency distributions, time separations, segue protections, etc., may be defined separately and loaded into the recommender via a separate path. Such an exemplary embodiment is described in detail in the next section.

Exemplary System

The following is a specification of an exemplary system contemplated to be used by assignee hereof, Sirius XM, in a personalized music service based on Sirius XM's broadcast service. Thus, the channels defined track those offered on the Sirius XM broadcast service, and thus draw on a very similar pool of audio content specific to each channel (with overlap, of course) but can be modified as to content and "feel" by a user of the personalized service in a unique way. The specification describes how control settings can be used to manipulate a listening experience based on automation system elements as used in an exemplary music personalization service, and further describes how data elements for Channel, Clips and Client Devices can be leveraged to effect recommendations based on a User Personalized Channel Experience.

1. End to End System

As depicted in FIG. 2, in exemplary embodiments of the present invention, a user personalized experience can be implemented by an integrated system comprising a content service provider 220, a distribution service 210, a recommendation service 240, and a client device 230. These functional elements can be connected to one another using a communications network and traditional network communications protocols such as, for example, TCP/IP.

It is necessary to be able to properly map the back-end data elements from the Content Service Provided to the client device control settings. This mapping can be accomplished through specifications of the Channel that include elements that are applicable to the Distributer, Recommender and Client Device, for example. In what follows, the Client Device settings are called the Client Device Control Settings, and the Channel perspective of these specifications are called the Channel Control Settings.

2. Defining the Client Device Control Settings

Figure 20:
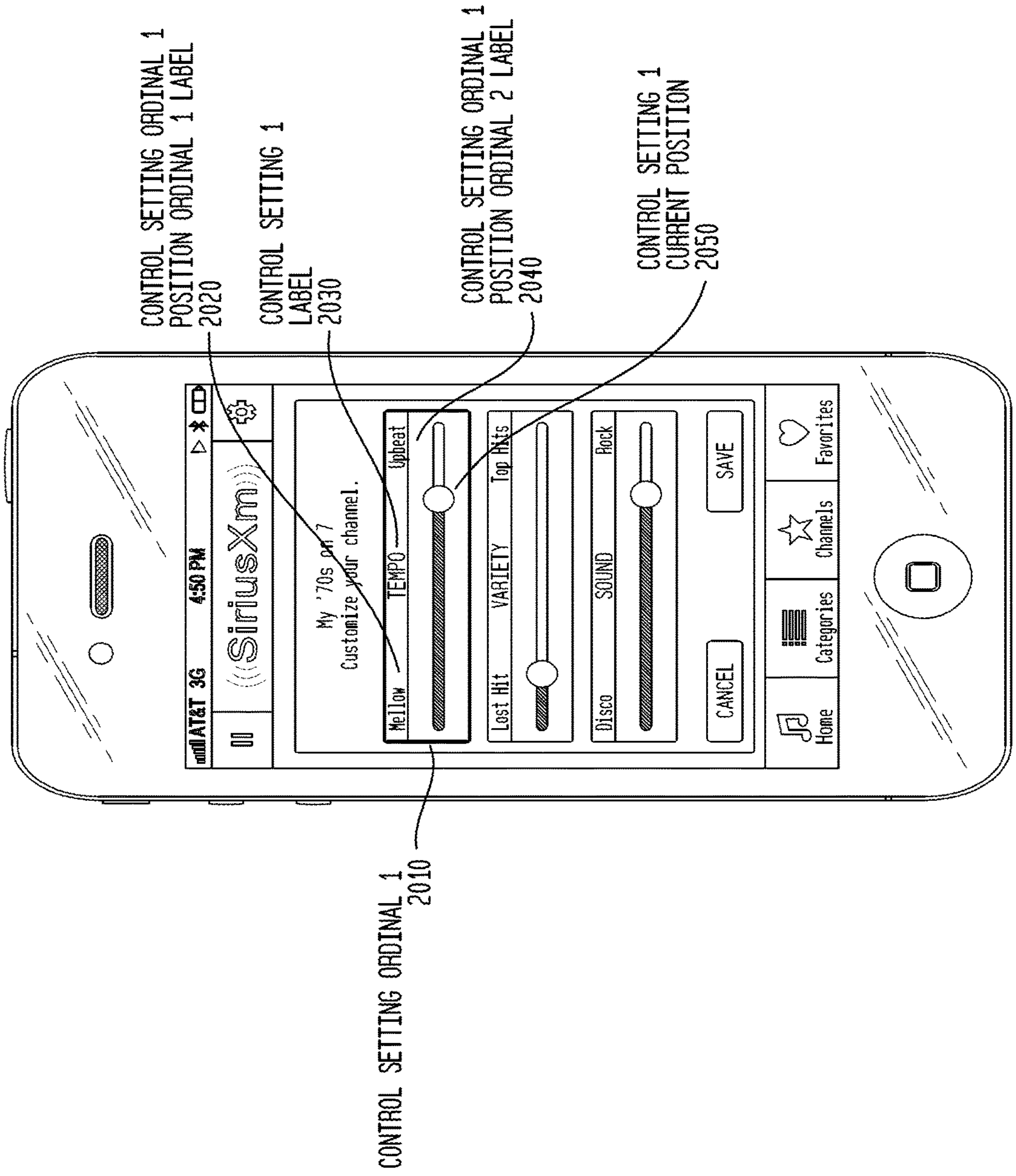
FIG. 20 depicts exemplary control settings for user personalization of a user experience on a client device according to an exemplary embodiment of the present invention.

An exemplary client device can, for example, have a set of Client Control Settings. FIG. 20 presents such an exemplary device running an exemplary personalized music service. Overall, the Client Device Control Settings describe an ordered list of controls (e.g. sliders) each of which contains a control label (the Slider Label), a set of positions (either continuous or discrete values), a default setting, a weighting of this setting relative to other settings and an algorithm reference to be commonly understood by the recommendation and client device. There may also be a representation for the current setting (on the client device).

On an exemplary client device side the control settings can, for example, be represented using a tagged structure in XML as depicted in the following example:

```
<channelControlSettings>
    <skinArt>
        <encrypted>false</encrypted>
        <size>THUMBNAIL</size>
        <type>IMAGE</type>
        <id>123</id>
        <url>http://www.siriusxm.com/personalization/skins/70son7-skin.jpg</url>
    </skinArt>
    <controlSetting>
        <controlOrdinal>0</controlOrdinal>
        <controlName>Tempo</controlName>
        <controlMapping>pureRulebased</controlMapping>
        <controlType>discrete</controlType>
        <controlWeight>10</controlWeight>
        <controlArt>
            <encrypted>false</encrypted>
            <size>THUMBNAIL</size>
```

-continued

```
            <type>IMAGE</type>
            <id>123</id>
            <url>http://www.siriusxm.com/personalization/skins/70son7-0-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-0-title.jpg</url>
        </titleArt>
        <term>
            <ordinal>0</ordinal>
            <name>Chillin'</name>
            <URL>http://www.siriusxm.com/personalization/skins/70son7-0-0.jpg</URL>
        </term>
        <term>
            <ordinal>1</ordinal>
            <name>Mixed Bag</name>
            <URL>http://www.siriusxm.com/personalization/skins/70son7-0-1.jpg</URL>
        </term>
        <term>
            <ordinal>2</ordinal>
            <name>Groovin</name>
            <URL>http://www.siriusxm.com/personalization/skins/70son7-0-2.jpg</URL>
        </term>
        <defaultOrdinal>1</defaultOrdinal>
    </controlSetting>
    <controlSetting>
        <controlOrdinal>1</controlOrdinal>
        <controlName>Variety</controlName>
        <controlMapping>pureRulebased</controlMapping>
        <controlType>discrete</controlType>
        <controlWeight>20</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-1-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-1-title.jpg</url>
        </titleArt>
        <term>
            <ordinal>0</ordinal>
            <name>Lost Hits</name>
            <URL>http://www.siriusxm.com/personalization/skins/70son7-1-0.jpg</URL>
        </term>
        <term>
            <ordinal>1</ordinal>
            <name></name>
            <URL>http://www.siriusxm.com/personalization/skins/70son7-1-1.jpg</URL>
        </term>
        <term>
            <ordinal>2</ordinal>
            <name>Top Hits</name>
            <URL>http://www.siriusxm.com/personalization/skins/70son7-1-2.jpg</URL>
        </term>
        <defaultOrdinal>2</defaultOrdinal>
        <defaultRuleset>70son7-defaulthits</defaultRuleset>
    </controlSetting>
    <controlSetting>
        <controlOrdinal>2</controlOrdinal>
        <controlName>Sound</controlName>
        <controlMapping>pureRulebased</controlMapping>
        <controlType>discrete</controlType>
        <controlWeight>10</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-0-control.jpg</url>
        </controlArt>
```

-continued

```
<titleArt>
    <encrypted>false</encrypted>
    <size>THUMBNAIL</size>
    <type>IMAGE</type>
    <id>123</id>
    <url>http://www.siriusxm.com/personalization/skins/70son7-0-title.jpg</url>
</titleArt>
<term>
    <ordinal>0</ordinal>
    <name>60s</name>
    <URL>http://www.siriusxm.com/personalization/skins/70son7-2-0.jpg</URL>
</term>
<term>
    <ordinal>1</ordinal>
    <name>70s</name>
    <URL>http://www.siriusxm.com/personalization/skins/70son7-2-1.jpg</URL>
</term>
<term>
    <ordinal>2</ordinal>
    <name>80s</name>
    <URL>http://www.siriusxm.com/personalization/skins/70son7-2-2.jpg</URL>
</term>
<defaultOrdinal>1</defaultOrdinal>
</controlSetting>
</channelControlSettings>
```

It is noted that in exemplary embodiments of the present invention, a client device need not be responsible for interpretation of, or even be aware of, the recommendation algorithm being used. It need only be responsible for representing the control settings and for communicating these control settings to a Distributer (and from thence to a Recommender) and the behavior of the settings given the algorithm selected.

3. Defining Channels

Exemplary information associated with device control settings that emanates from a Channel Specification is depicted in FIG. 21. Overall the channel specification can be organized into three logical components: an Overview section 2110, a Library Catalog 2120 of all content that is associated with a channel, and Control Channel Settings, which map to Sliders 2130.

3.1 Specification of Overview

In exemplary embodiments of the present invention, a channel specification can contain an overview of the channel, including the name of the channel, DMCA compliance description, channel default cross fade information, and a specification of the attribute values supported in the channel, such as, for example:

```
<serialNumber>1234321</serialNumber>
<channelKey>70son7</channelKey>
<name>70's on 7</name>
<channelState>available</channelState>
<!-- new, change, available, deleted, erased -->
<description>Textabout70s on 7</description>
<coloration>Custom-10-SXM AGC ONLY</coloration>
<!-- various colorizations to be provided -->
<entitlementPackage>
    <number>100</number>
    <number>200</number>
    <number>500</number>
</entitlementPackage>
<DRM>
<ProgramDMCA>
        <ir__Nav__Class>Restricted2</ir__Nav__Class>
        <Play__On__Select>Newest0</Play__On__Select>
        <Max__Fwd__Skips>5</Max__Fwd__Skips>
```

-continued

```
        <Max__Back__Skips>1</Max__Back__Skips>
        <Max__Fwd__Dur>12</Max__Fwd__Dur>
        <Max__Back__Dur>12</Max__Back__Dur>
    </ProgramDMCA>
  </DRM>
<defaultCrossfade>
    Datablob
  </defaultCrossfade>
<mmFieldValues>
    ...
  </mmFieldValues>
```

3.1.1 Program DMCA Rules

DMCA compliance can, for example, be managed at the channel level; therefore, DMCA compliance elements for the channel are described in the overview XML, as shown above. Details of the field interpretations can be provided in a Metadata Specification 3.1.2 Crossfade Crossfade data can be represented as a data blob and passed through from, for example, the Distributer to the Client Device when the channel is first tuned. In this exemplary system, there is no requirement for the Distributer to interpret crossfade data. Interpretation of crossfade can thus, for example, be done on the Client Device.

3.2 Specification of Catalog Specification

In exemplary embodiments of the present invention, a Channel Specification may describe all the content within the channel, as shown below.

```
<libraryCatalog>
    <song>
        <sxmAutomationID>70son7-N-432057-001</sxmAutomationID>
        <artist>Dire Straits</artist>
        <title>Romeo and Juilet</title>
    </song>
    <song>
        <sxmAutomationID>70son7-N-112344-002</sxmAutomationID>
        <artist>Dire Straits</artist>
        <title>Telegraph Road</title>
    </song>
    <song>
        <sxmAutomationID>70son7-D-LE124333-001</sxmAutomationID>
        <artist>The Beatles</artist>
        <title>Mrs Robinson</title>
    </song>
  </libraryCatalog>
```

3.3 Specification of Channel Control Settings

In exemplary embodiments of the present invention, a Channel Control Settings specification describes how Device Control Setting Data (as described above) can be augmented with Recommender rule set specifications to permit recommendation based on the values of a particular piece of content (as described, for example, in a clipRecord). Thus, the Channel Control Settings as delivered by the Service Provider to the Recommender and Distributer can contain information necessary for the Distributer to manage Channels and the Recommender to perform Recommendations based on them. The structure of this is next described.

3.4 Channel Control Settings and Client Side Control Setting Specifications.

In exemplary embodiments of the present invention, the Channel Control Settings extracted by the Distributer can be used to construct the Client Device Control Settings. Although the Channel Control Settings are contemplated as being provided to the Distributer as an XML feed, the interactions between the Distributer and the Client Device can use a json transport. Moreover, names can be contracted to reduce overhead.

4. Defining ClipRecords

In exemplary embodiments of the present invention, an instance of a particular audio clip provides information that related to these values. An example of a clipRecord (non-relevant fields deleted for clarity) follows:

```
<clipRecord>
    <sxmAutomationID>classicvinyl-N-432057-001</sxmAutomationID>
    <ingestionPriority>5</ingestionPriority>
    <ingestionState>new</ingestionState>
    <lastModified>2011-09-10T11:23:57+00:00</lastModified>
    <category>music</category>
    <recordLocator>/Album/d000530/direstraits_00221601.WAV</recordLocator>
    <title>Romeo and Juliet</title>
    <artist>
        <id>53</id>
        <title>Dire Straits</title>
    </artist>
    <album>
        <title>Making Movies</title>
        <creativeArt>
            <encrypted>false</encrypted>
            <size>THUMBNAIL</size>
            <type>IMAGE</type>
            <id>123</id>
            <url>/Album_Art/d000530/direstraits_4EE6A38A_t.jpg</url>
        </creativeArt>
        <creativeArt>
            <encrypted>false</encrypted>
            <type>BIO</type>
            <id>1234321</id>
            <url>/Album_Art/d000530/direstraits_4EE6A38A_b.txt</url>
        </creativeArt>
        <creativeArt>
            <encrypted>false</encrypted>
            <size>SMALL</size>
            <type>IMAGE</type>
            <id>1</id>
            <url>/Album_Art/d000530/direstraits_4EE6A38A_s.jpg</url>
        </creativeArt>
    </album>
    <description>
        Pat St. John interviewed members of Dire Straits, The Stones and The Who.
        Pat's known the band for over 35 years and the band have often played him tracks
        before they were mixed.
```

-continued

```
        When he talks about the songs he's playing, you know you're getting the real deal:
        Pat lives and breathes this music
</description>
```

5. Mapping SXM Rulesets to Control Settings

Figure 22:
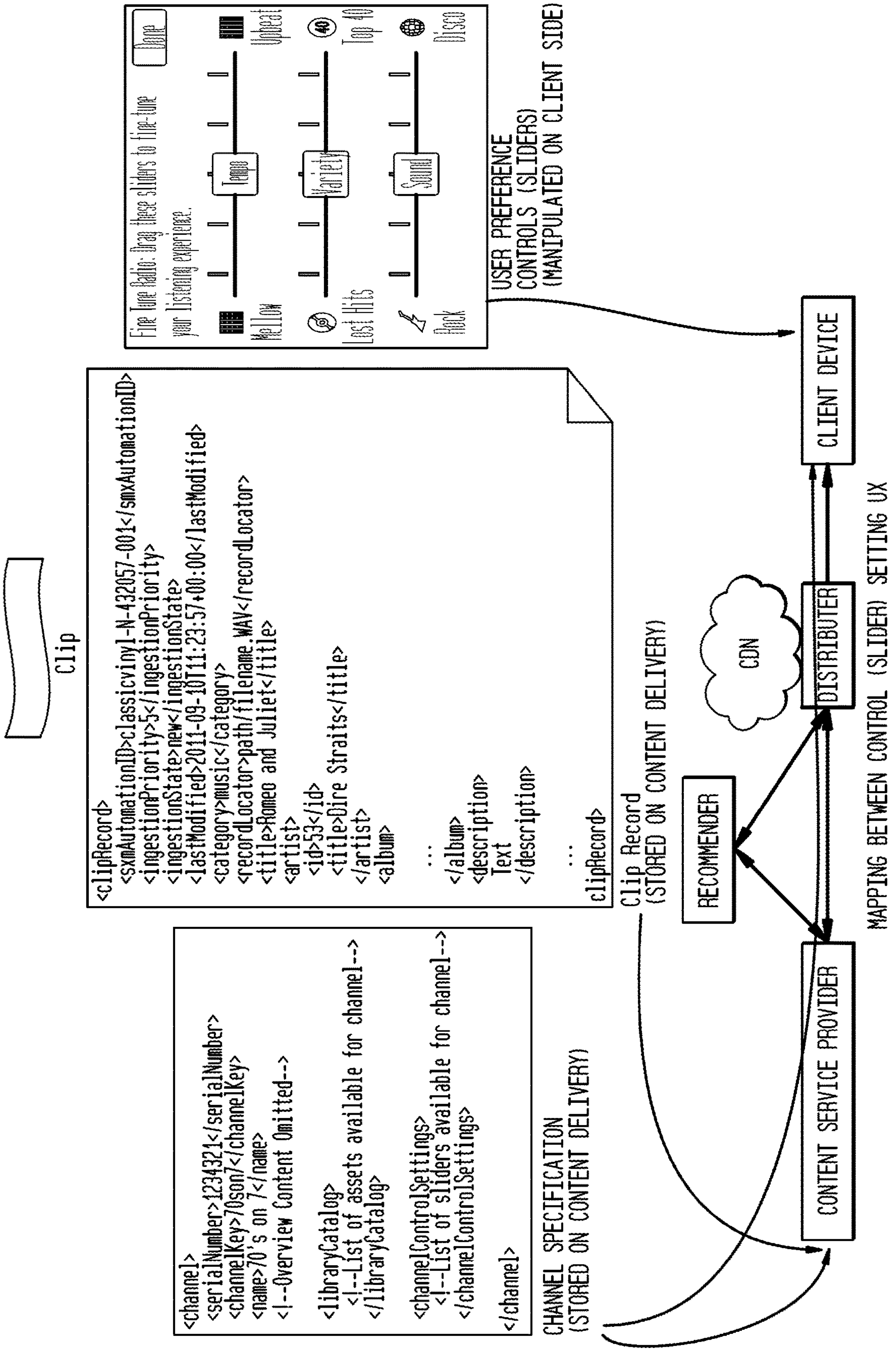
FIG. 22 depicts an exemplary mapping between control settings and a user experience according to an exemplary embodiment of the present invention.

In exemplary embodiments of the present invention, mappings between a Content Service Provider and a Client Device can permit an easy user preference selection mechanism while maintaining a potentially complex mapping to a set of attributes as defined in the Content Service Provider System. One exemplary approach is to permit a set of algorithms to be used by a Recommender that use the control settings as defined in the channel specification to deliver a particular recommendation. The very same channel information describes how these control settings are displayed at the client. FIG. 22 illustrates how the channel specification data relates to the clipRecord data. In one example, a single Mapping can be defined: "pureRulesets." Such a mapping embodies two concepts:

1) A specification of a set of recommender rules to associate with a particular slider (possibility with weighting information for a rule set), and,
2) An interpretation for the manner in which the sliders interact on the client device (between one another).

In other words, the 'mapping' defines an algorithm for the recommender to make recommendations and an algorithm for slider interpretation on the client device. Details of various such algorithms are discussed in more detail below. It is noted that these may be associated with sliders that are either continuous or discrete (fixed positions).

5.1 pureRuleset Mapping

A pureRuleset Mapping permits a control setting (for example, a slider) to be mapped to one or more rule sets (e.g., bundles of rules provided by a recommender under a single label). The rule set in question can be defined by the Recommender using Recommender APIs and associated with a label. The rule can be associated with a particular client's taste profile by loading it with the taste profile. The pureRuleset model permits either continuous or discrete control settings, next described.

5.1.1 Continuous

One exemplary algorithm permits pureRuleset using Continuous control (e.g., slider) settings. This means that, for example, a client my select the Tempo of a customized song playlist using a continuous slider, as indicated in FIG. 23. The Recommender thus has a rule set that is a continuous range, and that can be adjusted by a value determined by the current position of the slider. The continuous range for the recommender can always be between 0 and 1, for example. The slider position labels can indicate a nominal value in the range of 80 to 180, where 80 would indicate a minimum value and 180 the maximum value. The midpoint would thus be represented by a value of 130, and positions on the slider are continuous. The display label can be organized across this interval by providing the percentage of the sliders range [0 to 100] using a spacing.

Min and Max Values. The exemplary mapping for the slider in FIG. 23 is assumed to relate a control labeled "Tempo" to a rule set called "70son7-tempo" (i.e., a Tempo rule set for a particular personalized channel, in this case SiriusXM's "70s on 7"). Since this is a continuous slider, the first and last terms in the slider will have <min> and <max> elements, respectively. The rule set to be used when the slider is to the extreme 'left' (ordinal position 0) can, for example, be modified by: <min>. For example, in FIG. 23 the rule set to be used on the left extreme would be "70son7-tempo:10." Likewise, the rule set to be used when the slider is moved to the extreme 'right' (highest ordinal) can, for example, be modified by: <max>. Thus, for example, in FIG. 23 the rule set to be used on the right extreme would be "70son7-tempo:90."

Spacing. In exemplary embodiments of the present invention, spacing of each value and label, can, for example, also be represented (as a percentage) using the <spacing> element. A value of 30, for example, indicates a slider Spacing along the axis of 30%.

Weighting. In exemplary embodiments of the present invention, User Interface (UI) can contain multiple sliders or controls, which can, for example, interact to help steer or refine the End User experience. An example of multiple controls might be Mood and Tempo. In many cases it is highly desirable to prioritize the effect of one fader over another, or multiple faders or controls. In this case any fader would have a relative value or weighting (as a percentage). In the example provided below the Mood slider can be given a weighting of 90 or 90%. The Tempo slider can similarly have a weighting of 10 or 10%. In this case, modification of the Mood slider position would have a much more dramatic effect on the Recommended playlist than modifying the Tempo slider, which may only affect the Tempo of recommendations within a certain Mood category.

DefaultOrdinal. In exemplary embodiments of the present invention, indicates the position of the slider in the unselected default position. A defaultOrdinal value of −1 can indicate, for example, that the control is to be ignored for the purposes of defining the listening experience.

DefaultRuleSet. In exemplary embodiments of the present invention, a default ruleset can be used to indicate that the control is to be ignored for the purposes of defining the listening experience. It is noted that the defaultRuleSet is not the same as any particular slider position. Thus, it is possible to define a control setting for sliders that are 'not used' In the example of FIG. 23 the default rule set is "70son7-tempo". The slider position in the middle, if selected, would be "70son7-tempo:50" which may or may generate the same play lists.

Figure 24:
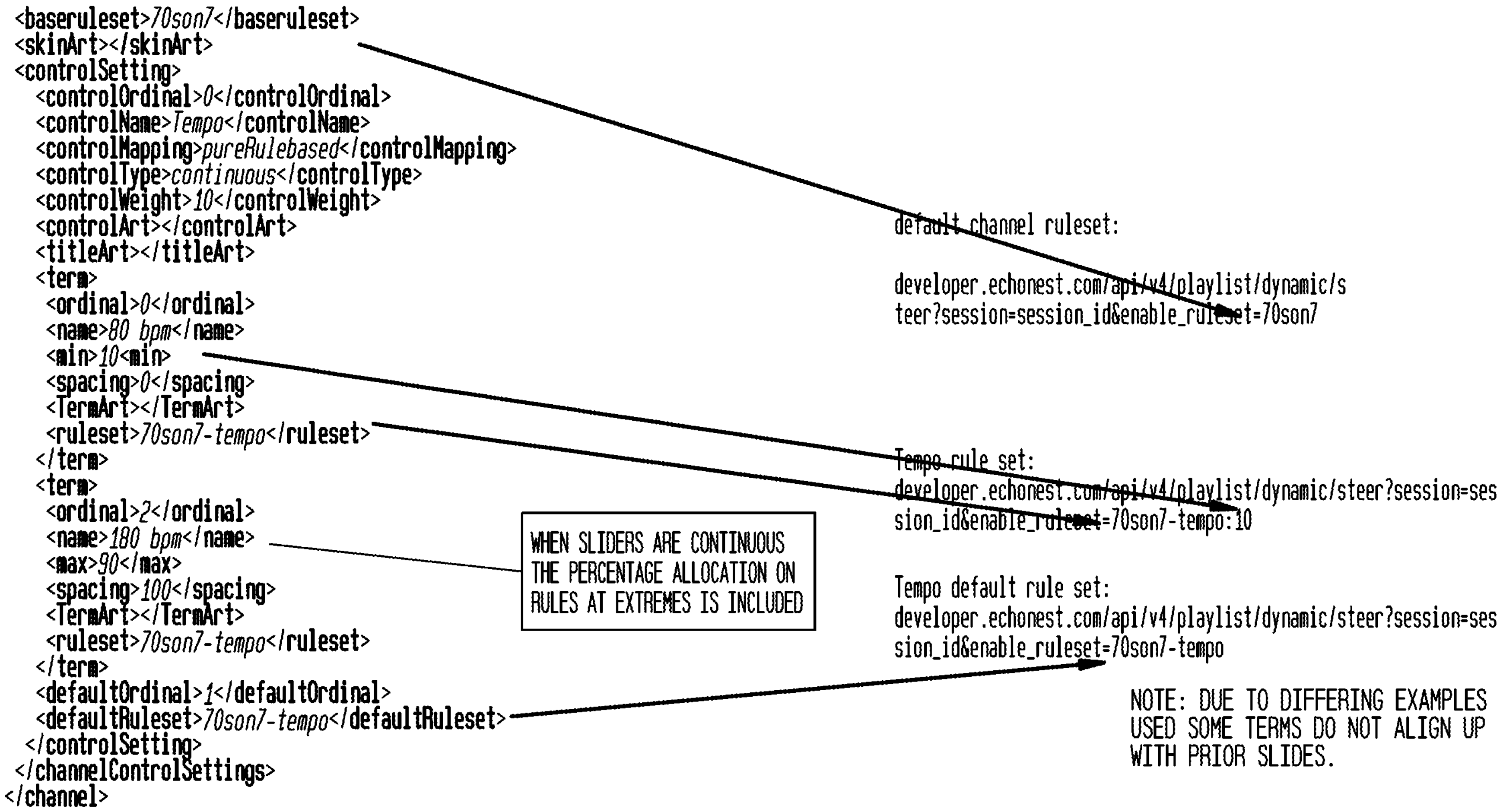
FIG. 24 depicts an exemplary mapping between channel control settings and an exemplary rule set for continuous controls (sliders) according to an exemplary embodiment of the present invention.

Thus, a recommender can furnish songs as provided by the <ruleset> element for the particular slider current position based on a percentage weighting for in accordance with the continuous position of the slider. When a rule set is loaded into the Recommender it can, for example, adjust rules that were set for the slider previously and use the new weights. An exemplary mapping between the XML in the Channel Control Settings and the rule invocation by the Distributer to the Recommender is illustrated in FIG. 24 below.

5.1.2 Discrete

An exemplary mapping between the client side channelControlSettings and the channel specification for the discrete case (in which sliders have only fixed positions, and are represented by a set of ordinal values) is illustrated in FIG. 25.

It is here noted that the recommender will furnish songs as provided by the <ruleset> element for the particular slider current position. When a rule set is loaded into the Recommender it unloads rules that were previously set for the slider. The mapping between the XML in the Channel Control Settings and the rule invocation by the Distributer to the Recommender is illustrated in FIG. 26 below.

It is also noted that this description applies for one slider only. Other sliders, in general, will also contribute to the selection of music to be provided. Thus, each slider has a weight (control weight), and this weight can be used to provide a proportion on the number of songs from which a recommender can select.

6. Distributer/Recommender Interactions for Control Settings

As is indicated in the preceding section, channel and client steering control setting information can, for example, be furnished by calls from the Distributer to the Recommender. The following provides an overview of the interactions and references relevant use cases.

6.1 System API Key (Use Case: Client Personalized Data) Interactions between Distributer and Recommender assume a single API Key:

API KEY: N6E4NIOVYMTHNDM8J (Illustrative Only)

6.2 User Taste Profile Created (Use Case: Authentication/Channel Tune)

The first time a user tunes to the personalized experience a User's Taste Profile can, for example, be created for that user, and a sessionID stored by the Distributer for subsequent servicing of requests (corresponding to Create UserID in Use Case):

http://developer.XXXXX.com/api/v4/catalog/create?api_key=N6E4NIOVYMTHNDM8J&name=clientID&type=song&format=json ("XXXXX being a generic designaor for a distributer)

This can return, for example, a catalogeID.

The catalog create call can thus return a catalog ID that should be associated with the user, and this ID can be used in subsequent calls. The catalog will need to be populated with songs for which client personalization data exist (this would tie into a social media use case) and forms the USER_CATALOG. It is noted here that this population may, for example, be performed in a "lazy" fashion, i.e. the full scope of incorporation of a user's taste profile may be accomplished while content is being received and listened to by the client. It is thus not necessary for this to be performed before the first song is heard by the client.

6.3 Creating a Dynamic Playlist (Use Case: Authentication/Channel Tune)

Assuming that a client taste profile has been created it is thus possible to create a Dynamic Playlist for the delivery of content. It is assumed a channel rule set (e.g. for personalized channel based on SXM's "ALT NATION" channel) ALT_NATION_RULESET can be extracted from the Channel Control Settings for the channelKey. We pass the api_key, the type of dynamic playlist (a steerable Station Radio), the seed_catalog of the client (USER_CATALOG), the base Rule Set to load (ALT_NATION_RULESET), select the channel specific catalog (ALT_NATION_CATALOG_ID), and the session catalog (USER_CATALOG_ID):

http://developer.XXXX.com/api/v4/playlist/dynamic/create?api_key=N6E4NIOVYMTHNDM8J&type=stationradio&seed_catalog=USER_CATALOG_ID&ruleset=ALT_NATION_RULESET&bucket=id:ALT_NATION_CATALOG_ID&session_catalog=USER_CATALOG_ID&limit=true This returns, for example, a sessionID: "7bf982d80ed8421c8c94dbd6de565e9d"

6.4 Channel Controls Instantiated when Client Tunes to Channel (Use Case: Authentication/Channel Tune)

It is noted that whenever the client device tunes to a new channel the channel profile should be loaded and the default rule sets applied. It is assumed the channel rule set is extracted from the Channel Control Settings for the channelKey (e.g. "70son7"):

http://developer.XXXX.com/api/v4/playlist/dynamic/steer?api_key=N6E4NIOVYMTHNDM8J&enable-ruleset=70son7&format=json&session_id=7bf982d80ed8421c8c94dbd6de565e9d It is then necessary to add the current settings stored as part of client personalized data.

Foreach Channel Control Setting (Slider) in channel:

http://developer.XXXX.com/api/v4/playlist/dynamic/steer?api_key=N6E4NIOVYMTHNDM8J&enable-ruleset=<current-settings>&session_id=7bf982d80ed8421c8c94dbd6de565e9d If the slider is not being used then the client device should have returned a value of −1 for the current settings, to be interpreted as unused, and this information should be available to the Distributer (either stored previously or as an update) in which case the channel default settings are retrieved and used.

(If the Channel is being created then the channel default settings are retrieved and used:

http://developer.XXXX.com/api/v4/playlist/dynamic/steer?api_key=N6E4NIOVYMTHNDM8J&enable-ruleset=<default-settings>&session_id=7bf982d80ed8421c8c94dbd6de565e9d)

6.5 Delivering Content with Last Five (Use Case: Delivering Content)

The first time the content is played from a particular channel it is useful to preload the past listened to songs from the Client Device. To preload songs in the play history a 'dynamic/feedback' method can, for example, be used, like so:

Foreach songID in list of songs returned from client:

http://developer.XXXX.com/api/v4/playlist/dynamic/feedback?api_key=N6E4NIOVYMTHNDM8J&format=json&session_id=3c717a4465dc4a2ba871747a2044f44184play_song=songID It is noted at this juncture that many parameters associated with dynamic feedback permit multiple occurrences. Therefore the above objective could be accomplished by construction of the API with many play_song parameters.

6.6 Delivering Content During Regular Playout (Use Case: Delivering Content)

Whenever a current track is coming to a close, an exemplary 'next track list' can be obtained from a recommender and passed to the Client Device.

To get the next track a dynamic/next method can be used, as follows:

http://developer.XXXX.com/api/v4/playlist/dynamic/next?api_key=N6E4NIOVYMTHNDM8J&format=json&session_id=3c717a4465dc4a2ba871747a2044f441

To skip:

http://developer.XXXX.com/api/v4/playlist/dynamic/feedback?api_key=N6E4NIOVYMTHNDM8J&format=json&session_id=3c717a4465dc4a2ba871747a2044f441&skip_song=last or:

http://developer.XXXX.com/api/v4/playlist/dynamic/feedback?api_key=N6E4NIOVYMTHNDM8J&format=json&session_id=3c717a4465dc4a2ba871747a2044f441&skip_song=songID To like a song:

http://developer.XXXX.com/api/v4/playlist/dynamic/feedback?api_key=N6E4NIOVYMTHNDM8J&format=json&session_id=3c717a4465dc4a2ba871747a2044f441&favorite_song=songID To like an artist:

http://developer.XXXX.com/api/v4/playlist/dynamic/feedback?api_key=N6E4NIOVYMTHNDM8J&format=json&session_id=3c717a4465dc4a2ba871747a2044f441&favorite_artist=artistID For Content Delivery interactions between a Distributer and a Recommender, including: song skips, song likes and artist likes, for example, the behavior can be similar, as follows:

a) Client Device informs the Distributer of the preference
b) Distributer notifies the Recommender (and obtains a new playlist)
c) Distributer communicates the new playlist back to Client Device
d) Distributer stores the information in the Client Personalized Data repository 6.7 Channel Controls Modified when Client Changes Settings (Use Case: Delivering Content)

Whenever the user changes a channel control (slider) settings the new client settings are returned back to the Distributer via the XML (JSON) messages. These messages are then interpreted and result in calls to the recommender to load new rule sets.

Foreach Channel Control Setting in channel:

http://developer.XXXX.com/api/v4/playlist/dynamic/steer?api_key=N6E4NIOVYMTHNDM8J&enable-ruleset=<new-settings>&session_id=7bf982d80ed8421c8c94dbd6de565e9d 6.8 Channel Controls Modified when Channel Model Changes (Use Case: Channel Model Change)

In exemplary embodiments of the present invention, the behavior of a channel model change (i.e. changes to the slider controls as issued by Service Provider) can result in a reset of the client settings to their default positions. Therefore, whenever the channel model changes the new Channel Control Settings should be passed to the Client Device. The Client Device can then populate the UX appropriately. Concurrently, the Distributer can, for example, use the new Channel Model Setting Rule Set to create a new dynamic playlist. When the user changes the channel, it is necessary to 'restart' the session. The dynamic/restart method accepts the sessionID and all the same parameters as dynamic/create. The session history can be maintained after the restart. For example, if a user switches to 70s on 7, one would restart the session as follows:

http://developer.XXXX.com/api/v4/playlist/dynamic/restart?api_key=N6E4NIOVYMTHNDM8J&type=station-radio&seed_USER_CATALOG_ID&ruleset=70s_ON_SEVEN_RULESET&bucket=id:70S_ON_SEVEN_CATALOG_ID&session_catalog=USER_CATALOG_ID&limit=true.

It is here noted that there may be a period during a channel model change when the user is attempting to set values that the recommender is unaware of, either because the rule sets have not yet been loaded into the recommender, or the rule sets reflect elements that are no longer available. In either case, it is essential that the player continue to play music. Error codes returned by the Recommender should be handled gracefully and logged.

7. Sample Slider Mappings for '70S on 7'

The use of the mapping documents may be better understood with reference to a particular channel. The channel example provided is for '70s on 7', a channel with a well understood corpus of material. Given the specifications of the '70s on 7' channel, the informal 'control setting' to 'attribute' specification from programming for '70s on 7' can be, for example, as follows:

Lost Hits← - - - →Top Hits [Category]
Chillin'← - - - →Groovin' [Energy, Mood]
Disco/Soul← - - - →Rock [Sound, Type segue protection]

It is noted that each channel can, for example, be defined differently. Therefore, the attribute names and codes used above can differ from the text for '70s on 7' that is described below.

Figure 27:
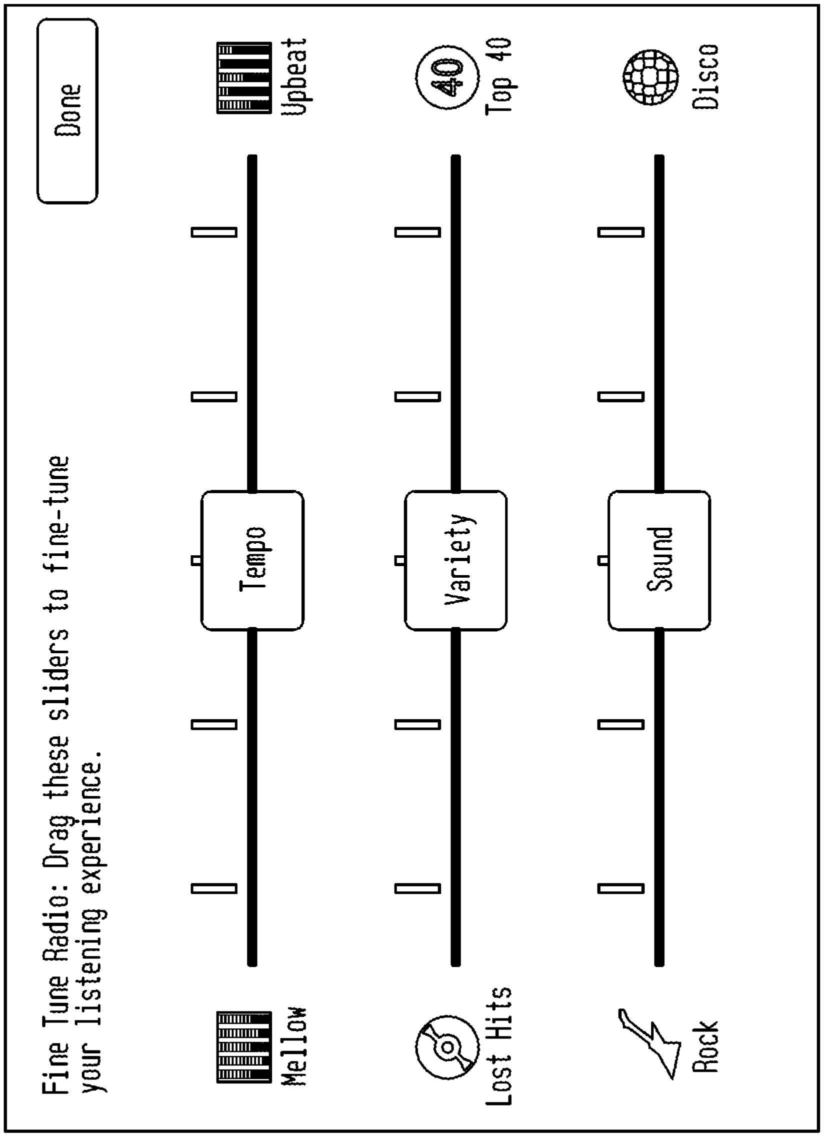
FIG. 27 depicts a magnified view of the exemplary set of sliders shown in FIGS. 23-24 and 26 according to an exemplary embodiment of the present invention.

It is noted that the UX (User Interface) screenshot shown in FIG. 27 do not use exactly the same channel specification. They use the term 'Mellow/Upbeat' for 'Chillin/Grooving', which should be understood as a notional definition of Tempo based on energy and mood as opposed to the exact attribute 'tempo' in '70s on 7'. Likewise it should be assumed that 'Top 40' means 'Top Hits' and 'Disco' means 'Disco/Soul'.

The various examples provided below illustrate the flexibility that programming has in defining a channel based on the defined control settings. These settings are not intended to define the exact behavior of a '70s on 7' personalized channel; rather, they are intended to simply illustrate channel control settings.

7.1 Linear Sliders

A Personalization Experience for '70s on 7' can be provided by three linear discrete sliders labeled, for example, Tempo, Variety and Sound. This experience can thus be modeled using three sliders and a 'simple' mapping. The following example, as well as numerous other examples provided above and in the respective figures, are taken form prototypes and designs developed by the inventors for Sirius XM Radio Inc., applicant hereof.

7.1.1 Channel Control Specification Made Available to Client Device Via Distributer The channel control specification on the client device side can thus be represented as follows:

```
<channel>
  <serialNumber>1234321</serialNumber>
        <channelKey>70son7</channelKey>
        <name>70's on 7</name>
        <defaultCrossfade encrypted="true">
                    Datablob
        </defaultCrossfade>
        <channelControlSettings>
            <skinArt>
                <encrypted>false</encrypted>
                <size>THUMBNAIL</size>
```

-continued

```
        <type>IMAGE</type>
        <id>123</id>
        <url>http://www.siriusxm.com/personalization/skins/70son7-skin.jpg</url>
    </skinArt>
    <controlSetting>
        <controlOrdinal>0</controlOrdinal>
        <controlName>Tempo</controlName>
        <controlMapping>pureRulebased</controlMapping>
        <controlType>discrete</controlType>
        <controlWeight>10</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-0-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-0-title.jpg</url>
        </titleArt>
        <term>
            <ordinal>0</ordinal>
            <name>Chillin'</name>
            <URL>http://www.siriusxm.com/personalization/skins/70son7-0-0.jpg</URL>
        </term>
        <term>
            <ordinal>1</ordinal>
            <name>Mixed Bag</name>
            <URL>http://www.siriusxm.com/personalization/skins/70son7-0-1.jpg</URL>
        </term>
        <term>
            <ordinal>2</ordinal>
            <name>Groovin</name>
            <URL>http://www.siriusxm.com/personalization/skins/70son7-0-2.jpg</URL>
        </term>
        <defaultOrdinal>1</defaultOrdinal>
    </controlSetting>
    <controlSetting>
        <controlOrdinal>1</controlOrdinal>
        <controlName>Variety</controlName>
        <controlMapping>pureRulebased</controlMapping>
        <controlType>discrete</controlType>
        <controlWeight>20</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-1-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-1-title.jpg</url>
        </titleArt>
        <term>
            <ordinal>0</ordinal>
            <name>Lost Hits</name>
            <URL>http://www.siriusxm.com/personalization/skins/70son7-1-0.jpg</URL>
        </term>
        <term>
            <ordinal>1</ordinal>
            <name></name>
            <URL>http://www.siriusxm.com/personalization/skins/70son7-1-1.jpg</URL>
        </term>
        <term>
            <ordinal>2</ordinal>
            <name>Top Hits</name>
            <URL>http://www.siriusxm.com/personalization/skins/70son7-1-2.jpg</URL>
        </term>
        <defaultOrdinal>2</defaultOrdinal>
        <defaultRuleset>70son7-defaulthits</defaultRuleset>
    </controlSetting>
```

-continued

```
            <controlSetting>
                <controlOrdinal>2</controlOrdinal>
                <controlName>Sound</controlName>
                <controlMapping>pureRulebased</controlMapping>
                <controlType>discrete</controlType>
                <controlWeight>10</controlWeight>
                <controlArt>
                    <encrypted>false</encrypted>
                    <size>THUMBNAIL</size>
                    <type>IMAGE</type>
                    <id>123</id>
                    <url>http://www.siriusxm.com/personalization/skins/70son7-2-control.jpg</url>
                </controlArt>
                <titleArt>
                    <encrypted>false</encrypted>
                    <size>THUMBNAIL</size>
                    <type>IMAGE</type>
                    <id>123</id>
                    <url>http://www.siriusxm.com/personalization/skins/70son7-2-title.jpg</url>
                </titleArt>
                <term>
                    <ordinal>0</ordinal>
                    <name>60s</name>
                    <URL>http://www.siriusxm.com/personalization/skins/70son7-2-0.jpg</URL>
                </term>
                <term>
                    <ordinal>1</ordinal>
                    <name>70s</name>
                    <URL>http://www.siriusxm.com/personalization/skins/70son7-2-1.jpg</URL>
                </term>
                <term>
                    <ordinal>2</ordinal>
                    <name>80s</name>
                    <URL>http://www.siriusxm.com/personalization/skins/70son7-2-2.jpg</URL>
                </term>
                <defaultOrdinal>1</defaultOrdinal>
            </controlSetting>
    </channelControlSettings>
</channel>
```

7.1.2 Channel Control Specification Provided to Distributer by Service Provider Feed A channel control specification on the recommender side can, for example, be represented as follows:

```
<channel>
    <serialNumber>1234321</serialNumber>
    <channelKey>70son7</channelKey>
    <name>70's on 7</name>
    <channelState>available</channelState>
    <!-- new, change, available, deleted, erased -->
    <description>Text about 70s on 7</description>
    <coloration>Custom-10-SXM AGC ONLY</coloration>
    <!-- various colorizations to be provided -->
        <entitlementPackage>
        <number>100</number>
        <number>200</number>
        <number>500</number>
    </entitlementPackage>
    <DRM>
        <ProgramDRM>
            <Record_Restriction>
                <record>Approved</record>
                <distribution>00000000</distribution>
            </Record_Restriction>
            <Good_From_Date>1900-01-01T01:01:01-05:00</Good_From_Date>
            <Expiration_Date>1900-01-01T01:01:01-05:00</Expiration_Date>
            <Number_Of_Plays>0</Number_Of_Plays>
            <Share_Flag>false</Share_Flag>
        </ProgramDRM>
        <ProgramDMCA>
            <ir_Nav_Class>Restricted2</ir_Nav_Class>
            <Play_On_Select>Newest0</Play_On_Select>
            <Max_Fwd_Skips>5</Max_Fwd_Skips>
```

-continued

```
            <Max__Back__Skips>1</Max__Back__Skips>
            <Max__Fwd__Dur>12</Max__Fwd__Dur>
            <Max__Back__Dur>12</Max__Back__Dur>
        </ProgramDMCA>
    </DRM>
    <libraryCatalog>
        <song>
            <sxmAutomationID>70son7-N-432057-001</sxmAutomationID>
            <artist>Dire Straits</artist>
            <title>Romeo and Juilet</title>
        </song>
        <song>
            <sxmAutomationID>70son7-N-112344-002</sxmAutomationID>
            <artist>Dire Straits</artist>
            <title>Telegraph Road</title>
        </song>
        <song>
            <sxmAutomationID>70son7-D-LE124333-001</sxmAutomationID>
            <artist>The Beatles</artist>
            <title>Mrs Robinson</title>
        </song>
    </libraryCatalog>
    <defaultCrossfade encrypted="true"
          datablob
    </defaultCrossfade>
    <channelControlSettings>
        <baseRuleset>70son7</baseRuleset>
        <skinArt>
            <encrypted>false</encrypted>
            <size>THUMBNAIL</size>
            <type>IMAGE</type>
            <id>123</id>
            <url>http://www.siriusxm.com/personalization/skins/70son7-skin.jpg</url>
        </skinArt>
        <controlSetting>
            <controlOrdinal>0</controlOrdinal>
            <controlName>Tempo</controlName>
            <controlMapping>pureRulebased</controlMapping>
            <controlType>discrete</controlType>
            <controlWeight>10</controlWeight>
            <controlArt>
                <encrypted>false</encrypted>
                <size>THUMBNAIL</size>
                <type>IMAGE</type>
                <id>123</id>
                <url>http://www.siriusxm.com/personalization/skins/70son7-0-control.jpg</url>
            </controlArt>
            <titleArt>
                <encrypted>false</encrypted>
                <size>THUMBNAIL</size>
                <type>IMAGE</type>
                <id>123</id>
                <url>http://www.siriusxm.com/personalization/skins/70son7-0-title.jpg</url>
            </titleArt>
            <term>
                <ordinal>0</ordinal>
                <name>Chillin'</name>
                <URL>http://www.siriusxm.com/personalization/skins/70son7-0-0.jpg</URL>
                <ruleset>70son7-chillin</ruleset>
            </term>
            <term>
                <ordinal>1</ordinal>
                <name>Mixed Bag</name>
                <URL>http://www.siriusxm.com/personalization/skins/70son7-0-1.jpg</URL>
                <ruleset>70son7-chillingrovin</ruleset>
            </term>
            <term>
                <ordinal>2</ordinal>
                <name>Groovin</name>
                <URL>http://www.siriusxm.com/personalization/skins/70son7-0-2.jpg</URL>
                <ruleset>70son7-groovin</ruleset>
            </term>
            <defaultOrdinal>1</defaultOrdinal>
            <defaultRuleset>70son7-tempo</defaultRuleset>
        </controlSetting>
        <controlSetting>
            <controlOrdinal>1</controlOrdinal>
            <controlName>Variety</controlName>
            <controlMapping>pureRulebased</controlMapping>
```

-continued

```
        <controlType>discrete</controlType>
        <controlWeight>20</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-1-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-1-title.jpg</url>
        </titleArt>
        <term>
            <ordinal>0</ordinal>
            <name>Lost Hits</name>
            <URL>http://www.siriusxm.com/personalization/skins/70son7-1-0.jpg</URL>
            <ruleset>70son7-losthits</ruleset>
        </term>
        <term>
            <ordinal>1</ordinal>
            <name></name>
            <URL>http://www.siriusxm.com/personalization/skins/70son7-1-1.jpg</URL>
            <ruleset>70son7-broadhits</ruleset>
        </term>
        <term>
            <ordinal>2</ordinal>
            <name>Top Hits</name>
            <URL>http://www.siriusxm.com/personalization/skins/70son7-1-2.jpg</URL>
            <ruleset>70son7-tophits</ruleset>
        </term>
        <defaultOrdinal>2</defaultOrdinal>
        <defaultRuleset>70son7-defaulthits</defaultRuleset>
    </controlSetting>
    <controlSetting>
        <controlOrdinal>2</controlOrdinal>
        <controlName>Sound</controlName>
        <controlMapping>pureRulebased</controlMapping>
        <controlType>discrete</controlType>
        <controlWeight>10</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-2-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-2-title.jpg</url>
        </titleArt>
        <term>
            <ordinal>0</ordinal>
            <name>60s</name>
            <URL>http://www.siriusxm.com/personalization/skins/70son7-2-0.jpg</URL>
            <ruleset>70son7-disco</ruleset>
        </term>
        <term>
            <ordinal>1</ordinal>
            <name>70s</name>
            <URL>http://www.siriusxm.com/personalization/skins/70son7-2-1.jpg</URL>
            <ruleset>70son7-discorock</ruleset>
        </term>
        <term>
            <ordinal>2</ordinal>
            <name>80s</name>
            <URL>http://www.siriusxm.com/personalization/skins/70son7-2-2.jpg</URL>
            <ruleset>70son7-rock</ruleset>
```

-continued

```
            </term>
            <defaultOrdinal>1</defaultOrdinal>
            <defaultRuleset>70son7-sound</defaultRuleset>
        </controlSetting>
    </channelControlSettings>
</channel>
```

7.1.3 Channel Control Specification Provided to Recommender by Service Provider Feed A channel control specification on the recommender side can further be represented to include as follows:

```
<channel>
    <serialNumber>1234321</serialNumber>
    <channelKey>70son7</channelKey>
    <name>70's on 7</name>
    <channelState>available</channelState>
    <!-- new, change, available, deleted, erased -->
    <description>Text about 70s on 7</description>
    <coloration>Custom-10-SXM AGC ONLY</coloration>
    <!-- various colorizations to be provided -->
    <entitlementPackage>
        <number>100</number>
        <number>200</number>
        <number>500</number>
    </entitlementPackage>
    <DRM>
        <ProgramDRM>
            <Record__Restriction>
                <record>Approved</record>
                <distribution>00000000</distribution>
            </Record__Restriction>
            <Good__From__Date>1900-01-01T01:01:01-05:00</Good__From__Date>
            <Expiration__Date>1900-01-01T01:01:01-05:00</Expiration__Date>
            <Number__Of__Plays>0</Number__Of__Plays>
            <Share__Flag>false</Share__Flag>
        </ProgramDRM>
        <ProgramDMCA>
            <ir__Nav__Class>Restricted2</ir__Nav__Class>
            <Play__On__Select>Newest0</Play__On__Select>
            <Max__Fwd__Skips>5</Max__Fwd__Skips>
            <Max__Back__Skips>1</Max__Back__Skips>
            <Max__Fwd__Dur>12</Max__Fwd__Dur>
            <Max__Back__Dur>12</Max__Back__Dur>
        </ProgramDMCA>
    </DRM>
    <libraryCatalog>
        <song>
            <sxmAutomationID>70son7-N-432057-001</sxmAutomationID>
            <artist>Dire Straits</artist>
            <title>Romeo and Juilet</title>
        </song>
        <song>
            <sxmAutomationID>70son7-N-112344-002</sxmAutomationID>
            <artist>Dire Straits</artist>
            <title>Telegraph Road</title>
        </song>
        <song>
            <sxmAutomationID>70son7-D-LE124333-001</sxmAutomationID>
            <artist>The Beatles</artist>
            <title>Mrs Robinson</title>
        </song>
    </libraryCatalog>
    <channelControlSettings>
        <baseRuleset>70son7</baseRuleset>
        <skinArt>
            <encrypted>false</encrypted>
            <size>THUMBNAIL</size>
            <type>IMAGE</type>
            <id>123</id>
            <url>http://www.siriusxm.com/personalization/skins/70son7-skin.jpg</url>
        </skinArt>
        <controlSetting>
            <controlOrdinal>0</controlOrdinal>
            <controlName>Tempo</controlName>
            <controlMapping>pureRulebased</controlMapping>
```

-continued

```
        <controlType>discrete</controlType>
        <controlWeight>10</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-0-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-0-title.jpg</url>
        </titleArt>
        <term>
            <ordinal>0</ordinal>
            <name>Chillin'</name>
            <URL>http://www.siriusxm.com/personalization/skins/70son7-0-0.jpg</URL>
            <ruleset>70son7-chillin</ruleset>
        </term>
        <term>
            <ordinal>1</ordinal>
            <name>Mixed Bag</name>
            <URL>http://www.siriusxm.com/personalization/skins/70son7-0-1.jpg</URL>
            <ruleset>70son7-chillingrovin</ruleset>
        </term>
        <term>
            <ordinal>2</ordinal>
            <name>Groovin</name>
            <URL>http://www.siriusxm.com/personalization/skins/70son7-0-2.jpg</URL>
            <ruleset>70son7-groovin</ruleset>
        </term>
        <defaultOrdinal>1</defaultOrdinal>
        <defaultRuleset>70son7-tempo</defaultRuleset>
    </controlSetting>
    <controlSetting>
        <controlOrdinal>1</controlOrdinal>
        <controlName>Variety</controlName>
        <controlMapping>pureRulebased</controlMapping>
        <controlType>discrete</controlType>
        <controlWeight>20</controlWeight>
        <controlArt>
            <encrypted>false</encrypted>
            <size>THUMBNAIL</size>
            <type>IMAGE</type>
            <id>123</id>
            <url>http://www.siriusxm.com/personalization/skins/70son7-1-control.jpg</url>
        </controlArt>
        <titleArt>
            <encrypted>false</encrypted>
            <size>THUMBNAIL</size>
            <type>IMAGE</type>
            <id>123</id>
            <url>http://www.siriusxm.com/personalization/skins/70son7-1-title.jpg</url>
        </titleArt>
        <term>
            <ordinal>0</ordinal>
            <name>Lost Hits</name>
            <URL>http://www.siriusxm.com/personalization/skins/70son7-1-0.jpg</URL>
            <ruleset>70son7-losthits</ruleset>
        </term>
        <term>
            <ordinal>1</ordinal>
            <name></name>
            <URL>http://www.siriusxm.com/personalization/skins/70son7-1-1.jpg</URL>
            <ruleset>70son7-broadhits</ruleset>
        </term>
        <term>
            <ordinal>2</ordinal>
            <name>Top Hits</name>
            <URL>http://www.siriusxm.com/personalization/skins/70son7-1-2.jpg</URL>
            <ruleset>70son7-tophits</ruleset>
        </term>
        <defaultOrdinal>2</defaultOrdinal>
        <defaultRuleset>70son7-defaulthits</defaultRuleset>
    </controlSetting>
    <controlSetting>
```

-continued

```
            <controlOrdinal>2</controlOrdinal>
            <controlName>Sound</controlName>
            <controlMapping>pureRulebased</controlMapping>
            <controlType>discrete</controlType>
            <controlWeight>10</controlWeight>
            <controlArt>
                <encrypted>false</encrypted>
                <size>THUMBNAIL</size>
                <type>IMAGE</type>
                <id>123</id>
                <url>http://www.siriusxm.com/personalization/skins/70son7-2-control.jpg</url>
            </controlArt>
            <titleArt>
                <encrypted>false</encrypted>
                <size>THUMBNAIL</size>
                <type>IMAGE</type>
                <id>123</id>
                <url>http://www.siriusxm.com/personalization/skins/70son7-2-title.jpg</url>
            </titleArt>
            <term>
                <ordinal>0</ordinal>
                <name>60s</name>
                <URL>http://www.siriusxm.com/personalization/skins/70son7-2-0.jpg</URL>
                <ruleset>70son7-disco</ruleset>
            </term>
            <term>
                <ordinal>1</ordinal>
                <name>70s</name>
                <URL>http://www.siriusxm.com/personalization/skins/70son7-2-1.jpg</URL>
                <ruleset>70son7-discorock</ruleset>
            </term>
            <term>
                <ordinal>2</ordinal>
                <name>80s</name>
                <URL>http://www.siriusxm.com/personalization/skins/70son7-2-2.jpg</URL>
                <ruleset>70son7-rock</ruleset>
            </term>
            <defaultOrdinal>1</defaultOrdinal>
            <defaultRuleset>70son7-sound</defaultRuleset>
        </controlSetting>
    </channelControlSettings>
</channel>
```

8. Supporting Interstitial Elements

Interstitial elements are short audio clips that are used to provide station jingles, promos (brief announcements that promote some event/asset), celebrity endorsements etc. Interstitials are represented using the same audio compression as other assets but are usually shorter in duration (from a few seconds to 30 seconds). Interstitial elements are represented by clipRecords in much the same way as songs, except that they are tagged by the audio category interstitialArtist, interstitialGeneral or promo. From a programming perspective, interstitials can be tagged with relevant categories, and can, for example, be included into the playlist by the inclusion of the appropriate rules into the channel specifications, so that the recommender includes them at the correct locations.

From a channel specification perspective interstitials are considered to be a controllable element just like any other clipRecord and are therefore their occurrence in a playlist can represented as a controlSetting with exactly two (2) positions. Because interstitials have a somewhat different representation on the client device, they are manifest as a new controlType called “button”. A button signifies a binary control setting that should be displayed as a button. This controlType information is expected to be passed thru and made available to the client device. An example representation of an interstitial control setting, as communicated by the Service Provider to the Distributer/Recommender can be, for example:

```
<controlSetting>
    <controlOrdinal>0</controlOrdinal>
    <contrelName>Enable Interstitials</controlName>
    <controlMapping>pureRulebased</controlMapping>
    <controlType>button</controlType>
    <controlVisibility>hidden</controlVisibility>
    <controlWeight>0</controlWeight>
    <term>
        <ordinal>0</ordinal>
        <ruleset>RSQPS343234343434</ruleset>
    </term>
    <term>
        <ordinal>1</ordinal>
        <ruleset>RSQPS1212121212112</ruleset>
    </term>
    <defaultOrdinal>0</defaultOrdinal>
    <defaultRuleset>RSQPS343234343434</defaultRuleset>
</controlSetting>
```

As with all other rules, if interstitial control settings are provided for a particular channel, the Distributer is responsible for enabling the appropriate rulesets based on the default position, and for allowing the position to be changed based on steering from the client device. In this manner Interstitials behave exactly like other control settings.

From a channel specification perspective it is possible to hide from the User the client device side adjustments to interstitials. The ability to hide a control setting from users view can, for example, be manifest as a new controlVisibility which can be “hidden” or “visible”. In exemplary embodiments of the present invention, this information is expected to be passed thru and made available to the client device. From a UI perspective this implies that the button to change interstitials is invisible (or grayed out etc.) and may not be adjusted by the User, however the value may be adjusted just like any slider by the client device.

From a content distribution perspective interstitial clip-Records can be indicated by the <category> field. In exemplary embodiments of the present invention, this information can, for example, be passed thru to the client device whenever a clip is played is made available for playout via the genreName. The genreName can, for example, be composed of a dotted notation starting with the <category> field as provided to the Distributer, and then augmented with the topic/subtopic fields if available. Such as, for example, "interstitialGeneral", or "music.jazz.neworleansjazz".

9. Un-Personalizing Channels

A channel can, for example, be un-personalized by the client; this indicates that the user wants to re-enter the personalization service as though they had not personalized the channel previously, i.e. reset the personalization to the channel defaults (thereby erasing the effect of their various preferences and listening habits, effectively a "restore system defaults"). This service function can be accomplished by the client device providing a channel steer with NULL channel specification.

10. Supporting ToolTips

Every controlSetting may have an optional tooltip as indicated by the optional <controlTooltip> field. This field may be used to provide a general narrative for the controlSetting. In addition, each term position within a control setting from having an optional name, the term position may also have an optional <tooltip> field. This field can be used to provide a general narrative for the term position.

[End of Exemplary System Description]

Exemplary Rules

In exemplary embodiments of the present invention, the following illustrate exemplary rule sets that can be used for a personalized channel with user control:

Typical Base Behavior

Default Channel Ruleset:
- do not repeat songs that share artist keywords in 2.75 hours;
- do not repeat a song in 3.25 hours;
- never play 2 songs with a female role in a row;
- Etc. . . .
  - developer.XXXX.com/api/v4/playlist/dynamic/steer?session=session_id&enable_ruleset=70son7

Example Discrete Rule Sets
- An Era rule set covering three positions: 60s-any-70s
- all eras rule set:
  - give equal preference to songs from the 60s and 70s
  - enforce standard era segue rules
- 60s_era rule set:
  - give very strong preference to songs from the 60s
  - give little preference to songs from the 70s
  - disable era segue rules
  - allow scheduling of songs in the 'extra' category to increase the available song pool
- 70s_era rule set:
  - give very strong preference to songs from the 70s
  - give little preference to songs from the 60s
  - disable era segue rules
  - allow scheduling of songs in the 'extra' category to increase the available song pools
- (Only one rule set can be active at a time)
  - developer.XXXX.com/api/v4/playlist/dynamic/steer?session=session_id&enable_ruleset=60s_era Example Continuous Rule Sets
- A continuous ruleset for tempo over a range [0 . . . 1]
- all_tempos rule set:
  - give equal preference to songs from all tempo ranges
  - give equal preference to songs from all energy ranges
  - enforce standard tempo segue rules
  - enforce standard energy segue rules
- slow_tempo rule set:
  - give high weighted preference to slow tracks
  - give modest weighted preference to songs that start slow and end medium
  - give modest weighted preference to songs that start medium and end slow
  - eliminate tempo segue and quota restrictions on slow and medium songs
  - give high weighted preference to low energy tracks
  - give modest weighted preference to medium energy tracks
  - eliminate energy segue and quota restrictions on low and medium energy songs
  - expand the pool of active songs to include deeper tracks to guarantee that we will have enough slow and low energy tracks to make good playlists
- fast_tempo rule set:
  - give high weighted preference to fast tracks
  - give modest weighted preference to songs that start fast and end medium
  - give modest weighted preference to songs that start medium and end fast
  - eliminate tempo segue and quota restrictions on fast and medium songs
  - give high weighted preference to high energy tracks
  - give modest weighted preference to medium energy tracks
  - eliminate energy segue and quota restrictions on high and medium energy songs
  - expand the pool of active songs to include deeper tracks to guarantee that will have enough fast and high energy tracks to make good playlists
- developer.xxxx.com/api/v4/playlist/dynamic/steer?session=session_id&enable_ruleset=slow_tempo:0.5

Desired Behavior Overview
1. Want to be able to characterize a channel by:
   - A set of base rules further refined by:
   - Sets of rules for each slider:
     - For discrete 'sliders', a set of rules for each position.
     - For continuous 'sliders', weighting direction for the rules based on slider position.
2. Want to provide a playlist experience for a particular Client based on
   - The Channel base rules further refined by
   - The Clients current 'slider' settings along with
   - The Clients personal preferences (taste profile)

FIGS. 28-42, next described, illustrate an exemplary content distribution system and the roles of various components of that system according to an exemplary embodiment of the present invention. With reference thereto, there is shown a Recommender 2810, that can recommend audio content for play on a user's personalized music channel, a Content Service Provider 2820, a Distributer 2830, and a Client Device 2840. As noted above, the functions or entities "Recommender", "Distributer" and Content Service Provider" are logical, not required, delineations. Moreover, some of the figures may contain references to particular real-world recommenders or distributors. This is purely exemplary, and in no way limiting.

Figure 28:
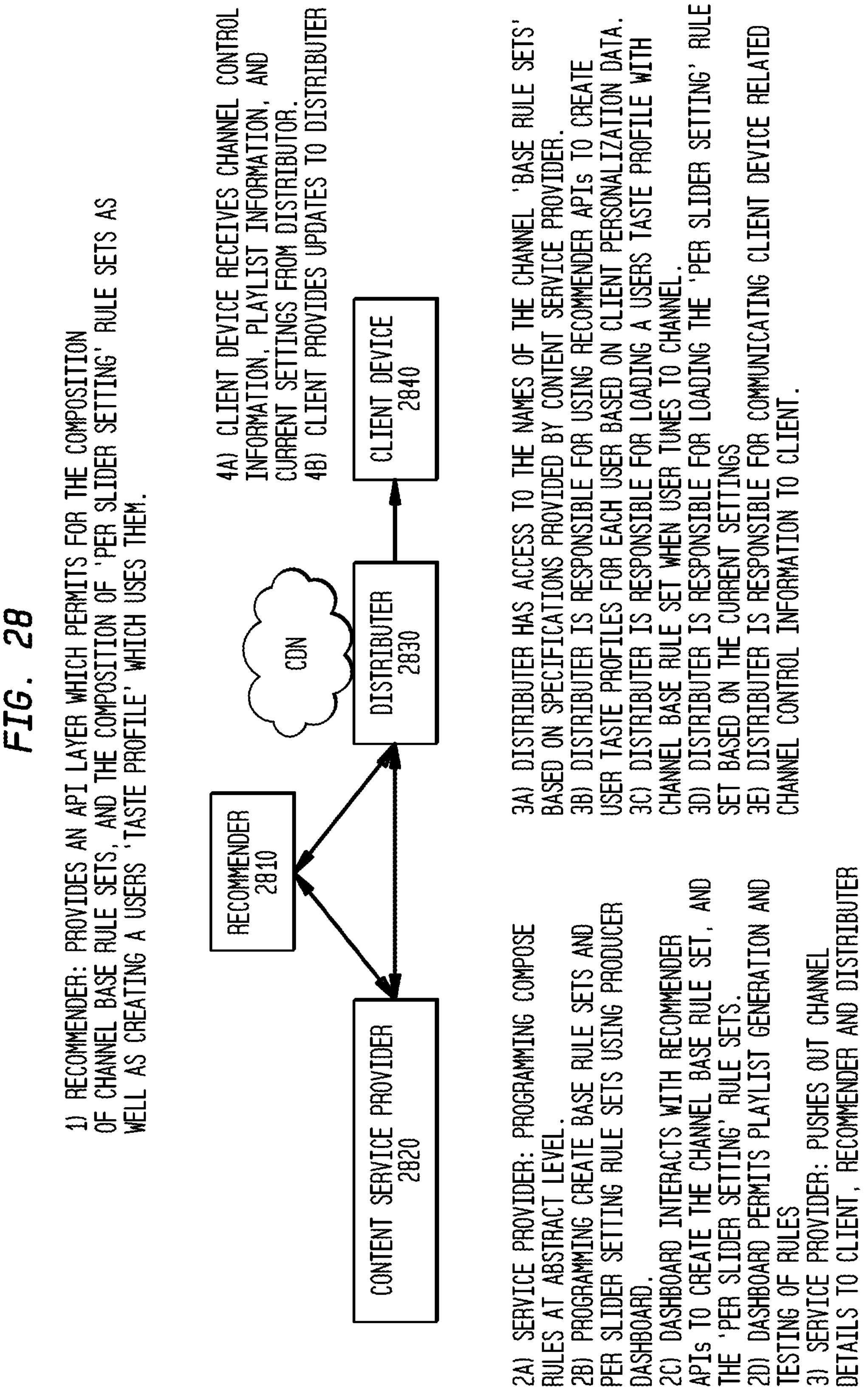
FIG. 28 depicts an exemplary content distribution system and the roles of various components of that system.

As shown in FIG. 28, these various (logical) players each contribute different aspects, and perform various functionalities, within the overall exemplary system, as follows:

Recommender

1) Recommender: Provides an API layer which permits for the composition of channel base rule sets, and the composition of 'per slider setting' rule sets as well as creating a users 'taste profile' which uses them.

Content Service Provider

2a) Service Provider: Programming compose rules at abstract level.

2b) Programming create base rule sets and per slider setting rule sets using Producer Dashboard.

2c) Dashboard interacts with Recommender APIs to create the channel base rule set, and the 'per slider setting' rule sets.

2d) Dashboard permits playlist generation and testing of rules

3) Service Provider: Pushes out channel details to client, recommender and distributer.

Distributer

3a) Distributer has access to the names of the channel 'base rule sets' based on specifications provided by content service provider.

3b) Distributer is responsible for using Recommender APIs to create user taste profiles for each user based on client personalization data.

3c) Distributer is responsible for loading a users taste profile with channel base rule set when user tunes to channel.

3d) Distributer is responsible for loading the 'per slider setting' rule set based on the current settings 3e) Distributer is responsible for communicating client device related channel control information to client.

Client Device

4a) Client device receives channel control information, playlist information, and current settings from Distributor.

4b) Client provides updates to Distributer.

Figure 29:
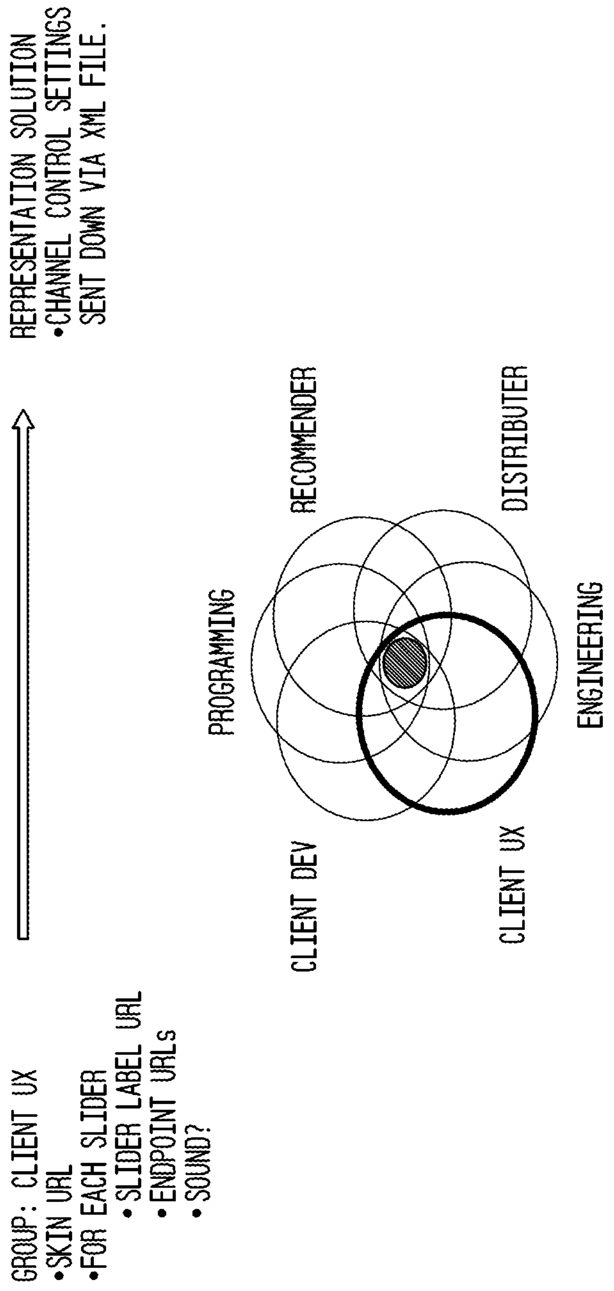

FIGS. 29-34 illustrate how various development groups or function providers can collaborate to create a personalized channel. Each group or function of the design team provides or creates content and a provides a representation solution as shown:

Thus, as shown in FIG. 29:

Group: Client UX (User Interface) creates:

Skin URL

For each slider

Slider Label URL

Endpoint URLs

Sound

Provides a Representation Solution

Channel Control Settings sent down via XML file.

Figure 30:
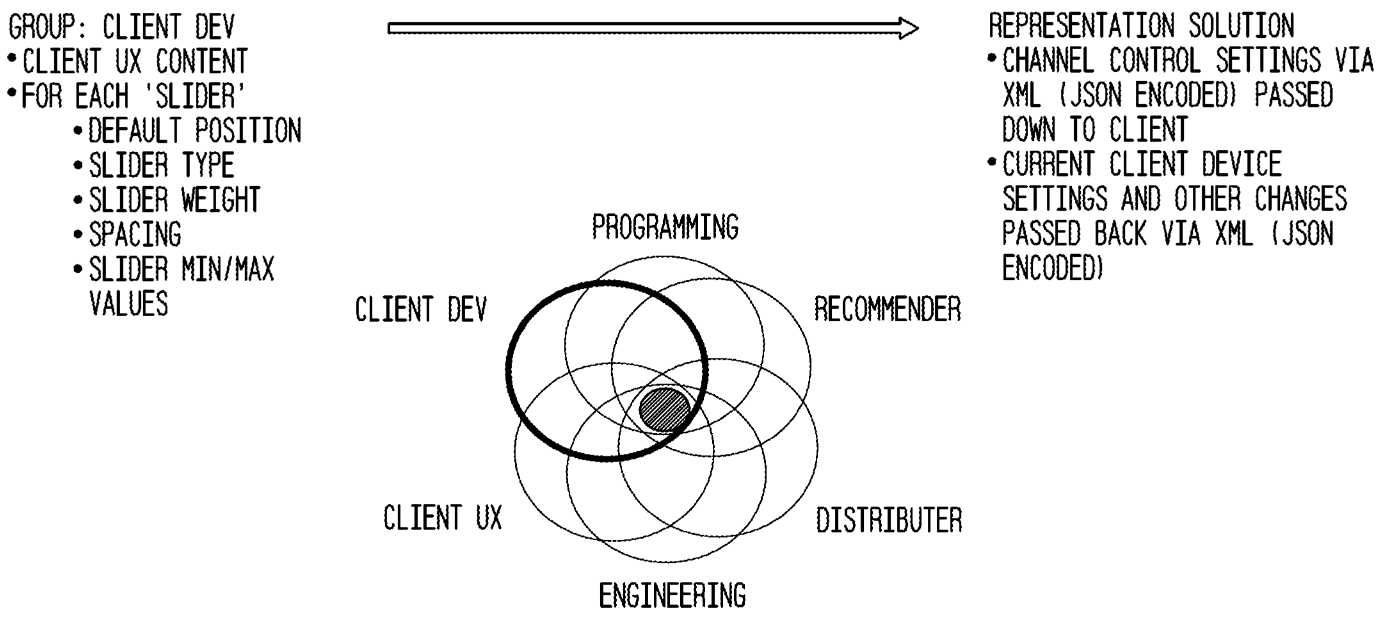

As shown in FIG. 30—Group: Client Development creates:

Client UX content

For each 'slider': Default position, Slider type, Slider weight, Spacing, and Slider min/max values And provides a Representation Solution Channel Control Settings via XML (JSON encoded) passed down to client Current client device settings and other changes passed back via XML (JSON encoded)

Figure 31:
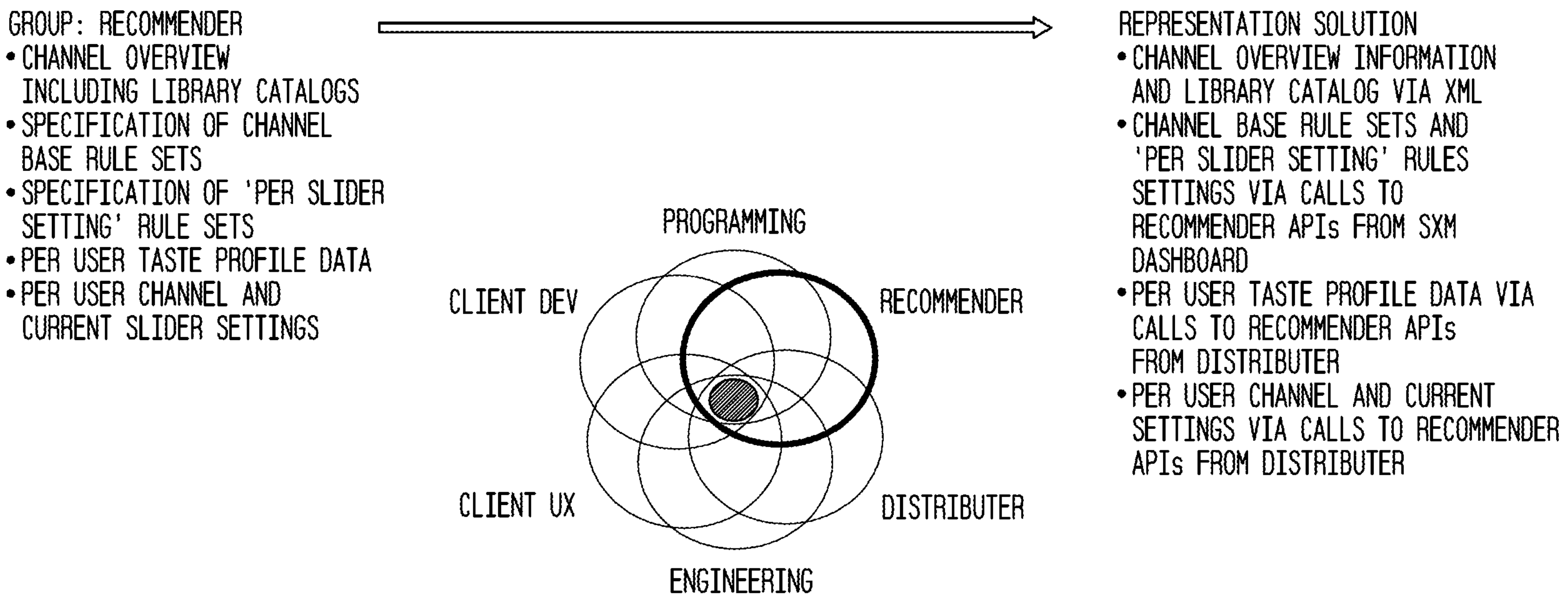

As shown in FIG. 31—Group: Recommender creates:

Channel overview including library catalogs

Specification of channel base rule sets

Specification of 'per slider setting' rule sets

Per user taste profile data

Per user channel and current slider settings

And provides a Representation Solution

Channel overview information and library catalog via XML

Channel base rule sets and 'per slider setting' rules settings via calls to Recommender APIs from SXM Dashboard Per user taste profile data via calls to Recommender APIs from Distributer Per user channel and current settings via calls to Recommender APIs from Distributer As shown in FIG. 32—Group: Distributer creates:

Channel overview including library catalogs

Names of channel base rule sets

Specification of sliders including: names of slider modules to load/unload, and slider information for client device incl UXneeds Client taste profiles And provides a Representation Solution Channel overview library catalogs and names of base rule sets via XML Channel Control Settings via XML Channel Control Settings passed down to client via XML (JSON encoded)

Current client device settings and other changes passed back via XML (JSON encoded)

Interactions with Recommender load/unload rule sets using names via Recommender APIs Interactions with Recommender to create/store taste profiles via Recommender APIs As shown in FIG. 33—Group: Programming creates:

Channel Overviews and Library Catalogs

Base channel rule sets

Per Slider setting rule sets

Slider model (number/type)

Select UX Graphics for Sliders

Channel Slider Settings

Channel default positions

Sample Playlists

And provides a Representation Solution

Channel overviews and content entered into Producer Dashboard using auto extraction from Music Master Base channel and 'per slider setting' rule sets entered into Dashboard, Dashboard uses Recommender APIs to create sets in Recommender system Slider models (number and type)

UX Graphics URLs for Sliders entered into Dashboard

Channel default positions entered into Dashboard.

Sample playlists generated by Dashboard using catalog info stored in Recommender And, as shown in FIG. 34—Group: Engineering creates:

Rendition of Channels that can be consumed by: Recommender, Distributer, and Client Device Extracted from back end systems and/or created by programming using Producer dashboard Channel base and 'per slider' Rule sets in Recommender created via Dashboard And provides a Representation Solution Channel overview information, library catalog and Channel Control Settings including names of channel base rule sets and 'per slider settings' via XML. Representation permits downstream use of selected data items for differing uses.

Channel base rule sets and 'per slider setting' rules settings via calls to Recommender APIs from SXM Dashboard Further Details of Channel Specifications, Overviews, Control Settings and Rules FIGS. 35-42, next described, provide further details regarding each of the Channel Specification, Channel Overview, Channel Library Catalog, Channel Control Setting, and the exemplary rule set: "pureRuleSet", for both the continuous and discrete cases, as described above.

With reference thereto, FIG. 35 illustrates how an exemplary Channel Specification, as shown, may be exposed via PWSP and may, for example, be used for several different purposes, namely: (i) by the Client Device to construct UX (User Interface); (ii) by the Client Device to set up controls; (iii) by the Distributer to know how to install/remove rulesets; (iv) by the Distributer to know clip library for the channel; and (v) by the Recommender to know the clip library for the channel.

FIG. 36 illustrates how an exemplary Channel Overview, as shown, can provide generic information for the channel: (i) to Client Device to know the name of the channel, entitlements for validation, DMCA compliance rules; (ii) to the Distributer to know name of channel, entitlements for validation, DMCA compliance rules, status of channel, how to colorize content, details on base rule set; and (iii) to the Recommender to know name of channel, attribute definitions details on base rule set.

FIG. 37 illustrates how an exemplary Channel Library Catalog, as shown, can provide generic information for the assets in the channel: to the Distributer to know the list of assets in the channel; and (ii) to the Recommender to know the list of assets in the channel. FIG. 38 illustrates how an exemplary Channel Control Setting, as shown, can provide information for the sliders: (i) to the Client Device to know the name of Skins to use, and images for sliders, slider labels and values for each slider position; (ii) to the Distributer to know name of rule sets for each slider position to provide to the Recommender during changes; and (iii) to the Recommender to know the name of rule sets for each slider position for validation.

Figure 41:
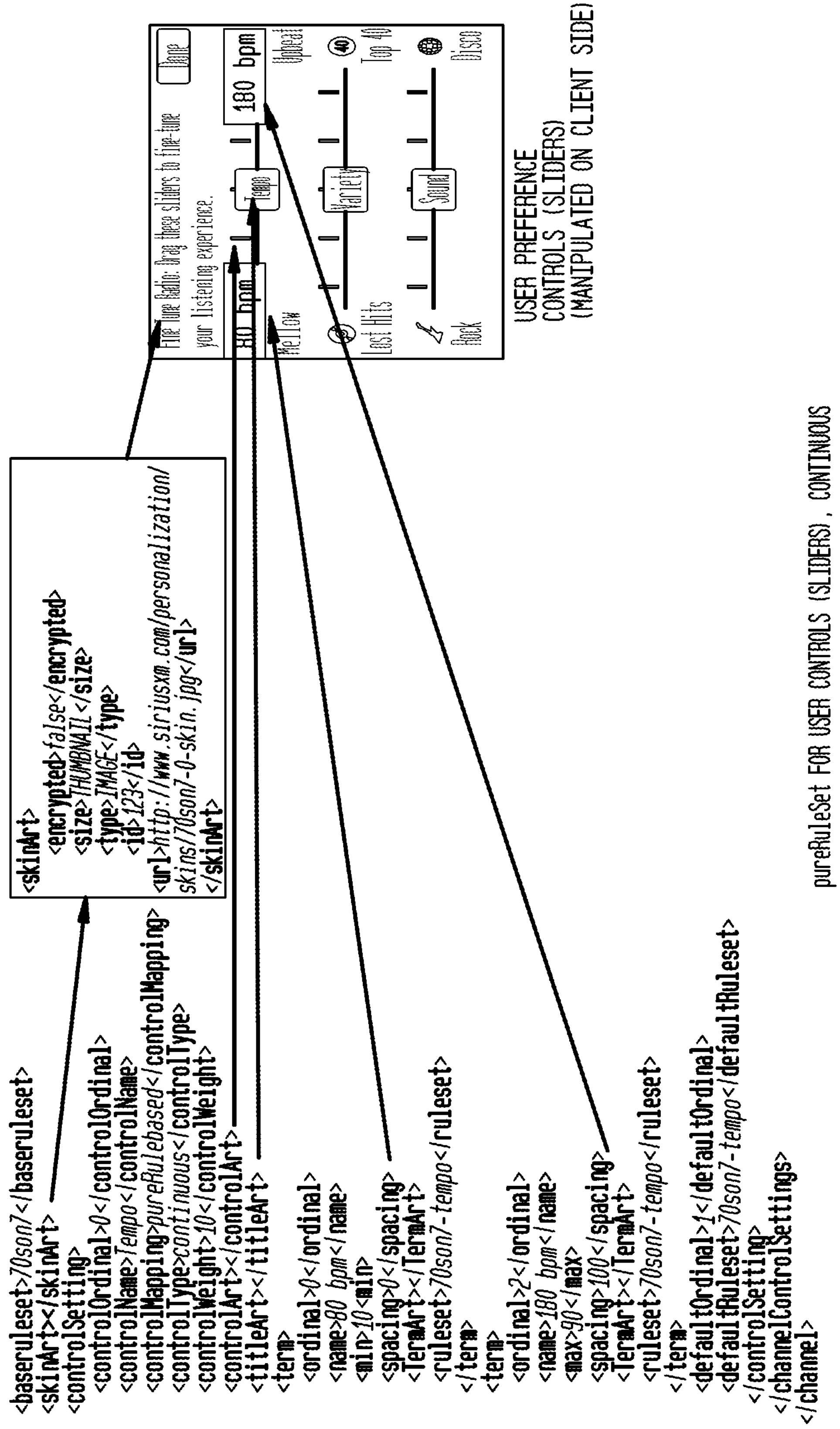
FIG. 41 illustrates how an exemplary rule set for user controls (here sliders) for a continuous case maps to user controls according to an exemplary embodiment of the present invention.
Figure 42:
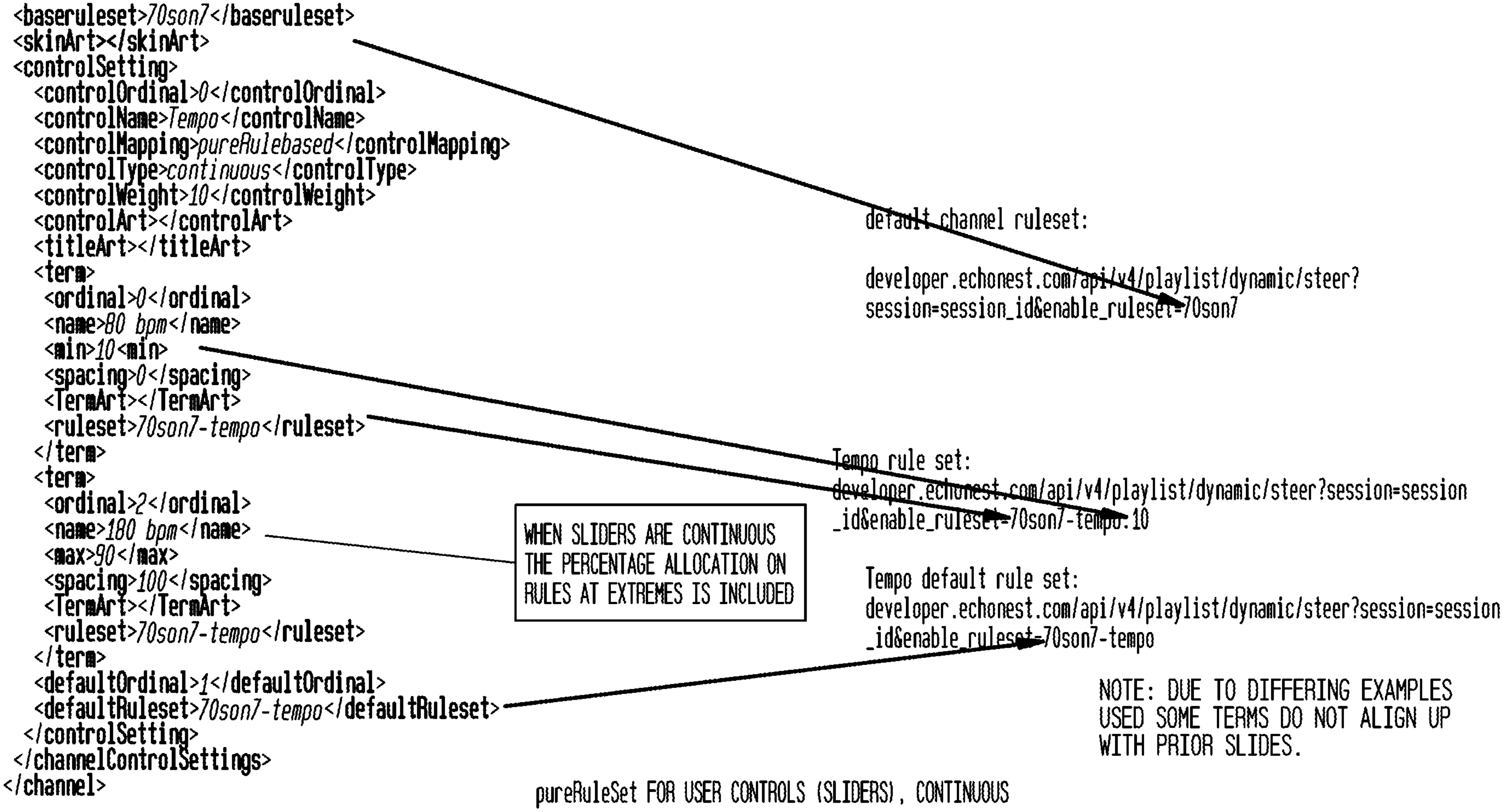
FIG. 42 illustrates how the exemplary rule set for user controls (here sliders) for a continuous case maps to various Recommender provided rule sets according to an exemplary embodiment of the present invention.

FIG. 39 illustrates how an exemplary rule set for user controls (here sliders) for a discrete case, shown here within <controlSetting>, can map to user controls according to an exemplary embodiment of the present invention. Similarly, FIG. 40 illustrates how the exemplary rule set for user controls (here sliders) for a discrete case, seen here, maps to various Recommender provided rule sets according to an exemplary embodiment of the present invention. FIG. 41 illustrates how the exemplary rule set for user controls (here sliders) for a continuous case, seen in FIG. 41, maps to user controls according to an exemplary embodiment of the present invention. Similarly, FIG. 42 illustrates how the exemplary rule set for user controls (here sliders) for a continuous case, as shown, maps to various Recommender provided rule sets according to an exemplary embodiment of the present invention.

The methods and systems of the disclosed subject matter are optionally used in a computerized network environment, comprising one or more computing platforms and client devices, which themselves are provided with one or more data processors and related components. Each program may be independent and activated by a user, or may be activated by another program or service. Each program can supply one or more services which may require different parameters.

A computing platform used for the methods disclosed above can be a server, a desktop computer, a laptop computer, a client device such as smartphone or tablet, or any other computing platform provisioned with a Central Processing Unit (CPU) and memory and communication interface. Each program, application or service can comprise one or more sets of interrelated computer instructions, implemented in any programming language and under any development environment. A user may, for example, access the portal from the computing platform that executes the portal, from a client device, or from any other computing platform or device connected through a communication channel such as a Local Area Network (LAN), Wide Area Network (WAN), the Internet, intranet or the like, using any communication protocol.

It will be appreciated by a person skilled in the art that the disclosed systems and methods are exemplary only and that multiple other implementations can be designed without deviating from the disclosure. Any component or step can be split into a multiplicity of components or steps, while multiple components or steps can be combined into one. It will also be appreciated that further generally known or available components or steps may be required, such as utility components or steps for handling communication, storage, backup, user management, or the like.

It will be appreciated by persons skilled in the art that the present disclosure is not limited to what has been particularly shown and described hereinabove. Rather the scope of the present disclosure is defined only by the claims which follow this disclosure (following the Appendix). Those of ordinarily skill in the art will recognize that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of ordinary skill will further appreciate that the various illustrative logical blocks, modules, circuits, and algorithm steps described in connection With the embodiments disclosed herein may be implemented as electronic hardware, computer software, or combinations of both. To illustrate some exemplary embodiments, functional aspects of the invention have been described in conjunction with various blocks, modules, circuits, and steps. Whether such functionality is implemented as hardware, software, or both depends upon the particular application and design constraints imposed on the overall system. Skilled artisans may implement the described functionality in varying ways for each particular application, but such implementation decisions should not be interpreted as causing a departure from the scope of the present invention.

APPENDIX

Sample Channel XMLS

The following is an exemplary XML which can be used in exemplary embodiments of the present invention.

It is noted that ruleset identification can be used as a conduit to convey information as to what to do for recommendation for user controls, such as sliders. Thus, in what follows, the type of channel specification is somewhat different than the examples discussed above, and is of the following type:

```
<controlMapping>pureRuleset</controlMapping>
    <controlType>discrete</controlType>
    <controlVisibility>visible</controlVisibility>
```

What is claimed:

1. A system for mapping audio attributes to channel preference information, the system comprising:

a processor including a content service provider configured to provide a plurality of channels associated with a repository of content clips wherein each content clip includes at least one custom tag;

a recommendation service; and a client device comprising a user interface, the user interface including at least one user preference control, the at least one user preference control respectively mapping to:

(i) one or more audio attributes associated with content for a channel of the plurality of channels, and (ii) one or more clip records associated with the repository of the content clips, based on control setting data received by the client device, wherein interactions between a user and the at least one user preference control generate preferred attributes data that maps to a subset of the one or more audio attributes and at least one clip of the clip records, that is transmitted to the content service provider, and wherein the recommendation service generates a customized playlist of channel-specific content items, by assessing a value of the at least one custom tag, for the user based on application of one or more channel-specific rulesets to the preferred audio attributes data, wherein the user dynamically adjusts the at least one user preference control after receiving a first customized playlist of channel-specific content items and the recommendation service dynamically performs a session restart and generates a second customized playlist of channel-specific content items based on the adjusted user preference control;

wherein the at least one custom tag is used by the recommendation service to generate the second customized playlist based on at least one slider setting and what the at least one slider position is mapped to;

wherein the mapping is a weighted matrix mapping;

wherein the at least one user preference control is generated within the user interface and includes spider plots comprising multiple sliders;

wherein mapping the channel and clip characterizations to the at least one user preference control is further effected as a union mapping.

2. The system of claim 1, wherein the control setting data includes at least one of (i) channel and clip characterizations, and (ii) values for custom categories and attributes defined by at least one of the content service provider and the recommendation service.

3. The system of claim 1, wherein the at least one user preference control includes a plurality of controls, and wherein the control setting data assigns a weighting to each of the plurality of user preference controls.

4. The system of claim 3, wherein interaction data from a user preference control with a relatively high weighting has a greater effect on a recommended playlist than a user preference control with a relatively lower weighting.

5. The system of claim 1, wherein the at least one user preference control includes at least one slider mapped to a mathematical function.

6. The system of claim 5, wherein the mathematical function is one of a normal distribution, a trapezoidal function and a sloped line.

7. The system of claim 1, wherein the one or more channel-specific rulesets include a bundle of rules respectively associated with frequency distributions, time separations and segue protections.

8. The system of claim 1, wherein each content clip is respectively associated with a clip record characterizing qualities of each clip using a set of predefined parameters, and wherein each user preference control is respectively associated with rule settings sent by the content service provider to the recommendation service.

9. A method for representing and interpreting settings on a client device receiving a personalized media service, the method comprising:

providing a repository of content clips associated with a plurality of channels;

providing a content information database storing a record for each one of the content clips, the record characterizing the qualities of each clip using a set of defined attributes and parameters;

providing a channel profile database that defines a specification for at least one channel of the plurality of channels, the specification characterizing the at least one channel;

mapping, the at least one channel and clip characterizations to at least one user preference control on the client device, such that when manipulated by a user, in response to received content on a selected one of the at least one channel, preferred attributes data is generated; and generating or modifying, dynamically, a playlist for the user for the selected one of the at least one channel by applying one or more channel-specific rulesets to the preferred attributes data by performing a session restart;

wherein said channel and clip characterizations include values for custom categories and attributes, defined by at least one of a content service provider and a recommender; and wherein at least one custom tag is used by the recommender to generate the playlist based on at least one slider setting and what the at least one slider position is mapped to;

wherein the mapping is a weighted matrix mapping;

wherein the at least one user preference control is generated within the user interface and includes spider plots comprising multiple sliders;

wherein mapping the channel and clip characterizations to the at least one user preference control is further effected as a union mapping.

10. The method of claim 9, wherein the at least one user preference control includes a plurality of controls, and a weighting is assigned to each one of the at least one user preference control.

11. The method of claim 9, wherein interaction data from a user preference control with a relatively high weighting has a greater effect on the playlist than a user preference control with a relatively lower weighting.

12. The method of claim 9, wherein the at least one user preference control includes at least one slider mapped to one of: (i) a mathematical function, (ii) a normal distribution, (iii) a trapezoidal function, and (iv) a sloped line.

13. The method of claim 9, further comprising passing the preferred attributes data to a recommender to provide recommendations to the personalized media service for the client device.

14. The method of claim 9, wherein the one or more channel-specific rulesets include a bundle of rules respectively associated with frequency distributions, time separations and segue protections.

* * * * *